United States Patent
Imiolek et al.

(10) Patent No.: US 6,986,654 B2
(45) Date of Patent: Jan. 17, 2006

(54) APPARATUS, SYSTEMS AND METHODS FOR USE IN THREE-DIMENSIONAL PRINTING

(75) Inventors: Ireneusz J. Imiolek, Warren, NJ (US); Christopher M. Gaylo, Princeton Junction, NJ (US)

(73) Assignee: Therics, Inc.

(*) Notice: Subject to any disclaimer, the term of this patent is extended or adjusted under 35 U.S.C. 154(b) by 398 days.

(21) Appl. No.: 10/189,797

(22) Filed: Jul. 3, 2002

(65) Prior Publication Data

US 2004/0003738 A1 Jan. 8, 2004

(51) Int. Cl.
B29C 41/02 (2006.01)
B29C 41/34 (2006.01)

(52) U.S. Cl. .................. 425/182; 425/215; 425/218; 425/258; 425/447

(58) Field of Classification Search ............. 425/182, 425/215, 218, 258, 447; 264/497
See application file for complete search history.

(56) References Cited

U.S. PATENT DOCUMENTS

| | | |
|---|---|---|
| 3,635,282 A | 1/1972 | Watanabe |
| 4,435,194 A | 3/1984 | Picard et al. |
| 4,604,111 A | 8/1986 | Natale |
| 4,637,738 A | 1/1987 | Barkley |
| 4,657,710 A | 4/1987 | Smith et al. |
| 4,874,127 A | 10/1989 | Collier |
| 4,905,578 A | 3/1990 | Curtis et al. |
| 5,004,483 A | 4/1991 | Eller et al. |
| 5,155,321 A | 10/1992 | Grube et al. |
| 5,173,258 A | 12/1992 | Childers |
| 5,176,454 A | 1/1993 | Schlereth |
| 5,204,055 A | 4/1993 | Sachs et al. |
| 5,209,398 A | 5/1993 | Drees |
| 5,252,264 A * | 10/1993 | Forderhase et al. ......... 264/497 |
| 5,277,716 A | 1/1994 | Boppart et al. |
| 5,316,580 A | 5/1994 | Deckard |
| 5,340,656 A | 8/1994 | Sachs et al. |
| 5,343,885 A | 9/1994 | Grant |
| 5,346,129 A | 9/1994 | Shah et al. |
| 5,387,380 A * | 2/1995 | Cima et al. ................. 425/218 |
| 5,468,184 A | 11/1995 | Collier |
| 5,481,260 A | 1/1996 | Buckler et al. |
| 5,592,202 A | 1/1997 | Erickson |
| 5,597,589 A | 1/1997 | Deckard |

(Continued)

FOREIGN PATENT DOCUMENTS

| | | |
|---|---|---|
| DE | 19939616 | 3/2001 |
| EP | 1099534 | 5/2001 |

(Continued)

OTHER PUBLICATIONS

Sharke, Paul, "Rapid Transit to Manufacturing," Mechanical Engineering, 2001, (availableat http://www.memagazine.org/backissues/march01/features/raptran/raptran.html).

Z Corporation, "Z402 User's Manual, Version 4.0," Feb. 2000.

(Continued)

*Primary Examiner*—Robert B. Davis
(74) *Attorney, Agent, or Firm*—Hunton & Williams LLP

(57) ABSTRACT

Apparatus, systems and methods for use in three-dimensional printing are shown and described. Various embodiments of the invention allow for more precise and controlled delivery of heat to achieve interlayer drying; isolation of the working region from the outside for reasons of cleanliness and in connection with the vapors of organic solvents; better control of the temperature of the working region; better accuracy in the flowrates of binder fluid dispensed; matching of delivered flowrates for multiple dispensers; verification of delivered flowrate or drops; provision for easier changeover of the machine from one powder to another; cleanability; and other needs.

35 Claims, 41 Drawing Sheets

U.S. PATENT DOCUMENTS

| | | |
|---|---|---|
| 5,624,693 A | 4/1997 | Horling et al. |
| 5,638,259 A | 6/1997 | McCarthy et al. |
| 5,639,070 A | 6/1997 | Deckard |
| 5,658,412 A | 8/1997 | Retallick et al. |
| 5,681,369 A | 10/1997 | Osborne |
| 5,681,470 A | 10/1997 | Safi |
| 5,740,051 A | 4/1998 | Sanders, Jr. et al. |
| 5,791,983 A | 8/1998 | Robertson |
| 5,836,086 A | 11/1998 | Elder |
| 5,871,568 A | 2/1999 | Gibson |
| 5,908,569 A | 6/1999 | Wilkening et al. |
| 5,931,141 A | 8/1999 | Chino |
| 5,934,343 A | 8/1999 | Gaylo et al. |
| 6,007,318 A | 12/1999 | Russell et al. |
| 6,023,978 A | 2/2000 | Dauenhauer et al. |
| 6,036,777 A | 3/2000 | Sachs .................... 118/56 |
| 6,126,276 A | 10/2000 | Davis et al. |
| 6,162,378 A | 12/2000 | Bedal et al. |
| 6,169,605 B1 | 1/2001 | Penn et al. |
| 6,175,422 B1 | 1/2001 | Penn et al. |
| 6,213,168 B1 * | 4/2001 | Gaylo et al. ............ 425/218 |
| 6,217,816 B1 | 4/2001 | Tang |
| 6,238,614 B1 | 5/2001 | Yang et al. |
| 6,261,077 B1 | 7/2001 | Bishop et al. |
| 6,267,466 B1 | 7/2001 | Gudaitis et al. |
| 6,280,696 B1 | 8/2001 | Hsu et al. |
| 6,305,769 B1 | 10/2001 | Thayer et al. |
| 6,336,480 B2 | 1/2002 | Gaylo et al. |
| 6,357,855 B1 | 3/2002 | Kerekes et al. |
| 6,375,874 B1 * | 4/2002 | Russell et al. ............ 425/218 |
| 6,423,255 B1 | 6/2002 | Hoechsmann et al. |
| 6,455,317 B1 | 9/2002 | Lautenschlager |
| 6,477,843 B2 | 11/2002 | Schroeder et al. |
| 6,554,600 B1 * | 4/2003 | Hofmann et al. ......... 425/182 |
| 6,576,030 B2 | 6/2003 | Mullins |
| 6,579,563 B1 | 6/2003 | Dillon |
| 6,610,429 B2 | 8/2003 | Bredt et al. |
| 6,658,314 B1 | 12/2003 | Gothait |
| 6,740,147 B2 | 5/2004 | Kishkovich et al. |
| 6,767,499 B1 * | 7/2004 | Hory et al. ............ 264/497 |
| 6,789,876 B2 | 9/2004 | Barclay et al. |
| 6,824,714 B1 * | 11/2004 | Turck et al. ............ 425/174.4 |
| 2001/0026782 A1 | 10/2001 | Wang et al. |
| 2002/0008335 A1 | 1/2002 | Leyden et al. |
| 2002/0041306 A1 | 4/2002 | Zapata et al. |
| 2002/0047872 A1 | 4/2002 | Ishikawa |
| 2002/0090410 A1 * | 7/2002 | Tochimoto et al. ......... 425/215 |
| 2002/0097317 A1 | 7/2002 | Wood et al. |
| 2005/0104973 A1 | 8/2002 | Kerekes |
| 2003/0020618 A1 | 1/2003 | Hemmer et al. |
| 2003/0138242 A1 | 7/2003 | Gelernt et al. |
| 2003/0081167 A1 | 8/2003 | Kritchman et al. |
| 2003/0184771 A1 | 10/2003 | Yamamoto et al. |
| 2004/0012112 A1 * | 1/2004 | Davidson et al. ......... 425/215 |

FOREIGN PATENT DOCUMENTS

| | | |
|---|---|---|
| EP | 1138489 | 10/2001 |
| FR | 2166526 | 8/1973 |
| WO | 9534468 | 12/1995 |
| WO | 9932715 | 7/1999 |
| WO | 9962715 | 12/1999 |
| WO | WO00/21736 A1 * | 4/2000 |
| WO | 0233423 | 4/2002 |
| WO | 03037632 | 5/2003 |

OTHER PUBLICATIONS

Ramos, Juan David, "Design of Humidifying System for the Powder Bed of the Three-Dimensional Printing Machine," dissertation, Massachusetts Institute of Technology, May 1993, pp. 1–24.

International Search Report dated Apr. 15, 2004.

Greg Paula, "*Linear motors take center state*", Mar. 1998, Mechanical Engineering, http://www.memagazine.org/back-issues/march98/features/linear/linear.html.

Drew Devitt, "*Air' on the side of smoothness–Air bearings eliminate static friction and stick–slip that compromise precision.*", No date. http://www.bearings.machinesdesign-.com/guiEdits/artid/55726/page/0/SiteMap$_{13}$ PagedArticle Draw.aspx/

"*Microglide Air Bearing Systems*", No date, http://www.rockwellautomation.com/anorad/downloads/pdf/airbearing.pdf.

"Air bearing system," Design News, Aug. 17, 1998, http://www.designnews.com/article/CA120935.html!text=air+bearing.

Dedicated to the Science of Motion–Air Bearings Selection Guide, No. date, http://www.aerotech.com/products/airbearing/air$_{13}$bearings.html.

Boillat, M., et al., "A Differential Pressure Liquid Flow Sensor for Flow Regulation and Dosing Systems," in *Proceedings of the Workshop on Micro Electrical Mechanical Systems*, Amsterdam, Jan. 29–Feb. 2, 1995, pp. 350–352.

Seyonic–flow sensor, http://www.seyonic.com/flow2.htm, no date.

* cited by examiner

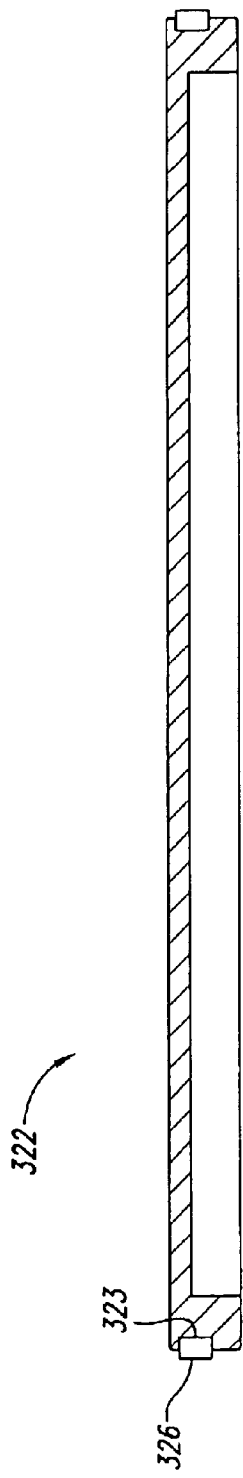
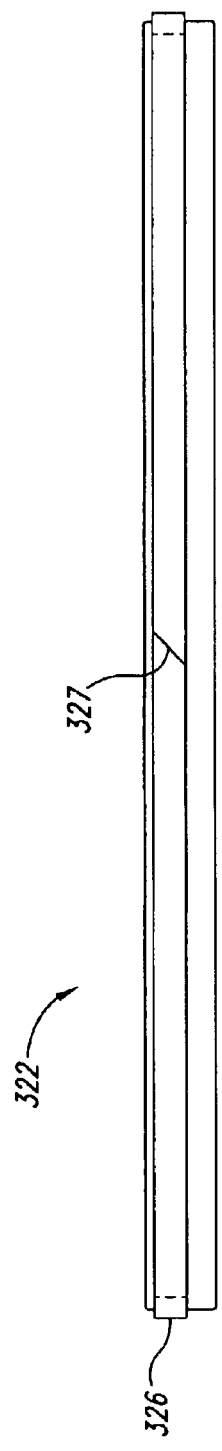
Fig. 16
Fig. 17

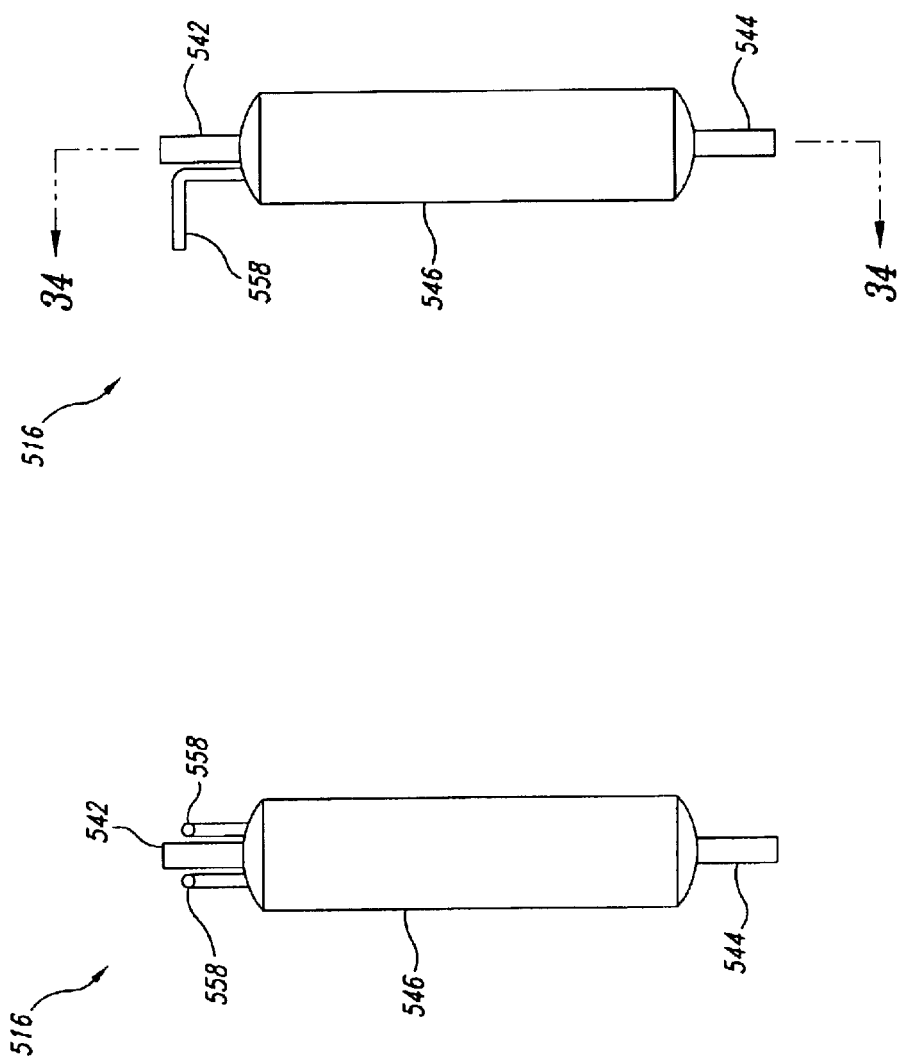

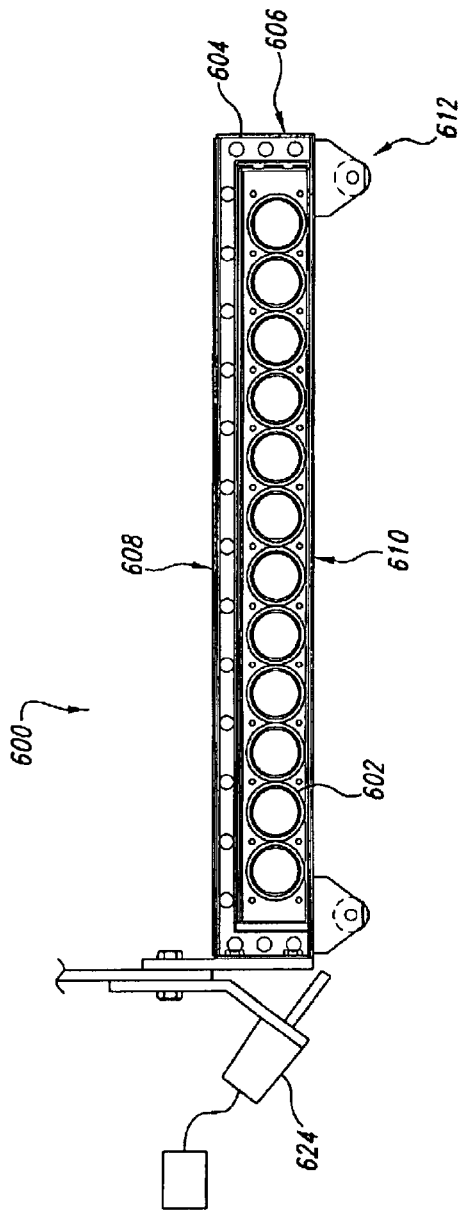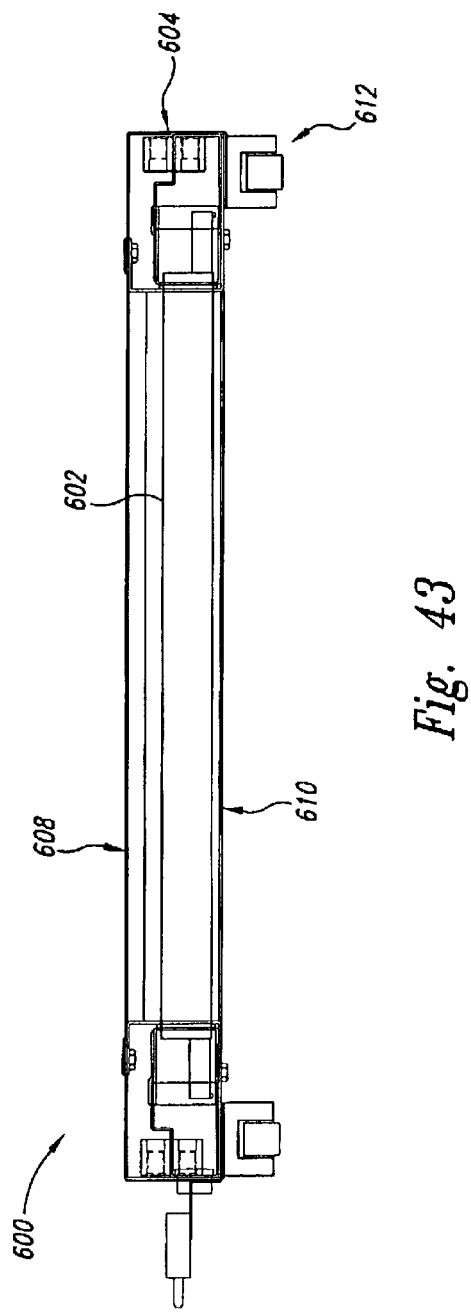
Fig. 42
Fig. 43

APPARATUS, SYSTEMS AND METHODS FOR USE IN THREE-DIMENSIONAL PRINTING

BACKGROUND OF THE INVENTION

1. Field of the Invention

The present invention is directed toward apparatus, systems and methods for use in three-dimensional printing.

2. Description of the Related Art

Three-dimensional printing is a process of depositing successive layers of powder onto a substrate, and causing portions of each layer to adhere or bind to themselves and to adjacent earlier-deposited layers through the action of a liquid called a binder. Through this sequential process a three-dimensional product is ultimately formed. Because of the sequential nature of this process, products having complex shapes and even interlocking parts can be formed, products that are otherwise extremely difficult if not impossible to fabricate through traditional means.

Powder has typically been deposited through one of two methods. One method has been to spread dry powder with a roller across the top of the substrate or prior layer. This method is suited to creating powder layers with thicknesses of around 0.005 inch (127 microns) or greater, and to powders whose average particle size is greater than a minimum value which is somewhere in the range of 5 to 20 microns.

The other method of depositing powder has been to deposit layers of a powder-carrying slurry onto the substrate or prior layer. The slurry comprises a carrier liquid with a fairly high content of suspended solid particles. The slurry carrier liquid may be formulated to encourage the particles to remain suspended and to discourage them from agglomerating with each other. A discharge of slurry (usually continuous) from a nozzle is rastered across the bed. Slurry deposition has typically been used for depositing rather thin layers of powder whose particle size is finer than is practical with roller-spreading of powder. When the slurry has been deposited, all or most of the slurry carrier liquid must be removed from the deposited layer before printing of binder liquid. This has been accomplished through some combination of percolation, natural evaporation and evaporation due to externally applied heat.

After each layer of powder has been deposited on the build bed, by either the roller method or the slurry method discussed above, a printhead dispenses binder or another fluid onto preselected areas of the powder to form a layer of the final product. The binding action can be achieved through dissolution of powder by the binder followed by resolidification when the binder evaporates, or through an adhesive which is initially dissolved in or mixed with the binder and is left behind on the powder when the volatile component(s) of the binder evaporate. Typically the binder is selected to have an appropriate degree of volatility so that its volatile component(s) evaporate, leaving behind solidified powder, after a desired amount of time.

The printhead can operate in a raster mode, which is similar to an inkjet printer, progressively making rapid, lateral passes across the build bed, moving slightly forward with each pass, until it has dispensed fluid along the entire length of the build bed. The lateral direction of the printhead has been referred to as the fast axis, as the printhead moves along this axis relatively quickly. The longitudinal direction, perpendicular to the fast axis, has been referred to as the slow axis, because movement along the slow axis does not occur during fast axis movement and in general is slower. It has also been possible to perform vector printing, in which there is simultaneous motion in both horizontal axes to enable the printhead to move in curved paths. It has also been possible to use both raster printing and vector printing in a print job.

Controlling the duration of drying and the extent of drying before application of the next layer of powder has been important because these influence bleeding (i.e., the spreading of dispensed liquid in the powder before it dries, which affects dimensions and the surface finish of a part) and because they affect the adhesion between layers (i.e., the strength of the printed part).

Analyzing both the rate and the extent of drying between successive layers has indicated that there is an optimal range for each of these parameters. The evaporation rate of a given binder at the operating temperature, which is typically room temperature, may or may not be within that optimal range. Presently, one design variable available to influence drying rate is the formulation of the binder. Another available variable is the temperature of the print bed, which impacts the entire machine design and process. Yet another variable is the length of time between depositing layers, which affects the extent of drying between layers but does not affect the rate of drying and hence does not control bleeding.

Heating during portions of the three-dimensional printing process is known in crude forms. For example, externally applied heat has been used for purposes of evaporating slurry carrier liquid. However, this external application of heat to a slurry-deposited layer, which has typically occurred prior to printing of binder onto that layer, has caused evaporation of slurry carrier liquid. This is not the same as causing the evaporation of binder liquid, which occurs after printing of binder onto that layer.

Heating of the build bed to accelerate evaporation of the volatile part of the binder liquid has been proposed, such as in U.S. Pat. No. 5,204,055, but using fixed-place heat sources located sufficiently far away from the build bed to allow room for all the other equipment is not very precise in the application of heat directly to the bed, or in uniformity of delivery of heat to all places of the bed, and in such a manner as to achieve a desired remaining saturation of the printed portions of the layer after completion of the interlayer drying. For example, in construction of parts by three-dimensional printing, some layers may have large areas printed upon by binder liquid while another layer may have only small areas printed upon by binder liquid. Treating all of these layers the same as far as application of interlayer drying heat produces results which differ between these situations as far as what is the saturation of the bed at the time of the spreading of the next layer of powder and subsequent printing upon it.

Existing three-dimensional printing machines have not been sufficiently cleanable to be useful for medical manufacturing purposes. Likewise, refilling, replacing and/or changing the powder in existing three-dimensional printing machine has been a difficult job and could spread powder throughout the machine, requiring additional cleaning and, possibly, disinfecting. Much of the process of loading and unloading powder as well as cleaning has involved the entire machine, making the entire machine unavailable for any other purpose during that time.

For some purposes it may be desirable to use binder liquids, which comprise organic solvents. Such solvents may be particularly desirable for use in certain medical applications, which may require dissolution of substances not soluble in water-based liquids. Organic solvents may have hazards not found with water-based liquids. For example, chloroform, an important organic solvent for purposes of medical interest, is a suspected human carcinogen. Many other organic solvents of interest, such as ethanol and other alcohols, and acetone, in addition to being in some cases toxic, are flammable. Flammable substances can be explosion hazards for certain concentrations of their vapors in air or certain vapor/oxygen ratios. Existing three-dimensional printing machines intended for more ordinary binders, usually aqueous binders, have not had features appropriate to adequately deal with these hazards.

Existing three-dimensional printing machines may have had an enclosure designed to prevent objects or operators' body parts from accidentally entering into the workspace. However, they have not had an enclosure sufficient to maintain an environment suitable for processing medical and pharmaceutical products and devices.

Existing three-dimensional printing machines may have heat loads without having good ways of managing and removing that heat. It can be important to maintain well-controlled temperature of components near the working region, because for example the dispensing of binder liquid can suffer from irregularities if there are significant variations in the temperature of the liquid as it is dispensed.

Existing three-dimensional printing machines typically have allowed manual changeover from one powder to another and associated cleaning procedures, but not in a quick or easy manner.

Precision in determining dispensed fluid volume has traditionally not been critical. Existing three-dimensional printing machines have dispensed binder at flowrates which are known to an accuracy suitable for industrial purposes, but not to an accuracy suitable for demanding manufacturing such as manufacturing of medical articles. Furthermore, in existing three-dimensional printing machines there has been no way of measuring the actual delivered flowrate during printing or even verifying the delivery of a drop at any given location where delivery of a drop was commanded.

Thus, prior to the present invention there existed a need for more precise and controlled delivery of heat to achieve interlayer drying; isolation of the working region from the outside for reasons of cleanliness and in connection with the vapors of organic solvents; better control of the temperature of the working region; better accuracy in the flowrates of binder fluid dispensed; matching of delivered flowrate for multiple dispensers; verification of delivered flowrate or drops; provision for easier changeover of the machine from one powder to another; cleanability; and other needs.

BRIEF SUMMARY OF THE INVENTION

The present invention is directed toward apparatus, systems and methods for use in three-dimensional printing of products.

Embodiments of the present invention may incorporate a powder layer depositor, a printhead for dispensing binder or other fluids, and an interlayer dryer heat source for controlling the rate and extent to which volatile liquid evaporates from the powder. In one particular embodiment, a roller deposits a layer of powder onto a build bed, the printhead dispenses onto the powder a fluid comprising a volatile liquid, and the interlayer dryer heat source controllably accelerates evaporation of the volatile liquid. Embodiments of the invention control the heater based on time, the temperature of the powder, the moisture content in the powder, empirical data, or a combination of these and/or other factors. By controlling the rate and extent of evaporation of the fluid in the powder, the inventors have been able to improve the quality of products fabricated through the three-dimensional printing process.

Embodiments of the present invention are also directed toward three-dimensional printing machines incorporating a roller that is heated and/or maintained at a pre-selected temperature. One particular embodiment of the invention incorporates a roller controllable to spread a powder onto a build bed, and a roller heater suitable to heat the roller to an elevated temperature. The roller heater can be internal to or external of the roller, and can be controlled based on the temperature of the roller surface, the temperature of the internal cavity of the roller, the temperature or moisture content of the powder, or a combination of these and/or other factors. The present invention is also directed toward methods of heating or maintaining a desired roller temperature.

Embodiments of the present invention are also directed toward several means of enclosing and controlling the environment surrounding the three-dimensional printing machine. Particular embodiments of the invention incorporate an enclosure, and/or a ventilation, recirculation and air purification system and/or a system for maintaining the interior of the enclosure at a desired pressure, which can be at, above or below the pressure of the surrounding environment. With such embodiments, the air surrounding the printing machine may be maintained at a desired temperature, at a pressure greater than the surrounding environment to prevent contaminants from entering the enclosure, at a pressure lower than the surrounding environment, at a substantially stationary state to avoid disruption of droplet trajectories, and/or free from contaminants and harmful fumes. Gases other than air can be supplied to the enclosure interior.

Embodiments of the present invention are also directed toward systems and methods for precisely controlling the amount of fluid deposited onto the product, which can be desirable for medical, pharmaceutical and other applications. Particular embodiments of the present invention can be used to test, group and calibrate microvalves so that the amount of fluid dispensed from each dispenser in a multi-dispenser printhead deposits a substantially identical volume is of fluid as the other dispensers in the printhead. In addition, particular embodiments of the present invention— including particular actuation pulse waves used to open and close each microvalve independently—can be used to dispense a precise, measurable and repeatable volume of fluid from each dispenser, from one cycle to the next and from one product to the next. Embodiments of the present invention are also directed toward sizing of valves relative to the viscosity of the fluid, and toward measuring delivered amounts of fluid or verifying the delivery of drops when commanded.

Embodiments of the present invention are also directed toward measuring the flowrate of fluid that is being dispensed or verifying that fluid actually is dispensed when intended.

The present invention is also directed toward several means of building, controlling, and maintaining a three-dimensional printing apparatus and system.

BRIEF DESCRIPTION OF THE SEVERAL VIEWS OF THE DRAWING(S)

FIG. 16 is a cross-sectional elevation view of the carrier plate contained in the tray subassembly of FIG. 15, viewed along Section 16—16.

FIG. 17 is an elevation view of the carrier plate of FIG. 15, illustrating a gasket.

FIG. 32 is an elevation view of a valve from the printhead of FIG. 24.

FIG. 33 is a right end view of the valve of FIG. 32.

FIG. 42 is a cross-sectional elevation view of the heater of FIG. 41, viewed along Section 42—42.

FIG. 43 is a cross-sectional elevation view of the heater of FIG. 41, viewed along Section 43—43.

Figure 53:
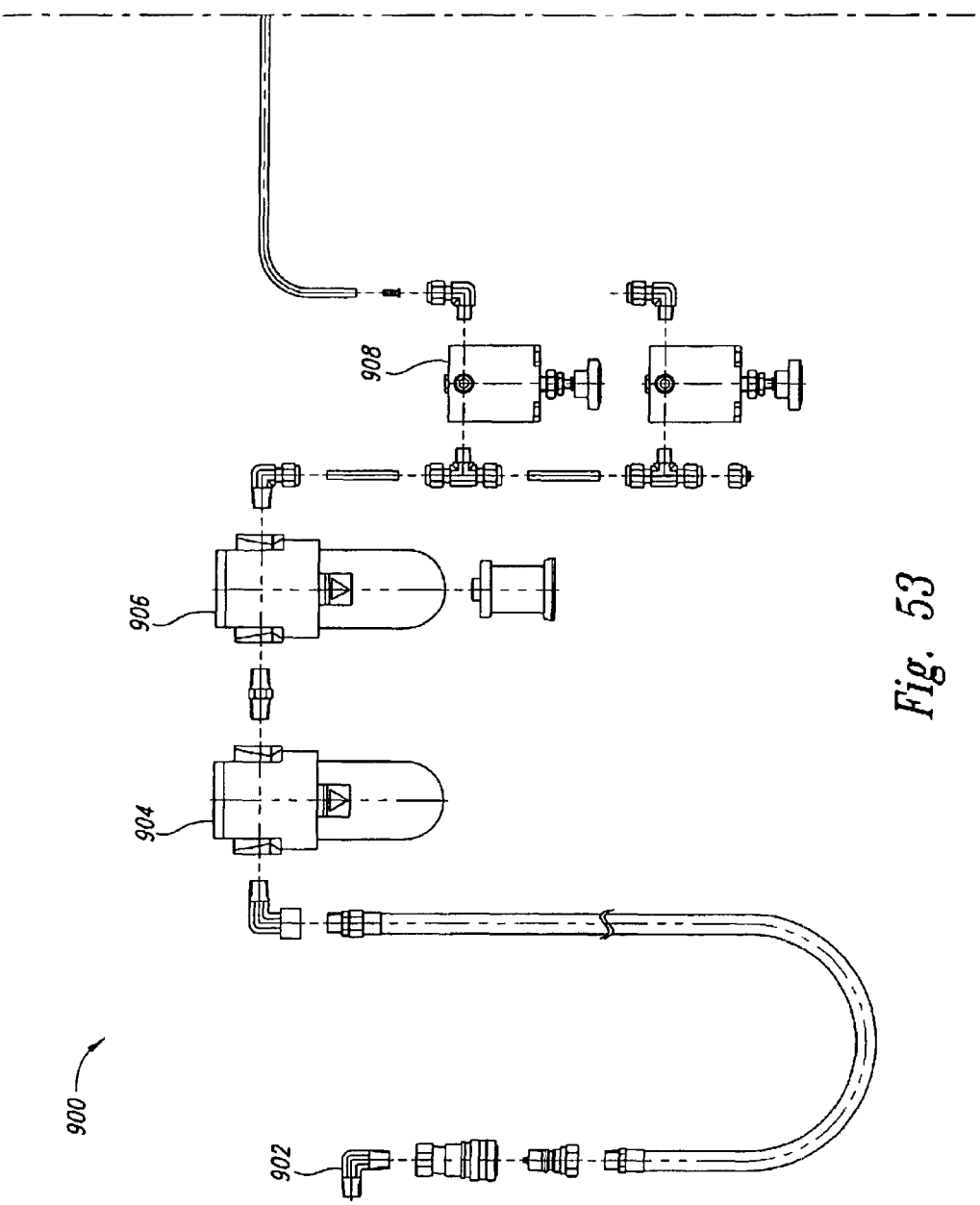
Figure 54:
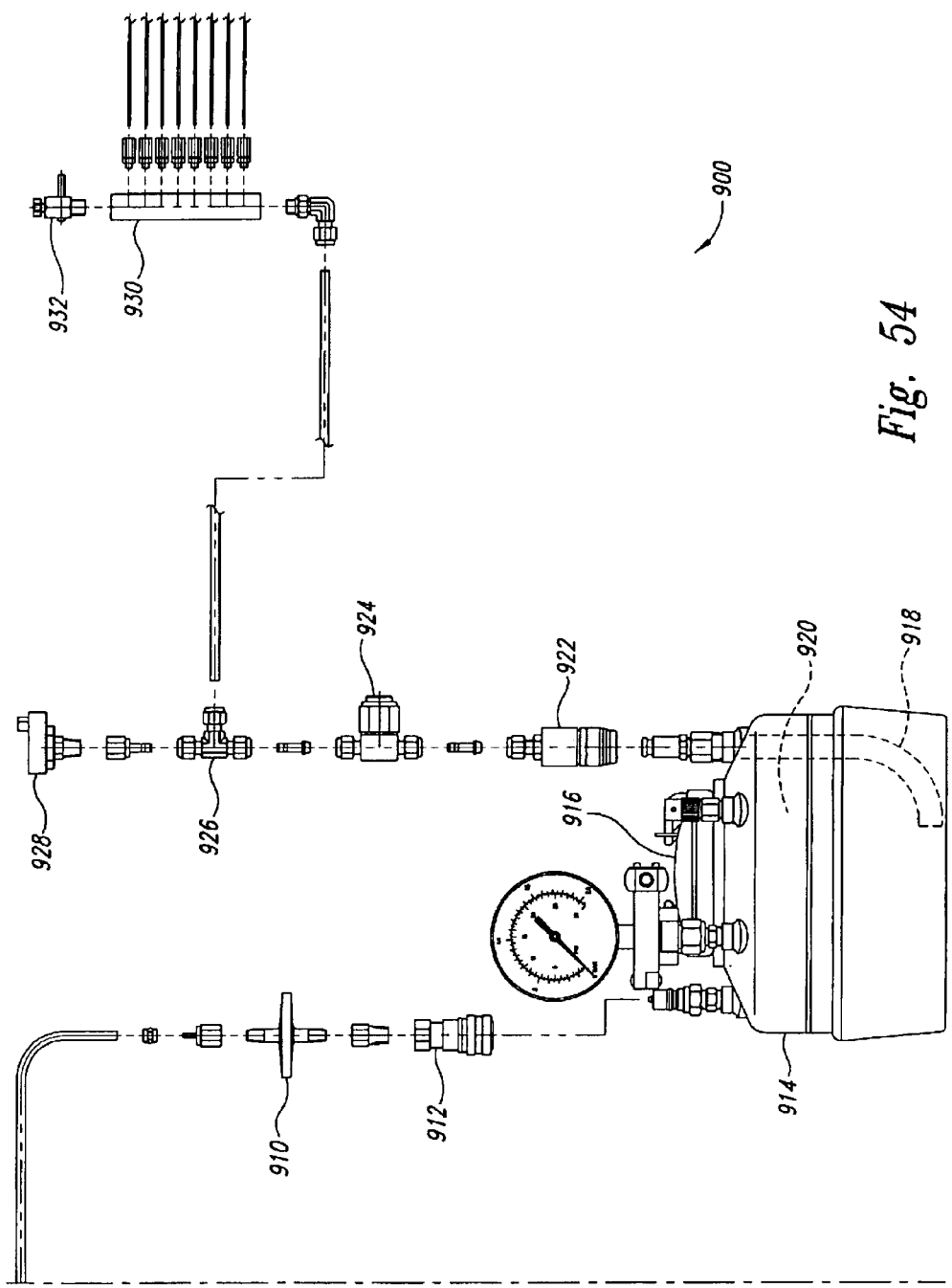

FIGS. 53 and 54 collectively illustrate a fluid introduction, storage and supply system according to one embodiment of the present invention.

Figure 55:
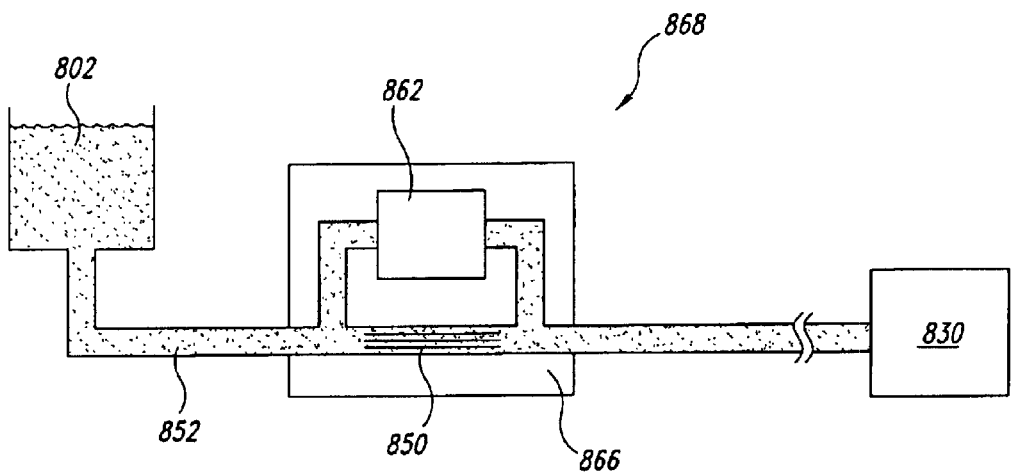

FIG. 55 illustrates an in-line flowmeter according to an embodiment of the present invention, using a differential pressure measurement.

Figure 56:
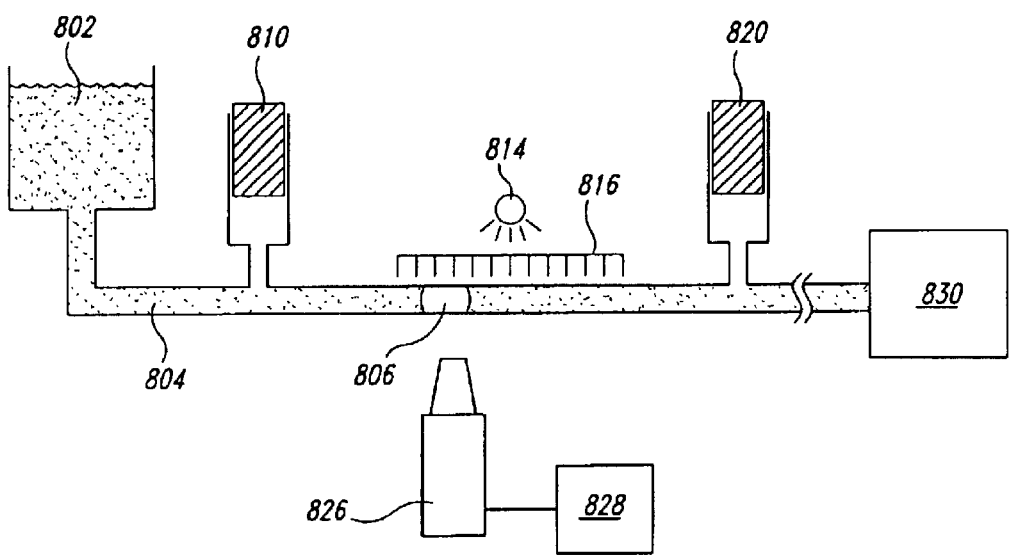

FIG. 56 illustrates an in-line flowmeter according to an embodiment of the present invention, using a technique which tracks the motion of a gas bubble in a conduit.

DETAILED DESCRIPTION OF THE INVENTION

The present detailed description is generally directed toward systems, apparatus and methods for three-dimensional printing systems. Specific details of certain embodiments of the invention are set forth in the following description and in FIGS. 1–56 to provide a thorough understanding of the illustrated embodiments. One skilled in the art, however, will understand that the present invention may have additional embodiments, and may be practiced without several of the details described in the following description and illustrated in the Figures.

General Description of Illustrated Three-dimensional Printing System

FIGS. 1–6 illustrate a three-dimensional printing machine 100 according to one particular embodiment of the present invention. The illustrated three-dimensional printing machine 100 incorporates, generally, a first powder bed assembly and positioning system 200, a second powder bed assembly and positioning system 300, a roller assembly 400, a printhead assembly 500, and an interlayer drying heater assembly 600. The structural elements of the three-dimensional printing machine 100 generally consist of a lower support system 102, a table-top 104 resting on the lower support system, and a gantry 106 resting on the table-top 104 and/or on the lower support system.

The support system 102 is made up of a number of legs 108, lateral braces 110 extending between many of the legs, and feet 112, one at the lower end of each leg. In the illustrated embodiment, the support system 102 has six legs 108 arranged in a rectangular configuration, and the lateral braces 110 extend between adjacent legs around the perimeter of the support system. The number and configuration of the legs 108 can vary dramatically without deviating from the spirit of the present invention. Likewise, after reviewing this disclosure, one of ordinary skill in the art will appreciate that the three-dimensional printing machine 100 can be supported in other equivalent manners.

The feet 112 at the lower end of the legs 108 may support and level the support system 102, and distribute the weight of the three-dimensional printing machine 100. In addition, each foot 112 may be independently and/or automatically adjustable to conform to the particular foundation on which the three-dimensional printing machine 100 rests. The inventors appreciate that the feet 112 could be replaced with wheels, casters, skids or other structures without deviating from the spirit of the invention.

Figure 1:
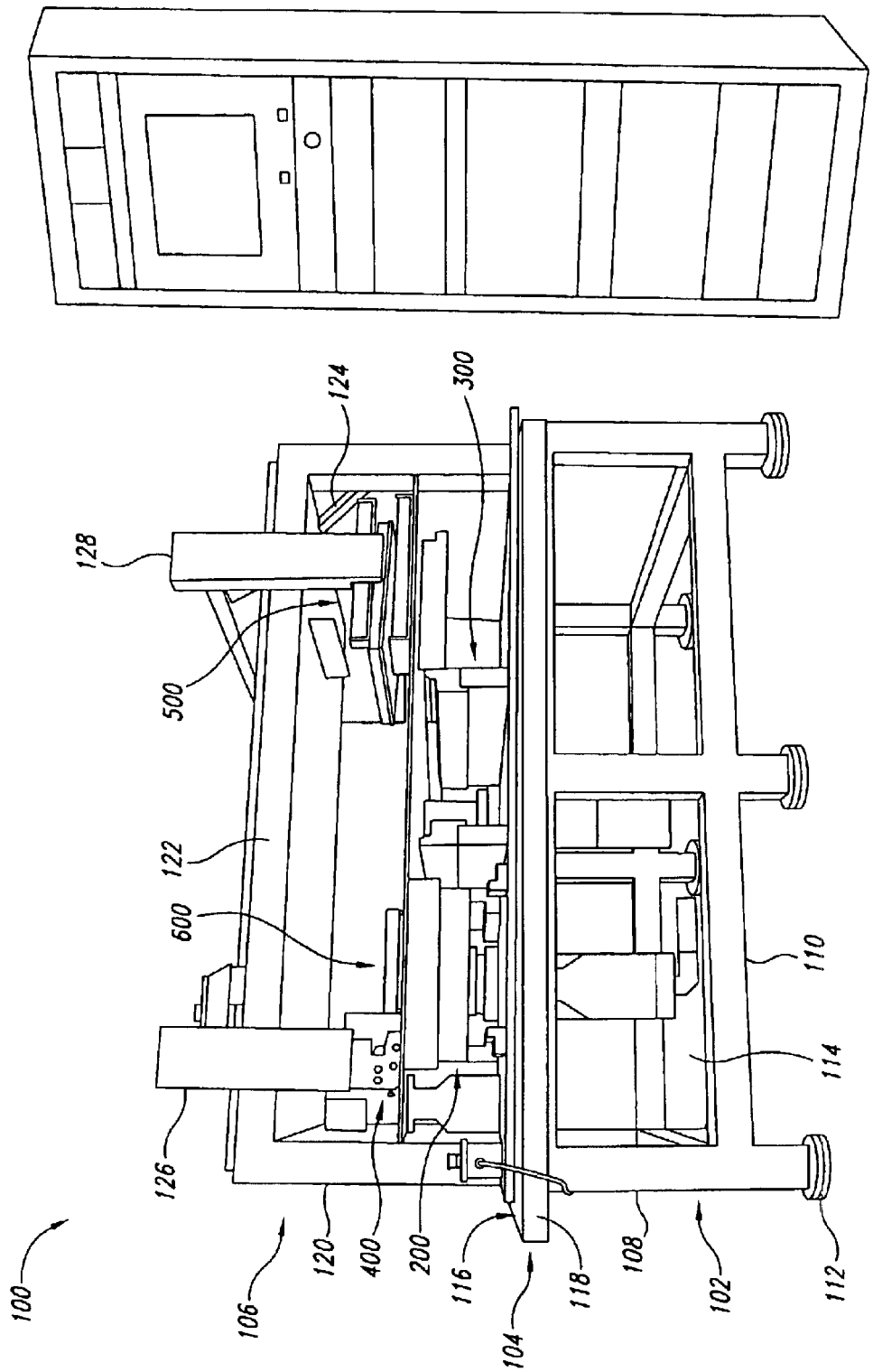
FIG. 1 is an isometric view of a three-dimensional printing system according to an embodiment of the present invention, viewed from slightly below an operating plane at which powder spreading and printing take place.

The configuration of the illustrated legs 108 defines a central opening 114, inside which equipment, wiring, ducts or other objects can be stored or positioned during use. The central opening 114 can be readily accessible as illustrated in FIG. 1, or can be enclosed or covered, as discussed in detail below. The illustrated table-top 104 rests on the support system 102, and can be attached thereto with fasteners or other means generally understood in the art. The illustrated table-top 104 has an upper surface 116, upon which other structural and functional elements of the three-dimensional printing machine 100 can rest or be attached. An edge 118 of the table-top 104 provides a surface to which items such as controls, a gutter for trapping debris, or other features can be affixed. After reviewing this disclosure, one of ordinary skill in the art will appreciate that many other features could be mounted to the edge 118 of the table-top 104.

Table-top 104 and in general any of the components described herein could be coated with a coating, such as to enhance cleanability, which may be selected from the group consisting of: anodized finish, hardcoat anodized finish, siloxane, baked enamel, electroplated enamel, electroless nickel, coated elastomer, laminated elastomer, dipped latex, sprayed latex, polyvinyl chloride, nylon, polytetrafluoroethylene, polyurethane, an epoxy resin, or a polyester. A specific possibility for the coating is the coating designated Endura 103, made by Endura Coatings, Warren Ml, which is produced by a multi-step process that combines conversion of the aluminum surface to an aluminum oxide ceramic, and the controlled infusion of sub-micron sized particles of high temperature, low friction fluoropolymers. The coating becomes an integral part of the surface base metal, as compared to a typical surface coating, and provides a combination of release (non-stick), non-wetting, uniform heat distribution, low friction, permanent dry lubrication, chemical and corrosion resistance, and hardness properties.

The gantry 106 in the illustrated embodiment is fabricated from four upright structural members 120, a rectangular structural member 122 positioned on the four upright structural members, and a shear brace 124 between each of the upright members and a point along the perimeter of the rectangular structural member.

Attached to the gantry 106 are rails 130 along which a first carriage 126 can move, carrying the roller assembly 400 lengthwise along the three-dimensional printing machine 100. Similarly, a second carriage 128 can be operated to move, carrying the fast axis assembly including the printhead assembly 500 along the length of the three-dimensional printing machine 100. The movement of the second carriage 128 corresponds to movement of the printhead assembly in the direction of the slow axis.

As best illustrated in FIGS. 3–6, the first and second carriages 126, 128 ride along the rails 130 that extend along the length of the three-dimensional printing machine 100 above the gantry 106. The rails 130 are fixed with respect to the top of the gantry 106, and remain stationary as the first and second carriage 126, 128 move along them.

Figure 4:
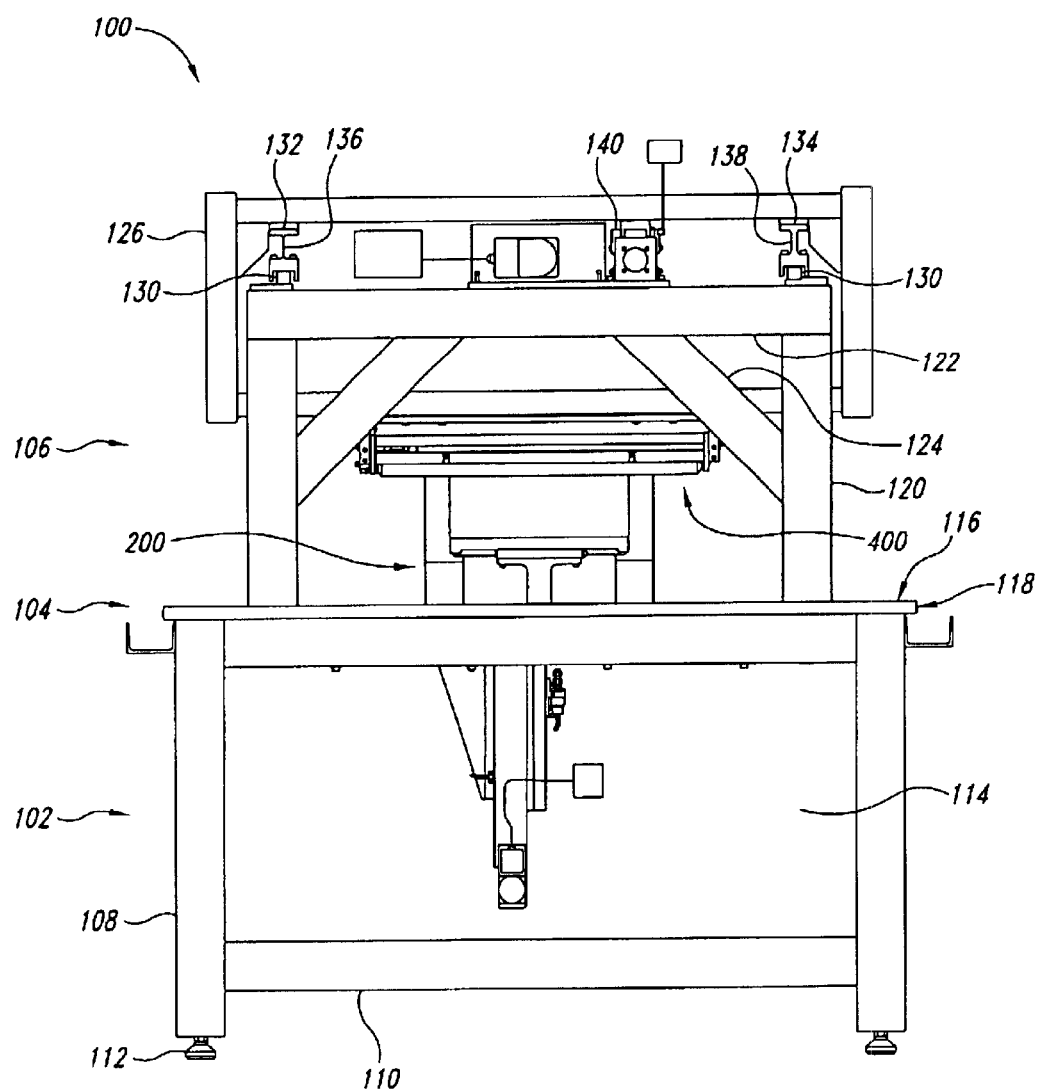
FIG. 4 is a left end view of the three-dimensional printing system of FIG. 1, from which background structure may have been removed for clarity.

The first carriage 126 rides along the rails 130 on a flexible bearing assembly 132 on one of the rails and a rigid bearing assembly 134 on the other of the rails (FIG. 4). A lower portion of each bearing assembly 132, 134 rides on a corresponding one of the rails 130, and an upper portion of each is mounted to the first carriage 126. In the flexible bearing assembly 132, the upper and lower portions are connected together by a vertical, thin web 136, while in the rigid bearing assembly 134 there is a thick web 138. The thin web 136 is sufficiently flexible to allow the first carriage 126 to expand or contract in the lateral direction, such as due to thermal expansion, without the carriage binding on the rail 130. That is, if the first carriage 126 expands or contracts in the lateral direction, the thin web 136 flexes, preventing the carriage from exerting an excessive force on the rails 130, which could otherwise prevent movement of the first carriage 126 along the rails.

A roller assembly driver 140 is mounted to the rectangular structural member 122 of the gantry 106, and is linked to the first carriage 126 to controllably move the first carriage—and with it the roller—back and forth along the length of the three-dimensional printing machine 100. In the illustrated embodiment, the roller assembly driver 140 is a screw drive. The inventors appreciate that other, equivalent drive mechanisms could be substituted for the screw drive without deviating from the spirit of the invention. A rack and pinion, or a precision ball screw, or other devices could be used. In particular, a linear motor could be used. In a linear motor, one of the two electromagnetically interacting components is stretched out in a straight configuration rather than being configured in a closed circle or loop as in a conventional rotary motor. Of the two electromagnetically interacting components, both could be electromagnetic coils, or one could be an electromagnetic coil and the other could be a permanent magnet, or one could be an electromagnetic coil and the other could be an electrically conductive structure in which currents are induced. Motors could be servomotors having built-in feedback components. All of these comments apply as well to other drive systems within the three dimensional printing machine.

The proximity of the roller assembly driver 140 to the rigid bearing assembly 134 and the lateral play in the roller assembly driver combine to allow the rigid bearing assembly 134 to have a thick web 138. If the roller assembly driver 140 were positioned closer to the flexible bearing assembly 132, the rigid bearing assembly 134 may need to be replaced with a flexible bearing assembly 132. The inventors appreciate that, having reviewed this disclosure, one of ordinary skill in the art will understand the functioning of the rigid bearing assembly 134 and the flexible bearing assembly 132, and will understand that variations can be made to this particular structure without deviating from the spirit of the invention.

Figure 5:
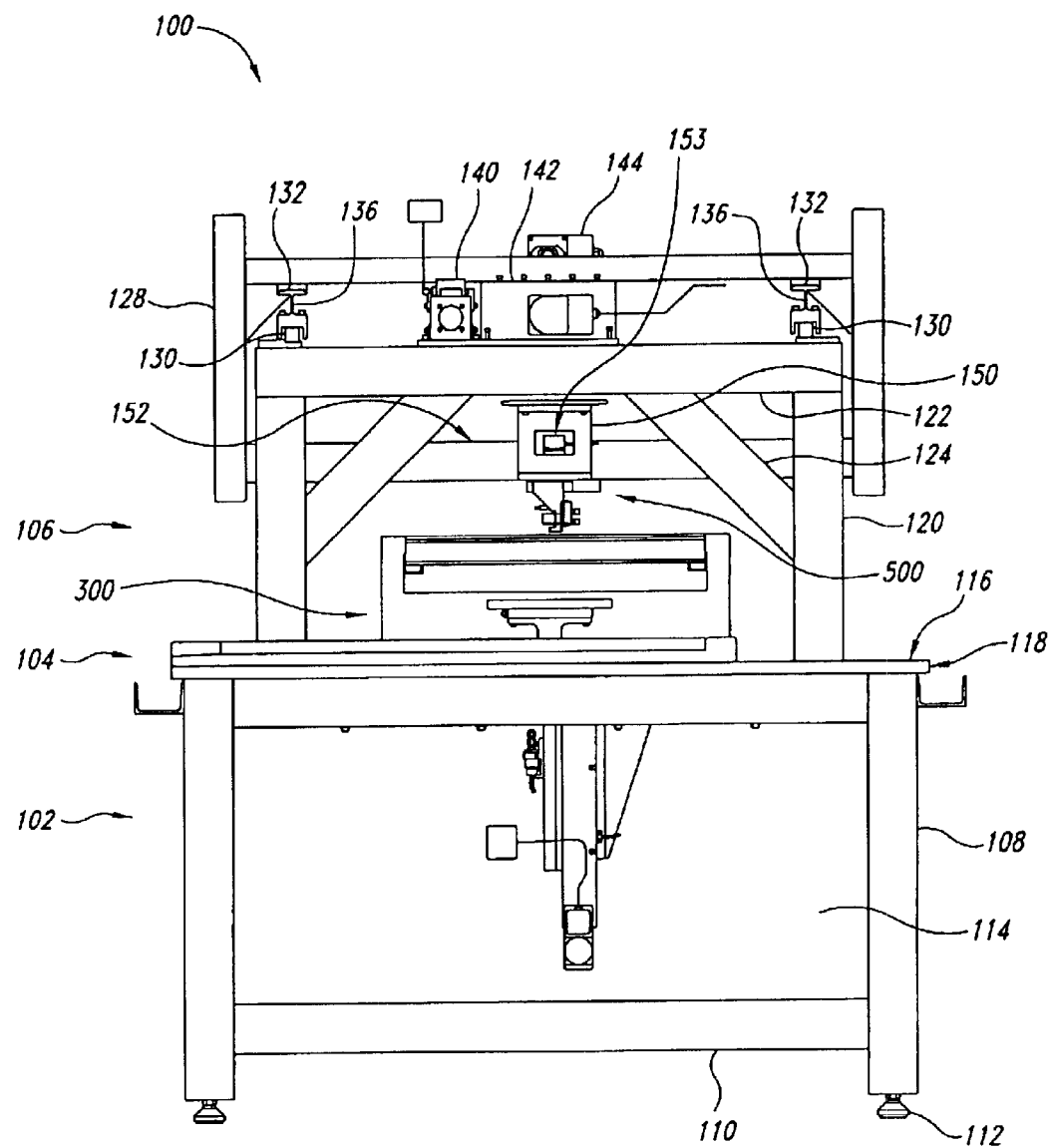
FIG. 5 is a right end view of the three-dimensional printing system of FIG. 1, from which background structure may have been removed for clarity.
Figure 6:
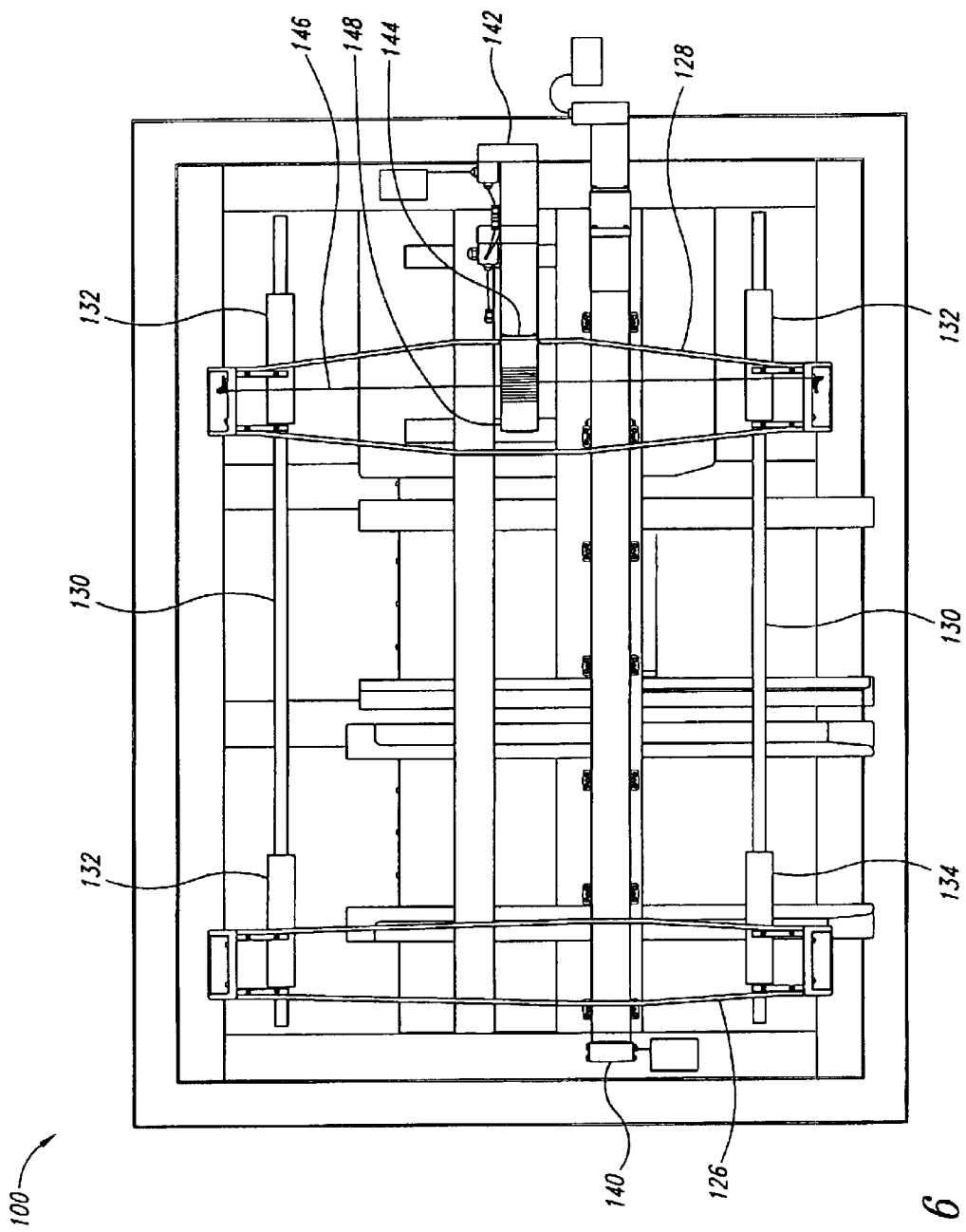
FIG. 6 is a plan view of the three-dimensional printing system of FIG. 1.
Figure 7:
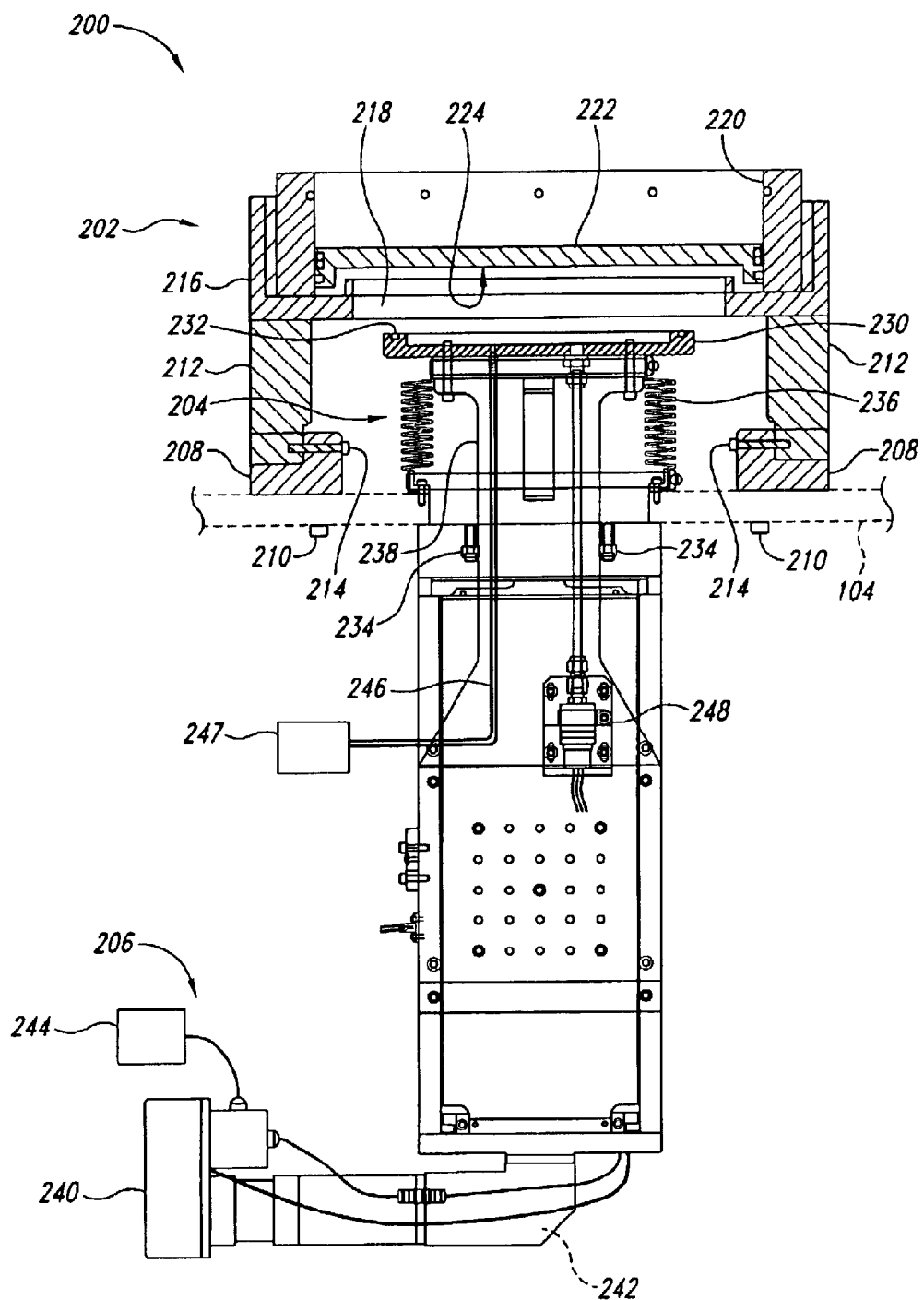
FIG. 7 is an elevation view of a powder bed assembly and positioning system from the three-dimensional printing system of FIG. 1, the upper portion of which is illustrated in cross-section.
Figure 8:
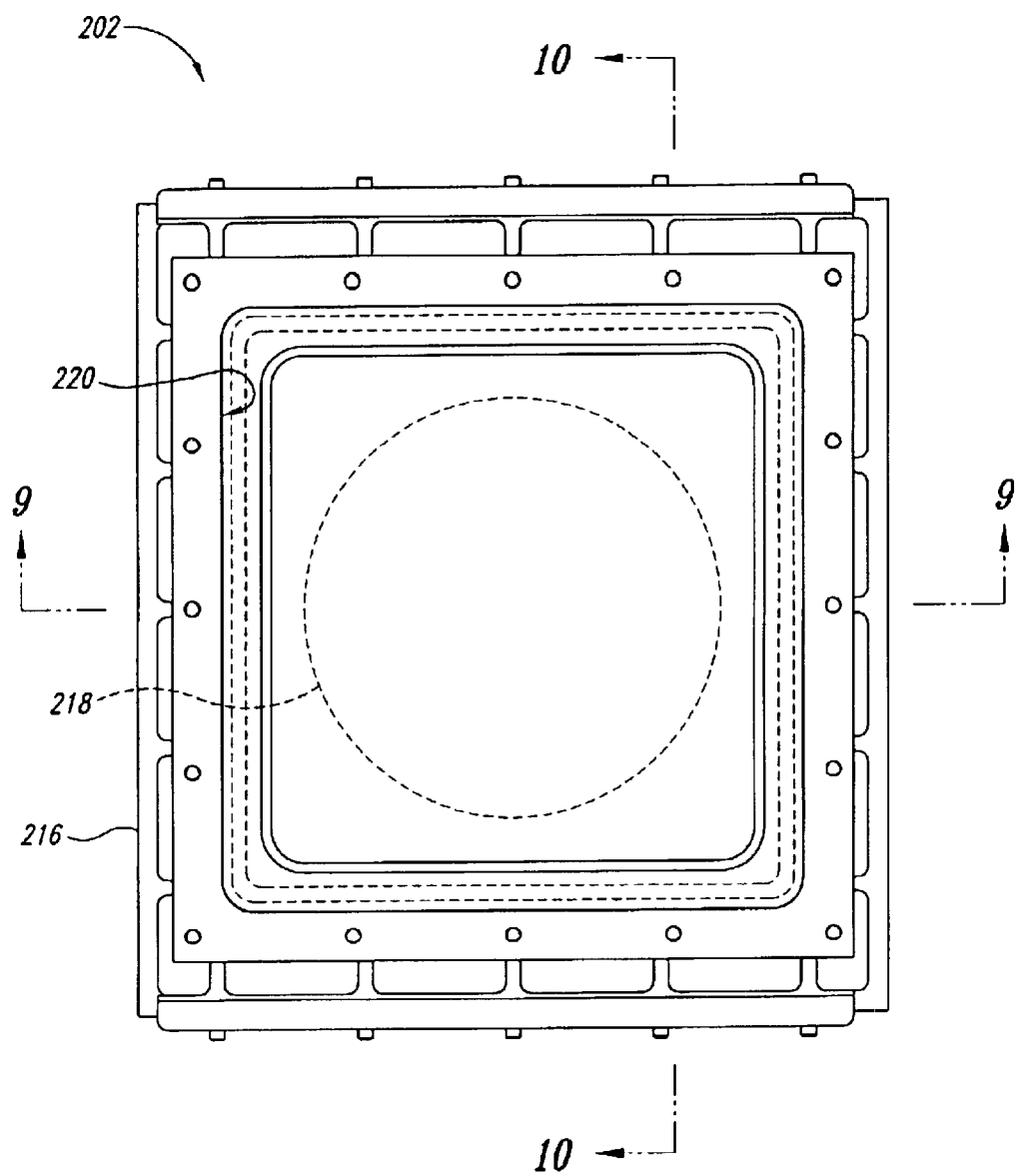
FIG. 8 is a plan view of the powder bed assembly of FIG. 7.

FIG. 5 illustrates the engagement between the second carriage 128 and the gantry 106. The second carriage 128 operates in a manner generally the same as the first carriage 126. The second carriage 128, however, rides on a pair of flexible bearing assemblies 132, each of which has a thin web 136. The inventors selected this particular configuration for the illustrated embodiment because, among other things, the second carriage 128 is rigidly mounted to a slow axis driver 142, which is centrally located with respect to the lateral dimension of the gantry 106. The illustrated slow axis driver 142 is a precision screw drive that is closely controllable to move the printhead assembly 500 in the direction of the slow axis to the precisely desired location with respect to the second powder bed assembly and positioning system 300, and to move the printhead assembly horizontally toward and away from the build bed 302. Because the printhead assembly driver 142 is rigidly mounted to a central location along the length of second carriage 128, lateral expansion of the second carriage may occur roughly equally in opposing directions. Thus, in the illustrated embodiment the inventors have chosen to incorporate flexible bearing assemblies 132 on both sides of the second carriage. As indicated above, however, one of ordinary skill in the art will appreciate that variations can be made to the illustrated embodiment without deviating from the spirit of the invention. In particular, a linear motor could be used.

Mounted to the underside of rectangular structural member 122 of gantry 106 may be a thin sheet that occupies most of the region above the working region (i.e. the feed bed and build bed) in a manner which does not interfere with the motion of first carriage 126 and second carriage 128. This thin sheet may serve to catch any debris, dust, contaminants etc. that might be generated by actions taking place above the sheet, including motions of the first and second carriages. Although substantial efforts will likely be made to achieve and maintain clean operation of the various machine components, it still may be helpful to guard against debris, dust and contaminants that might be generated above the working region.

A fast axis motor 144 drives a cable 146 (FIG. 6) in alternating directions to move the printhead assembly 500 back and forth along the fast axis above the build bed 302. Opposing ends of the cable 146 are wrapped in opposite directions around a drum 148 that is coupled to the fast axis motor 144. Consequently, when the drum 148 rotates, a first portion of the drum feeds the cable 146 while a second portion of the drum takes up the opposing end of the cable. When the drum 148 rotates in the opposite direction, the first portion of the drum takes up the cable 146 and the second portion of the drum feeds the cable. Thus, rapid rotation of the drum 148 in alternating directions results in rapid movement of the printhead assembly 500 in opposing directions along the fast axis. The inventors appreciate that other, equivalent drive mechanisms could be substituted for the motor and drum drive without deviating from the spirit of the invention. In particular, a linear motor could be used.

In the illustrated embodiment, the printhead assembly 500 is mounted on the second carriage 128 by an air bearing 150 (FIG. 5) to reduce friction between the printhead assembly and the second carriage. In addition, the second carriage 128 is filled with an encoder strip 152 (FIG. 5) over which the printhead assembly 500 moves. A reader 153 (FIG. 5) in the printhead assembly 500 can determine the precise location of the printhead assembly with respect to the second carriage 128 and, thus, can determine the precise location of each of the nozzles or orifices 547 (FIG. 28) in the printhead assembly, based on the reading from the encoder strip 152. The printhead assembly 500 can use this information to trigger a dispenser, as opposed to strictly triggering the dispenser on a time-basis. For example, counting hardware or software can count how many encoder markings have been read since the previous dispense command or since some other reference, and based on that count can issue the next dispense command. By this technique, minor irregularities or non-uniformities in the velocity of the printhead assembly 500 along the fast axis of motion have no effect on the drop placement accuracy, because drops are not dispensed based on the presumed velocity of the printhead, but rather are dispensed based on actual position of the printhead. For example, if drops were dispensed based on the known angular position of a stepper motor or servomotor, as is done in many inexpensive ink-jet printers, that would still allow possible inaccuracies of drop delivery to occur based on slack, stretching, etc. of belts and cables which carry motion between the motor and the actual printhead. In the three-dimensional printing machine 100 of the present invention, all dimensions may be much larger than those of an ink jet printer, and so such errors could be magnified. Such errors can be eliminated by the use of an encoder strip.

Powder Bed Assemblies

The three dimensional printing machine 100 comprises a build bed in which the part is constructed. If powder is roller-spread, the machine may also comprise a feed bed that presents powder to a roller. Two different designs of powder bed are presented here, either of which could be used either as a feed bed or as a build bed. FIGS. 7–10 illustrate the first type of powder bed assembly and positioning system 200 of the present embodiment. The first powder bed assembly and positioning system 200 is generally made up of a first powder bed assembly 202, a first powder bed piston assembly 204 and a first powder bed motion controller 206. The first powder bed assembly and positioning system 200 is illustrated in this embodiment being used as the feed bed assembly, although it should be understood that this design could be used in either location. In this design, the first powder bed assembly and positioning system 200 is removable from the three-dimensional printing machine 100.

The first powder bed assembly 202 is mounted on the table-top 104 at a pair of opposing powder bed assembly tracks or guides 208. In the illustrated embodiment, the powder bed assembly guides 208 are mounted to the table-top 104 by a number of fasteners 210 extending through the table-top from below, and fastening to the powder bed guides. The first powder bed assembly 202 comprises a pair of opposing, lower walls 212 spaced apart from each other to engage with a corresponding one of the powder bed assembly guides 208, and the first powder bed assembly 202 can thus slide along the powder bed assembly guide 208 into and out of operating position. When the first powder bed assembly 202 is in the operating position, retention pins 214 can be inserted laterally through the powder bed assembly guide 208 and into the respective lower wall 212 to retain the powder bed assembly in its operating position.

The first powder bed assembly and positioning system 200 can be configured with contact sensors and alarms to confirm when the first powder bed assembly 202 is in the proper position for operation, and to notify the operator when the powder bed assembly is out of operating position. An individual of ordinary skill in the art, having reviewed this disclosure, will appreciate the many equivalent means for configuring and operating such sensors and alarms.

A separator structure 216 of the first powder bed assembly 202 divides the functioning, upper portion of the powder bed assembly from the structural, lower portion of the powder bed assembly. In the upper portion of the powder bed assembly, a perimeter wall 220 defines the perimeter of the functional portion of the first powder bed assembly 202. During operation, the perimeter wall 220 retains powder within its confines. A carrier plate 222 is closely retained within the perimeter wall 220, and supports the powder from below. Carrier plate 222 may be rectangular with rounded corners, or can have another shape. The carrier plate 222 is closely fitting with respect to the interior of perimeter wall 220 and is adapted to slide up and down in the perimeter wall 220 to move powder up or down. A piston opening 218 in the separator structure 216 allows the feed bed piston assembly 204 to engage the carrier plate 222 from below, while the separator structure still retains the carrier plate 222 so that the carrier plate cannot slide out of the bottom of perimeter wall 220. A bottom surface 224 of the carrier plate 222 engages the first powder bed piston assembly 204 during operation.

Figure 9:
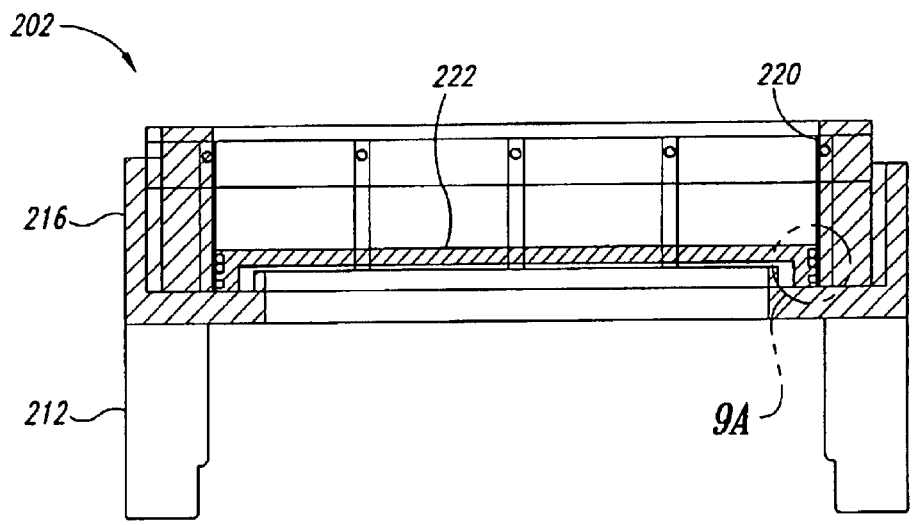
FIG. 9 is a cross-sectional elevation view of the powder bed assembly of FIG. 7, viewed along Section 9—9 of FIG. 8.
Figure 9A:
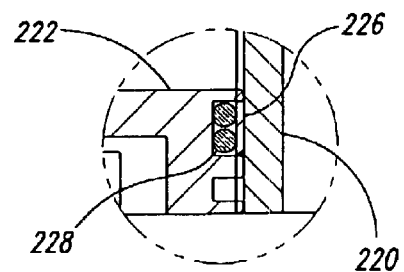
FIG. 9A is a magnified view of a portion of the powder bed assembly of FIG. 9.
Figure 10:
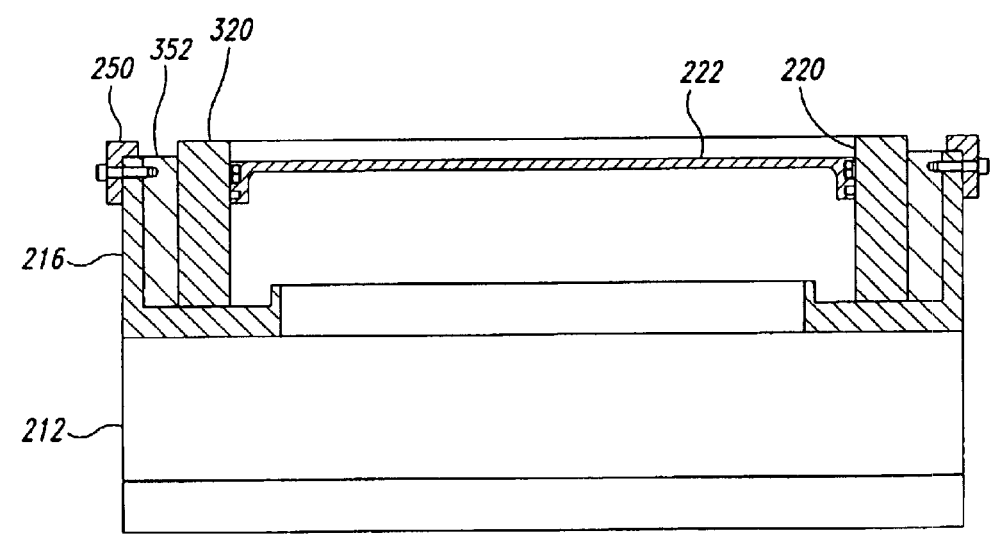
FIG. 10 is a cross-sectional elevation view of the powder bed assembly of FIG. 7, viewed along Section 10—10 of FIG. 8.

As best illustrated in FIG. 9A, the perimeter of the carrier plate 222 is fitted with an external, polymeric gasket 226 and a pair of internal O-rings 228. The polymeric gasket 226 can slide along the inner surface of perimeter wall 220 to prevent powder from escaping from the powder bed assembly 202 during use. The O-rings 228 can urge the polymeric gasket 226 against the inner surface of perimeter wall 220. The inventors appreciate that, after reviewing the present disclosure, one of ordinary skill in the art will appreciate that there are other, equivalent configurations and materials, such as a felt gasket, can be used to prevent powder from passing between the carrier plate 222 and the inner surface of perimeter wall 220. Likewise, the sealing means described in connection with the first powder bed assembly 202 can be interchanged with that described later in connection with the alternatively designed second powder bed assembly 302.

The top edges of perimeter wall 220 may form the surfaces upon which may bear sliders as later described, to help confine powder as powder is being rolled. Beyond the outer edges of the perimeter wall 220, there may be intermittent gaps all around the outer edges of the perimeter wall 220. These gaps are places where powder can drop into so as to be removed from the immediate work area during operation. On the sides, powder which spills out sideways during the rolling-spreading operation and which is not contained by the sliders 432 (FIG. 20) can fall off into those recesses. A still further outer siderail 250 may be provided which may bear rollers casters etc. such as those from the heater described later. The top surface of the illustrated perimeter wall 220 is a horizontal surface and so are the top surfaces of the illustrated siderails 250. The elevations of these two horizontal surfaces may or may not be identical. Options are discussed later in connection with roller assembly design.

As a help in contrasting the first powder bed assembly 202 with the second powder bed assembly 302, described later, it is helpful to point out that in the first powder bed assembly 202 there is only one perimeter wall 220, i.e., there is only one component against which the rounded-rectangle gasketed outer surface of the carrier plate 222 ever slides during its entire range of vertical motion.

Returning to FIG. 7, the illustrated powder bed piston assembly 204 is positioned between the lower walls 212 of the first powder bed assembly 202 and moves vertically to engage with, disengage from and change the vertical position of the carrier plate 222. The uppermost element of the first powder bed piston assembly 204 is a vacuum coupling 230 which can use a seal, such as an O-ring 232, to facilitate a vacuum seal between the vacuum coupling and the bottom surface 224 of the carrier plate 222. The vacuum coupling is shown disengaged from carrier plate 222. The vacuum coupling 230 can be configured—such as with ribs or other features—to support carrier plate 222 at multiple points within the vacuum region and thereby avoid causing deformation or deflection of carrier plate 222 when carrier plate is engaged with the vacuum coupling 230. The use of a carrier plate 222 with a flat bottom, together with vacuum coupling 230, means that it is easy to establish or break mechanical connection to facilitate removal and replacement of the first powder bed assembly 202 or second powder bed assembly 302. It also provides that establishment of the coupling is relatively insensitive to minor variations in the exact placement of the first powder bed assembly 202 or second powder bed assembly 302 onto the three-dimensional printing machine 100.

The first powder bed piston assembly 204 moves with respect to the first powder bed motion controller 206, which is mounted by fasteners 234 to the table-top 104. Thus, when the first powder bed piston assembly 204 moves with respect to the first powder bed motion controller 206, the vacuum coupling 230 moves with respect to the first powder bed 202 and table-top 104. A bellows 236 surrounds a rod 238, and is configured to allow the rod to extend and retract with respect to the first powder bed motion controller 206. The bellows 236 can prevent powder which might pass between the carrier plate 222 and the perimeter wall 220 from traveling to and interfering with the first powder bed piston assembly 204 or first powder bed motion controller 206.

The first powder bed motion controller 206 is mounted to the underside of the table-top 104, and controllably moves the rod 238 to ultimately change the position of the carrier plate 222 with respect to the first powder bed assembly 202. A motor 240 may be coupled by a bevel gear 242 to the rod 238, and is controllable from a motor control unit 244 to move the rod as desired. A vacuum line 246 provides a vacuum from a vacuum source 247 to the vacuum coupling 230, and a vacuum sensor 248 is operable to confirm that the proper amount of vacuum is provided to the vacuum coupling. The system can be configured to increase or decrease the vacuum as necessary, or to notify the operator if the vacuum is outside of acceptable operating parameters. The inventors appreciate that, after reviewing this disclosure, an individual of skill in the art will appreciate that there are other systems and methods for raising and lowering powder, which would be considered equivalent to that described and illustrated herein. The first powder bed assembly 202 is shown as being the feed bed assembly in three dimensional printing machine 100, but it should be understood that first powder bed assembly could be used as the build bed assembly instead of or in addition to its use as the feed bed assembly. If it is used as the feed bed, it can be filled with powder either in place on the machine or away from the machine in a separate location.

FIGS. 11–19 illustrate a more complicated embodiment of a second powder bed assembly and positioning system 300. This design of the second powder bed assembly 302 provides a tray subassembly that is smaller than the entire second powder bed assembly. Just as in the previously described first powder bed assembly, this second powder bed assembly 302 can be removed from the three-dimensional printing machine 100 and replaced. In addition, in this design the tray subassembly can be removed from the second powder bed assembly 302 and be replaced. The powder bed assembly and positioning system 300 is in large part equivalent to the first powder bed assembly and positioning system 200 described above and illustrated in FIGS. 7–10. The elements of the second powder bed assembly and positioning system 300 that differ from the first powder bed assembly and positioning system 200 are discussed in detail below. It can be assumed that the details of the second powder bed assembly and positioning system 300 not discussed below may be the same as or similar to those discussed above in connection with the first powder bed assembly and positioning system 200. Many of these differences are equivalent and/or interchangeable, and could work just as well on the second powder bed assembly and positioning system 300 as they do on the first powder bed assembly and positioning system 200. Accordingly, many of the following details can also be considered alternate embodiments of those described above.

The second powder bed assembly and positioning system 300 is generally made up of a second powder bed assembly 302, a second powder bed piston assembly 304 and a second powder bed motion controller 306. The second powder bed assembly 302 rests on a pair of opposing global guides 308. Similar to the first powder bed assembly 202, the second powder bed assembly 302 can be slid into and out of the three-dimensional printing macine 100 when desired, and can be configured with position sensors and retainer members to confirm that the powder bed is in the proper operating position and stays in the operating position. The second powder bed assembly 302 comprises a local guide 309 which engages with a tray subassembly 311. Tray subassembly 311 comprises a perimeter wall 320 that surrounds carrier plate 322.

Figure 11:
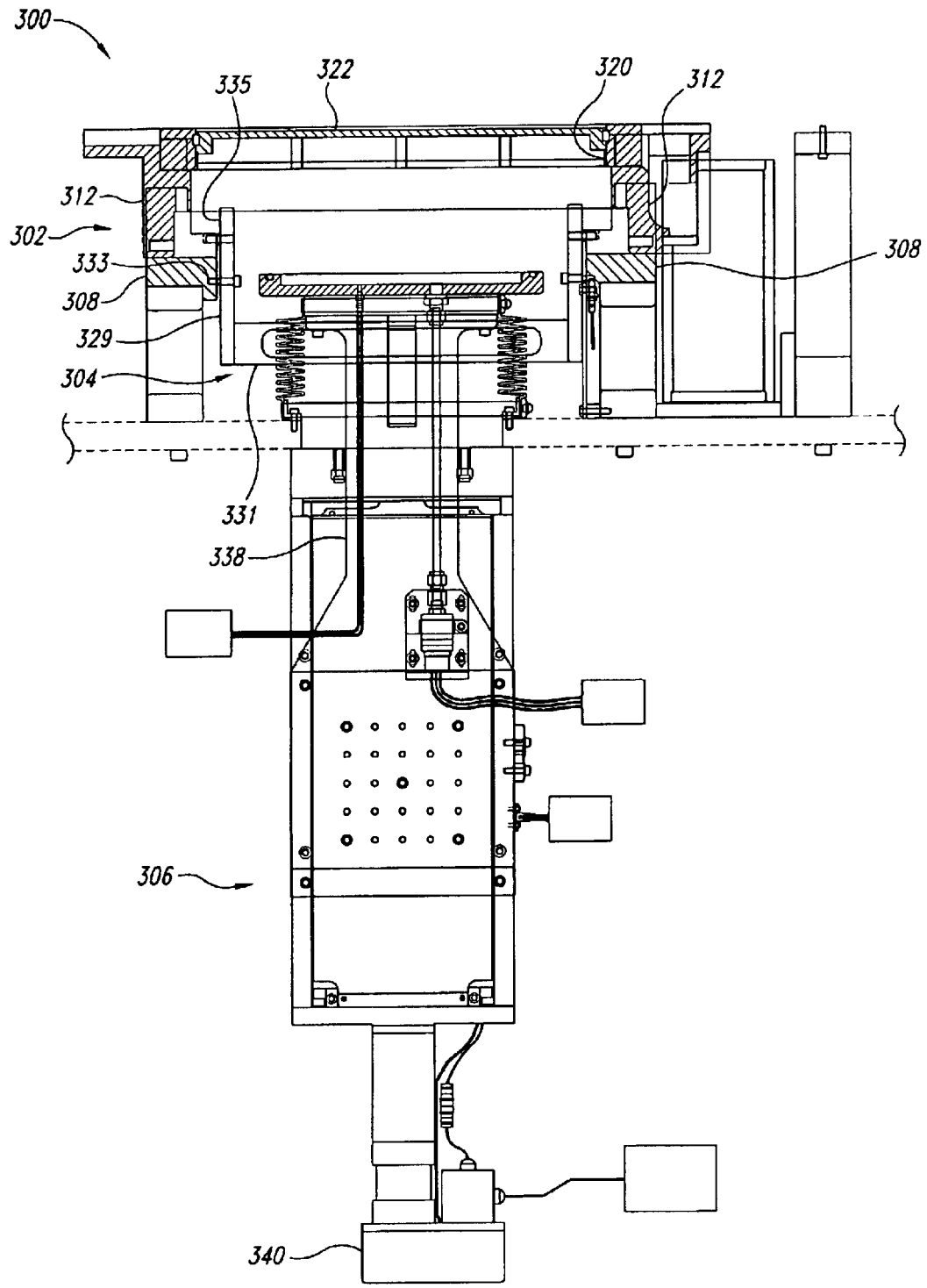
FIG. 11 is an elevation view of another powder bed assembly and positioning system from the three-dimensional printing system of FIG. 1, the upper portion of which is illustrated in cross-section.
Figure 12:
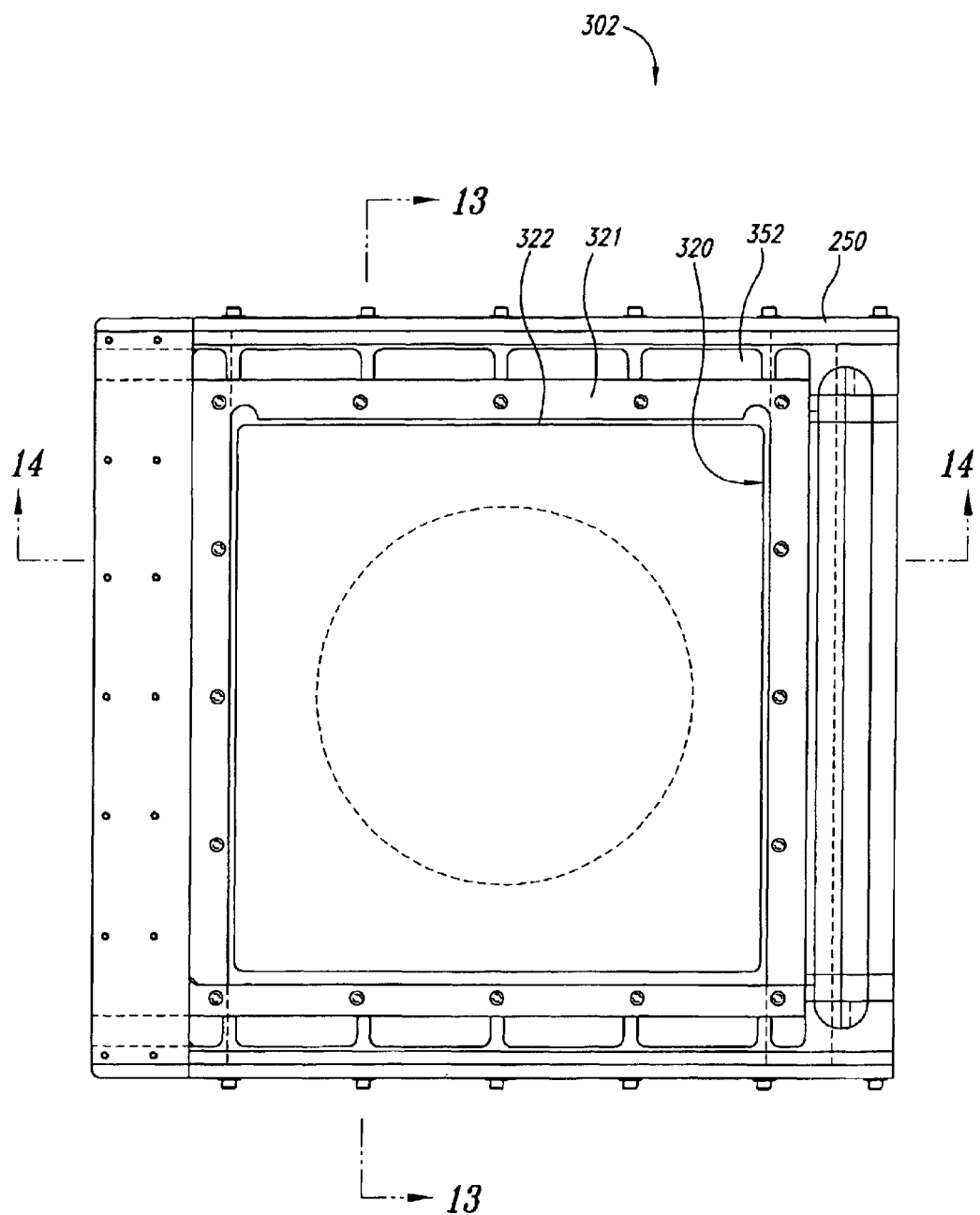
FIG. 12 is a plan view of the powder bed assembly of FIG. 11.
Figure 13:
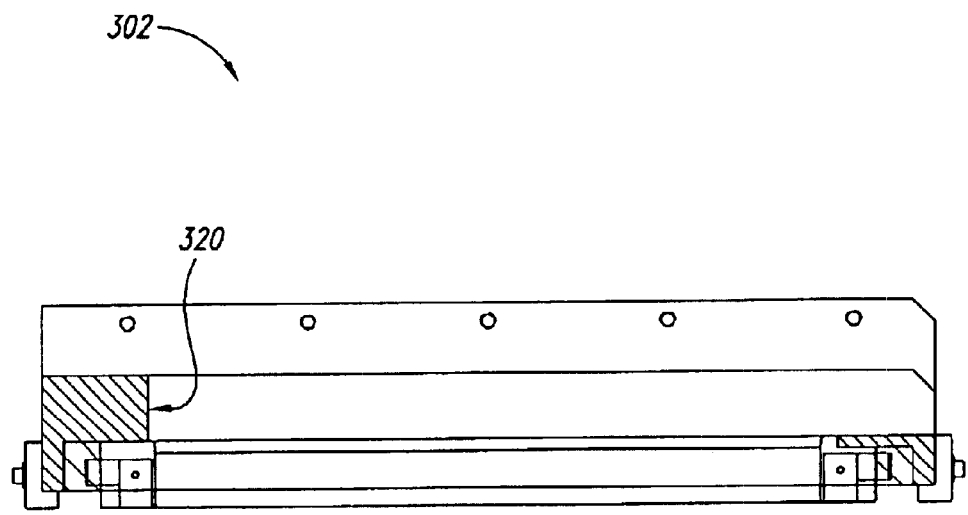
FIG. 13 is a cross-sectional elevation view of the powder bed assembly of FIG. 11, viewed along Section 13—13 of FIG. 12.
Figure 14:
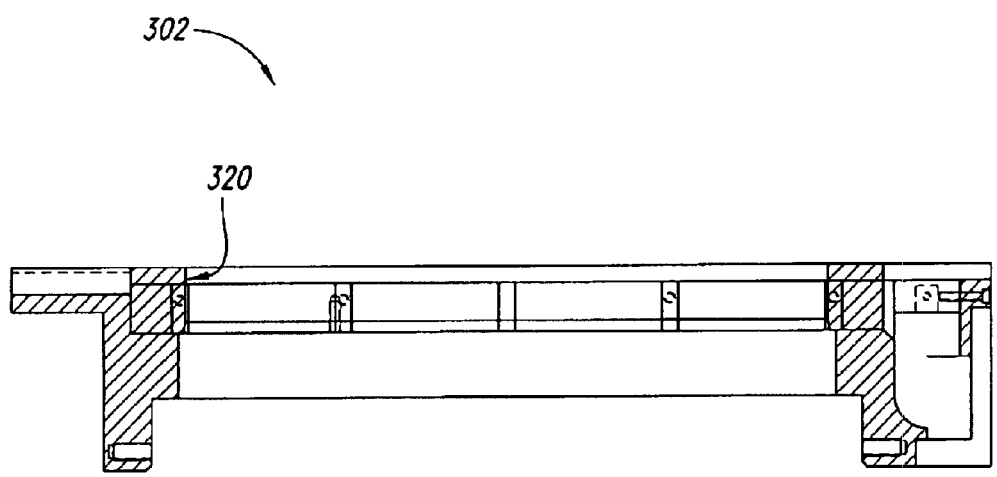
FIG. 14 is a cross-sectional elevation view of the powder bed of FIG. 11, viewed along Section 14—14 of FIG. 12.
Figure 15:
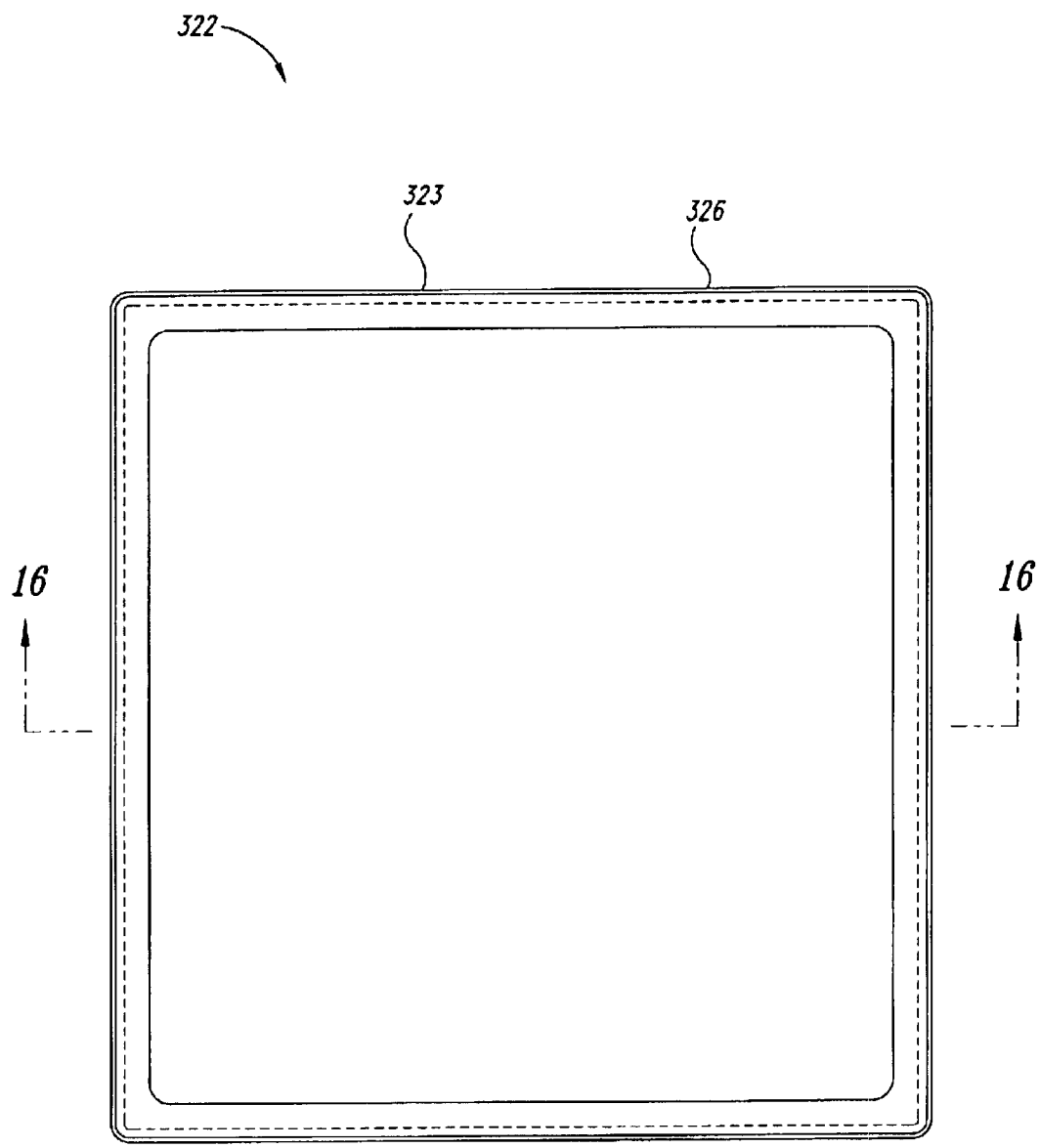
FIG. 15 is a plan view of a tray subassembly from the powder bed assembly of FIG. 11.

In the illustrated embodiment, the perimeter wall 320 of the tray subassembly 311 is much shorter than the perimeter wall 220 of the first powder bed assembly 202, in the vertical direction as viewed in FIG. 11. A carrier plate 322 closely conforms to the inner surface of perimeter wall 320, and is controlled by the second powder bed piston assembly 304 to move the carrier plate 322 vertically with respect to the perimeter wall 320 and the rest of the second powder bed assembly 302.

As illustrated in FIGS. 16 and 17, a gasket 326 extends around the perimeter of the carrier plate 322. The gasket 326 extends around the perimeter of the carrier plate 322 within a groove 323, and meets at its opposing ends in a scarf joint 327. The scarf joint 327 may allow the gasket 326 to move, expand and contract lengthwise, without the material of the gasket buckling. The illustrated gasket is made from polymer in the case illustrated here involving a scarf joint, but in general the gasket could instead be made of felt or any of the materials previously described in connection with the first powder bed 202 for either powder bed assembly.

Figures 18, 19:
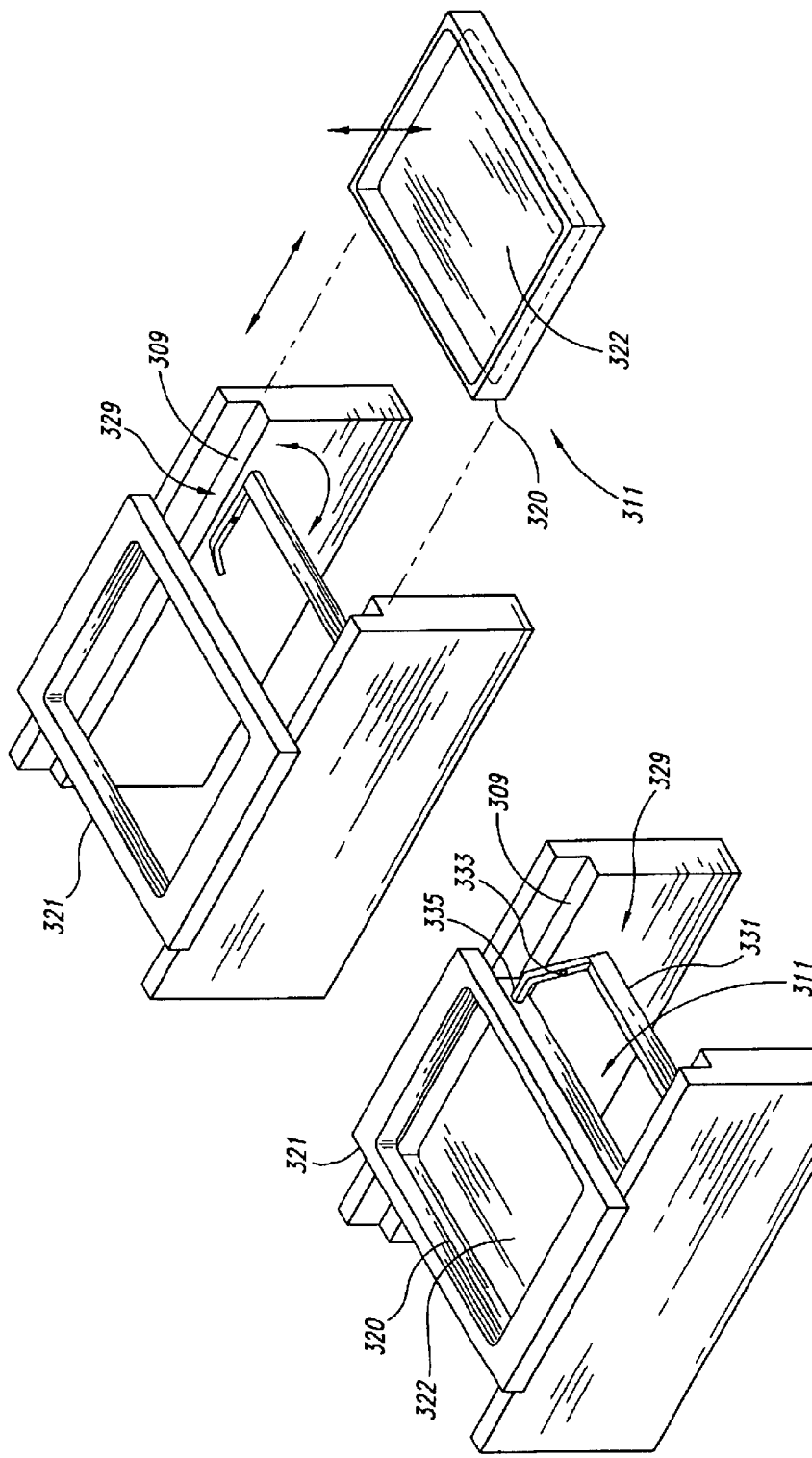
FIG. 18 is an isometric view schematically illustrating the powder bed assembly of FIG. 11.
FIG. 19 is an isometric view illustrating the tray subassembly removed from the powder bed assembly of FIG. 11.

As illustrated in FIGS. 11, 18 and 19, the tray subassembly 311 is held in the operating position by a release lever 329, which in the illustrated embodiment is a handle 331 that is operable to retain or release the tray subassembly 311 in the second powder bed assembly 302. A pin 333 extends through the release lever 329 at a point centrally located between the handle 331 and an operating arm 335 opposite the handle. The pin 333 engages the adjacent structure in the second powder bed 302, and allows the release lever 329 to pivot with respect to the second powder bed 302.

When the handle is in the downward-most position, as illustrated in FIG. 18, the operating arm 335 of the release lever 329 is positioned above the bottom edge of the tray subassembly 311. As a result, the tray subassembly 311 is locked in its operating position. However, when the handle 331 is raised, the release lever 329 pivots about the pin 333, and the operating arm 335 rotates downward to a point where it is below the bottom edge of the tray subassembly 311. In this position, the tray subassembly 311 is free to be removed from the powder bed assembly 302, as illustrated in FIG. 19. The weight of the handle 331 causes the release lever 329 to automatically return to the locked position when the operator lets go of the handle. The handle 331 can be configured with a sensor and/or alarm to register when the handle is locked or unlocked, and to notify the operator of the same.

The second powder bed piston assembly 304 and the second powder bed motion controller 306 of the second powder bed assembly 300 are structurally and functionally very similar to those in the first powder bed assembly and positioning system 200. One exception, however, is that the second powder bed motion controller 306 can utilize a direct linkage between a motor 340 and a piston rod 338, as opposed to incorporating the bevel gear 242. In the case of the first powder bed 302, the carrier plate 322 typically moves only downward during operation of the three-dimensional printing machine 100. Consequently, the force required to move the second powder bed assembly 302 is typically less than that required to move the first powder bed assembly 202. Thus, the bevel gear 242—which increases the force that the motor 240 exerts on the first powder bed piston 204—is not necessary in the illustrated second powder bed assembly and positioning system 300.

The tray subassembly 311 contains a carrier plate 322, and a tray subassembly perimeter wall 320 that closely fits around the carrier plate. There may also be a gasket 326 between the carrier plate 322 and the tray subassembly perimeter wall 320. The tray subassembly 311 may be only slightly larger in its horizontal dimensions than the carrier plate itself.

During use, as the carrier plate 322 executes its full range of vertical motion, at lower elevations the carrier plate slides with respect to the tray subassembly perimeter wall 320, and at higher elevations the carrier plate slides with respect to the feed bed assembly perimeter wall 321. The inside surfaces of these two perimeter walls, against which the carrier plate slides, have closely matching shape and dimension and may be accurately lined up with each other. The alignment is achieved in part by local guides 309 within the powder bed assembly (which are different from the global guides 308, which control the placement of the powder bed assembly relative to the overall three-dimensional printing machine 100).

The three-dimensional printing machine 100 may include sensors to detect both the presence of the overall powder bed assemblies and the presence of the tray subassembly 311 within the second powder bed assembly 302, and possibly the position of the handle 329 as well. These sensors can communicate with an alarm or can act to shut off or disable certain machine functions.

It is worth pointing out that although the illustrations show the feed bed as being the simpler first powder bed assembly and positioning system 200 and the build bed as being the more complicated second powder bed assembly and positioning system 300 featuring the removable tray subassembly 311, either the feed bed or the build bed could be either design of powder bed assembly in any combination.

The second powder bed assembly 302 has all of the same overall features as the first powder bed assembly 202 and it is similarly possible to remove and replace the entire build bed assembly by sliding it out on the tracks to the side of the machine, such as for changing over from one powder to another or doing major cleaning of the machine. This would certainly be done occasionally. However, then there is another capability of the second powder bed assembly and positioning system 300.

The first powder bed assembly 202 and/or the second powder bed assembly 302 may be removed and replaced after manufacturing one set of parts and before manufacturing another set of parts. The easy replaceability of the powder bed assemblies also permits easy changeover from one materials system to another. It may be desirable to use the three-dimensional printing machine 100 for more than one type of powder. For example, within the medical field it may be desirable to use different families of powder materials for different bone substitute products, and for still other categories of medical products it may be desirable to use still other powder materials. The use of removable powder beds means that the feed bed (shown in the illustrated embodiment as 202) and the build bed (shown in the illustrated embodiment as 302) can be cleaned and/or filled with a different powder material outside the machine, where cleaning is easier. There may be powder beds dedicated to particular materials, and the powder beds may simply be swapped out as part of a changeover of the machine from one powder material to another.

If the first powder bed assembly 202 and the second powder bed assembly 302 are dedicated to individual powders, then changeover from one powder to another is fairly quick (e.g., remove old beds, clean loose powder from working areas of machine, such as by vacuum, wipe working areas of machine especially datum plane, clean roller, and then install new beds).

The tray subassembly 311 would be removed and replaced far more often than the second powder bed assembly 302 as a whole. The tray subassembly 311 would be removed and replaced for each individual print job, which could be more than once a day. In contrast, the powder bed assemblies as a whole might be removed and replaced only for changeover from one powder to another or for major cleaning of the machine. It can be appreciated that changeout of a tray subassembly is easier than changeout of an entire powder bed assembly. A further advantage of changeout of either a tray subassembly 311 or a powder bed assembly is that for some circumstances of three-dimensional printing, it is advisable to let the printed object remain in its build bed to finish drying out for some period of time after completion of three dimensional printing, before the unprinted powder is removed. The replaceability of the tray subassembly 311 or the first powder bed assembly 202 allows this waiting and drying to occur without delaying the use of the three-dimensional printing machine 100 for its next job. Furthermore, if it is desired to perform drying at an elevated temperature before the unprinted powder is removed, the replaceability of the second powder bed assembly 302 or tray subassembly 311 allows this drying to be done away from the three-dimensional printing machine 100 without impacting the operation of the machine. Also, the replaceability of the first powder bed assembly 202 or its tray subassembly (if it has a tray subassembly) allows the supply of powder to be loaded (including tasks such as smoothing the powder) without using operating time of the machine.

Figure 2:
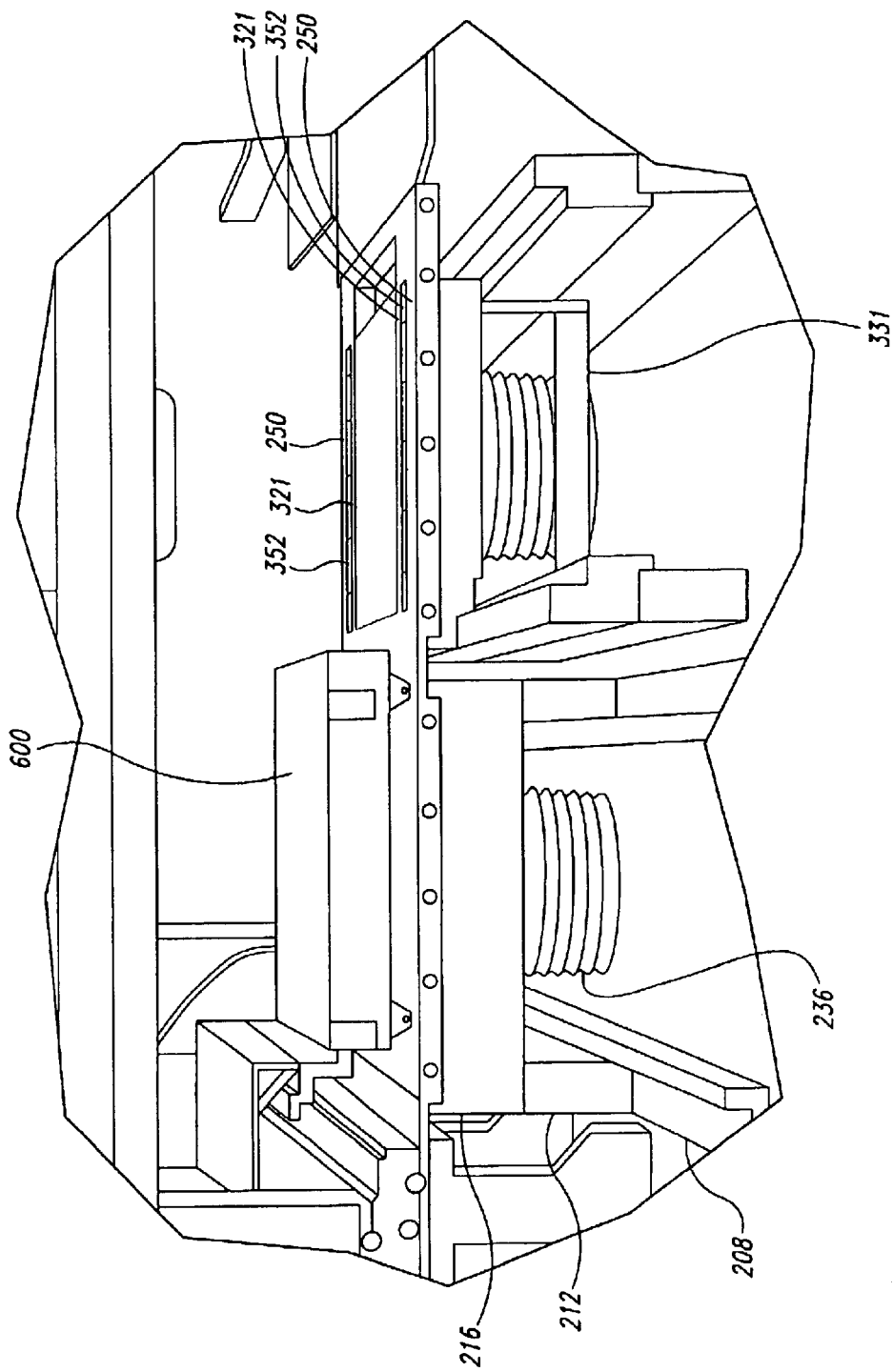
FIG. 2 is an enlarged isometric view of a portion of the three-dimensional printing system of FIG. 1, viewed from slightly above the operating plane.
Figure 3:
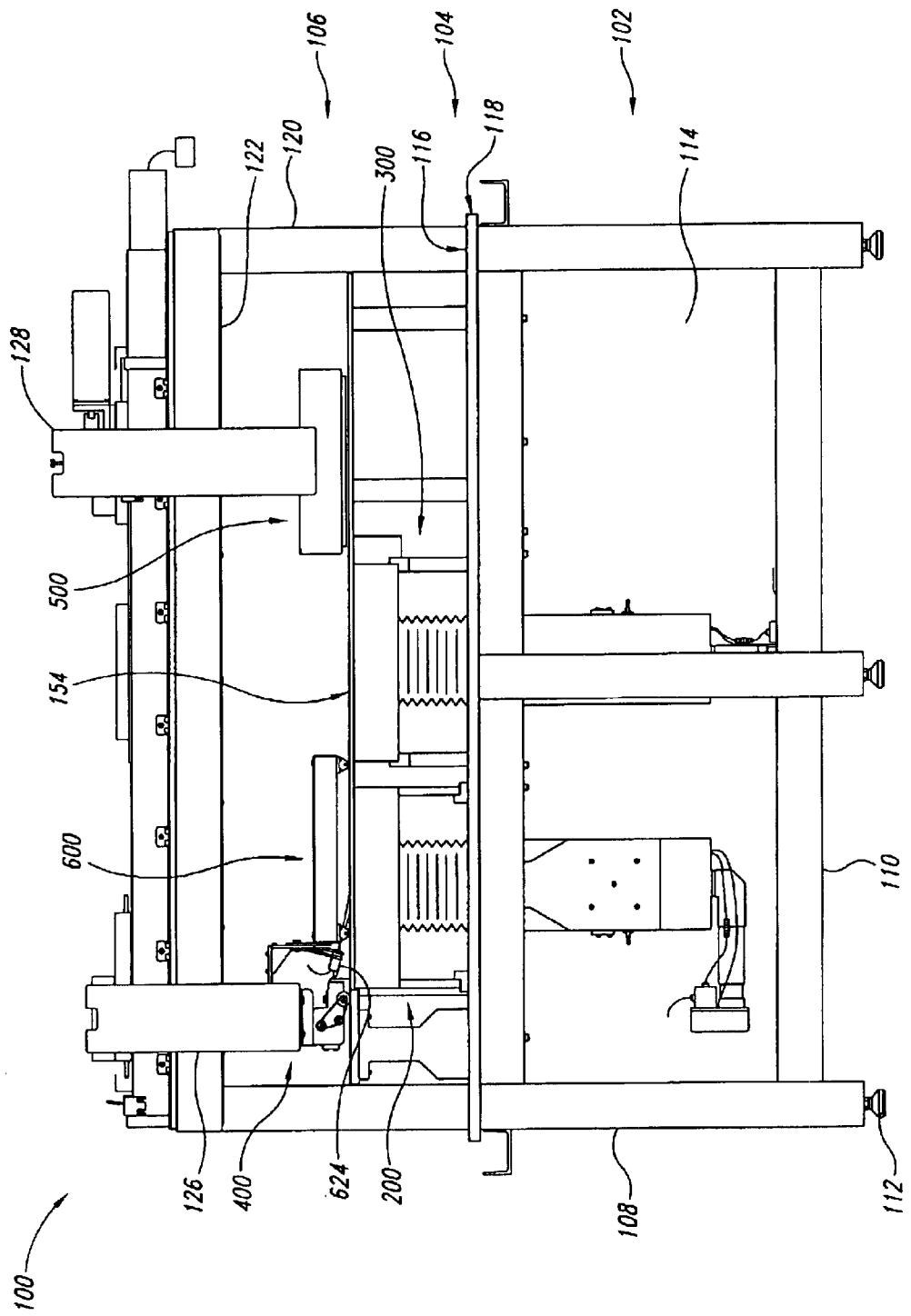
FIG. 3 is an elevation view of the three-dimensional printing system of FIG. 1.

As best illustrated in FIG. 2, a pair of opposing siderails 250 extends along the three-dimensional printing machine 100 on opposing sides of the powder beds. The siderails 250 run in the direction of the slow axis. As shown, the siderails 250 are separated from the perimeter walls 220 and 320 by channels or gaps 252 into which excess powder can fall, thereby minimizing the amount of powder reaching the siderails 250. Each of the siderails 250 is positioned slightly outside of the perimeter walls 220 and 321. The siderails 250 in the illustrated embodiment can be flat on their top surfaces, so that complementary wheels on the heater assembly 600 and the roller assembly 400 can roll along the siderails during operation (as discussed below). In addition (as also discussed below), the sliders 432 attached to the roller assembly 400 also can travel along the tops of the perimeter walls 220 and 321 to prevent powder which may be pushed out of the powder beds 202, 302 by the roller 402 from reaching the siderails 250. An individual of ordinary skill in the art, having reviewed the present disclosure, will appreciate that there are many equivalent structures that can be substituted to perform these functions. In addition to powder control by structures such as sliders described later, it can be appreciated that during roller spreading it is possible for powder particles to become airborne and thereby spread elsewhere in the three-dimensional printing machine, which can eventually interfere with proper operation of various components. It is believed that rolling of components on particle-coated surfaces rather than on clean surfaces is a source of positional error and other problems in three-dimensional printing machines. Accordingly, it is also possible to create localized airflow, which should help prevent airborne particles from migrating to other parts of the three-dimensional printing machine 100. This airflow can be directed into the gap or channel 252. It can be created by suction into gap or channel 252 or by an air knife (a jet which is narrow in one direction and long in another direction) directed into gap or channel 252. Powder-laden air that is received therein would have to be filtered or removed from the machine to complete the capture of those airborne powder particles.

For either design of powder bed assembly 202 or 302, the carrier plate 222, 322 may comprise recesses or wells in its top surface to serve as places for collection of slurry carrier liquid which percolates downward through the deposited powder if slurry deposition of powder layers is used. With slurry deposition of powder layers, it would also be possible that the carrier plate 222, 322 be provided with holes or porosity for drainage of carrier liquid thrererthrough. Such drainage could be assisted by vacuum or suction provided either by a dedicated vacuum or suction system, or by the vacuum system which is used for the vacuum gripping at the underside of the carrier plate.

Roller Assembly

Figure 20:
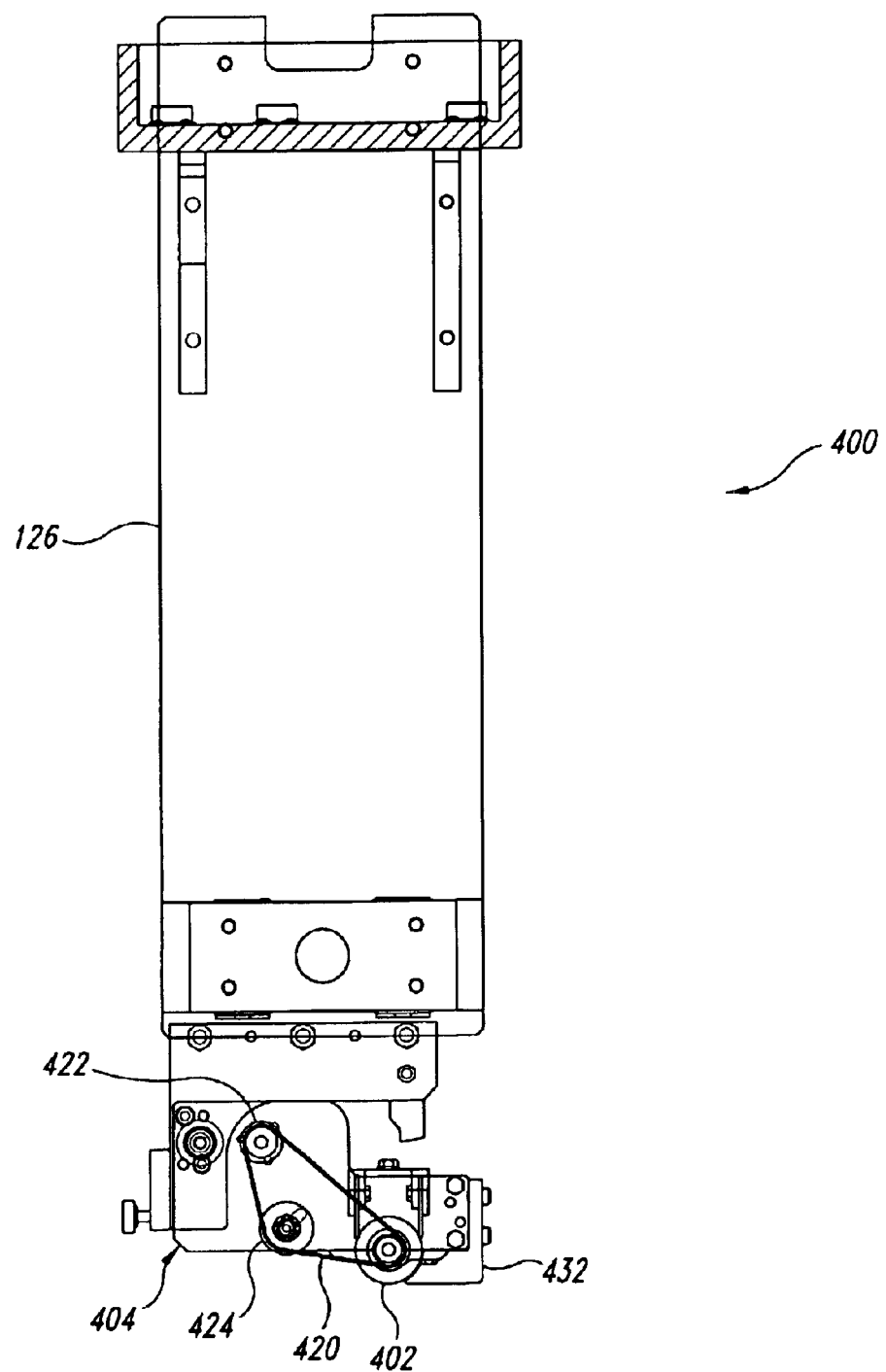
FIG. 20 is a left end view of a roller assembly from the three-dimensional printing system of FIG. 1.

FIGS. 20–23 illustrate a roller assembly 400 according to this particular embodiment of the present invention. The roller assembly 400 is mounted to the first carriage 126, as illustrated in FIG. 20. Accordingly, the roller assembly 400 moves with the first carriage 126 as the first carriage moves along the length of the three-dimensional printing system 100.

An elongated roller 402 is mounted in an elongated head assembly 404, and is free to rotate about an axis of rotation 406 (FIG. 21) with respect to the head assembly. The roller 402 can be controlled to rotate in either or both directions, or to remain in a fixed orientation, with respect to the head assembly 404. If the roller 402 is controlled to rotate in the direction of travel, the roller can either rotate at the same speed as the surface it is rolling over (i.e. with no relative movement therebetween), or can rotate faster or slower than the rate of travel. In addition, the roller can be controlled to change its speed and/or direction of rotation during operation, as desired.

The roller 402 has an enlarged, cylindrical operating surface 408 that extends along substantially the entire length of the illustrated roller. At opposing ends of the roller 402, a neck 410 (FIG. 21) of reduced diameter engages an endplate 412 in the head assembly 404. A bearing or other feature may be positioned between the engagement surfaces of the neck 410 and the endplate 412 to facilitate rotation of the roller 402 with respect to the endplate.

As best illustrated in FIGS. 2 and 4, the roller 402 is long enough to extend widthwise across the first and second powder beds 202, 302, so that the roller can spread powder from the feed bed across the surface of the build bed. There are at least two possibilities for maintaining the vertical elevation of the roller and thereby the thickness of the layer of spread powder. One possibility is that the roller 402 rolls on the siderails 250, maintaining a constant elevation with respect to the tops of the first and second powder beds 202, 302, sometimes referred to as the datum plane 154 (FIG. 2). The top of the siderails 250 can be level with the top of the second powder bed 302 (top of perimeter wall 321), or can be spaced above the top of the build bed to create a minimum layer thickness. If the roller rolls along the siderails and the powder layer thickness is defined by the inequality between the elevation of the siderails 250 and the tops of perimeter walls 220 or 321, it is possible for the elevation of the siderails to be approximately 0.005 inch (127 microns) higher than the elevation of the tops of perimeter walls 220 or 320. In this strategy, the roller does not contact the top of perimeter wall 220 or 320 during powder spreading; instead it rolls on siderails 250 which are further from the powder bed assembly and can be at their own vertical elevation. In this instance it may be useful to employ methods to limit the migration of loose powder, such as sliders 432 and airflow patterns, to keep the siderails 250 relatively free of powder. Brushes or similar features may also be used. When the roller 402 moves along the siderails 250 spreading powder, the thickness of the powder layer can be controlled by the height of the siderails 250 above the second powder bed 302, and by the distance between the roller 402 and the siderails. As discussed below, the datum plane 154 may be used by several elements of the three-dimensional printing machine 100 to determine the relative height of the element with respect to the powder in the beds.

It is also possible that the height of the roller 402 is not determined by any rolling action on siderails 250 or other components in the vicinity of the first and second powder beds 202, 302 but rather is determined to the position of the motion system relative to tracks 130 on the gantry 106. In this strategy also the roller 402 does not contact the top of the perimeter wall 220 or 320. A small gap such as 0.005 inch (127 microns) may be maintained between the roller 402 and the perimeter wall 220, 320 of the beds. In such a case a gap may also be maintained between the roller 402 and the siderails 250. It is possible that such a system provides more consistent powder layer thickness than a system whose vertical elevation is determined from a local surface that is subject to the presence of powder that may alter a sensed elevation. It is also possible that the existence of a gap between the roller 402 and other solid surfaces is helpful for enabling the roller to be kept rotating at times when rolling is not being performed, which is helpful when a roller heater is being used.

In such a system, it is possible that the roller assembly 400 in the vicinity of the roller 402 may have a feature to permit the vertical adjustment of the elevation of the roller assembly. The roller assembly 400 may be pivotably movable with respect to the carriage 126 or upper structure that is connected to the rails, so as to cause adjustment of the vertical position of the roller 402. A possible design for accomplishing this is that such adjustment feature have a stop in such a way that the roller assembly 400 rests on the stop to determine its elevation by limiting its downward motion, but that the roller assembly be unrestrained against upward motion (at least within a defined range). The exact effective position of the stop, for determining the roller 402 location in its vertically downmost position resting against the stop, may be determined by shims. It may be useful to provide two such stops, one on each side of the beds. The ability for unrestrained upward motion within a defined range will allow the roller assembly 400 to be better accessed for cleaning and other maintenance operations. It can also provide a degree of protection of parts against major damage in the event of the roller 402 striking something during rolling.

The operating surface 408 of the roller 402 can be polished chrome and the siderails 250 can be Teflon, so the roller is able to freely slide or roll along the siderails without significant resistance due to friction. The inventors appreciate that there are many equivalent structures and materials for performing these functions, variations that do not deviate from the spirit of the present invention.

Figure 21:
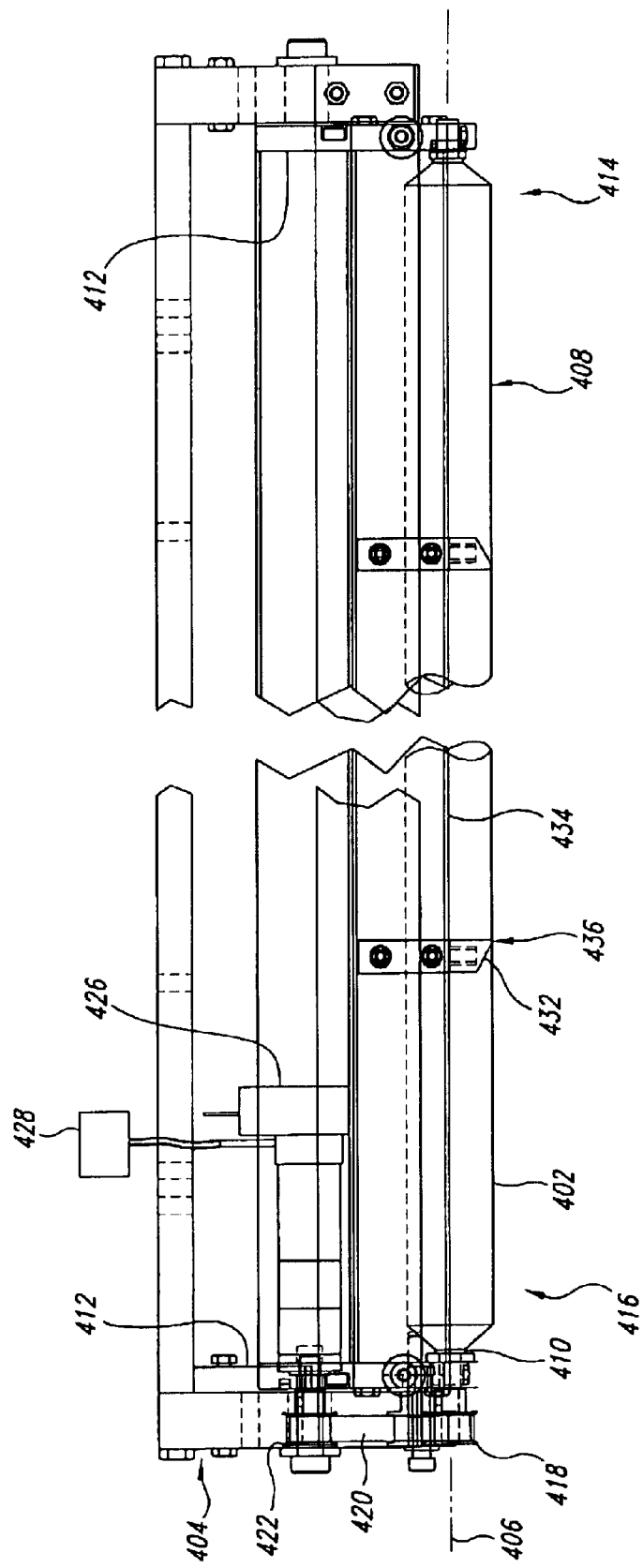
FIG. 21 is an elevation view of the roller assembly of FIG. 20.
Figure 22:
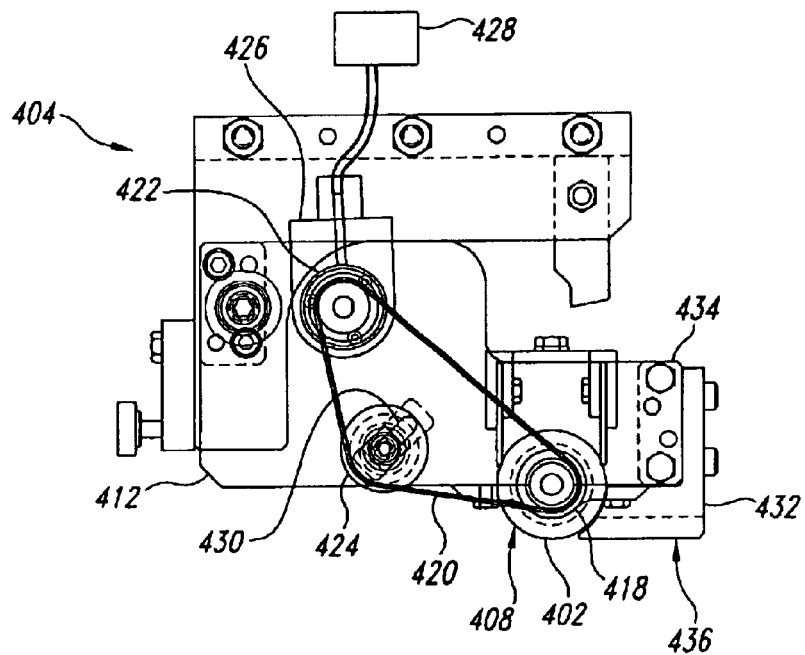
FIG. 22 is an enlarged left end view of a portion of the roller assembly of FIG. 20.
Figure 23:
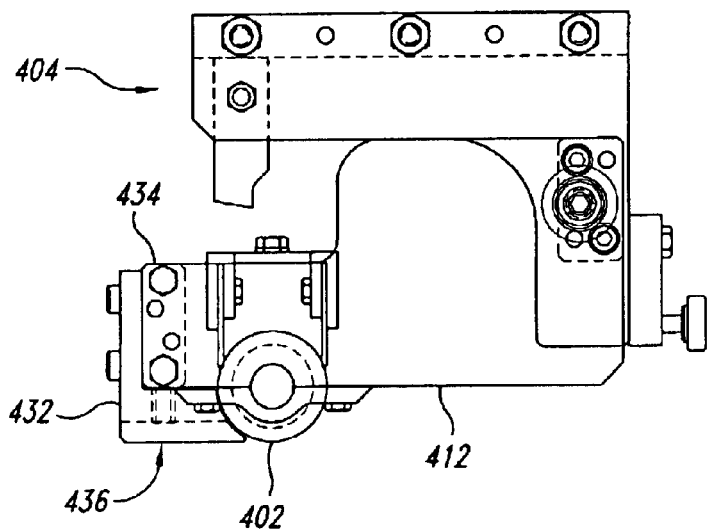
FIG. 23 is a right end view of the portion of the roller assembly of FIG. 22.
Figure 24:
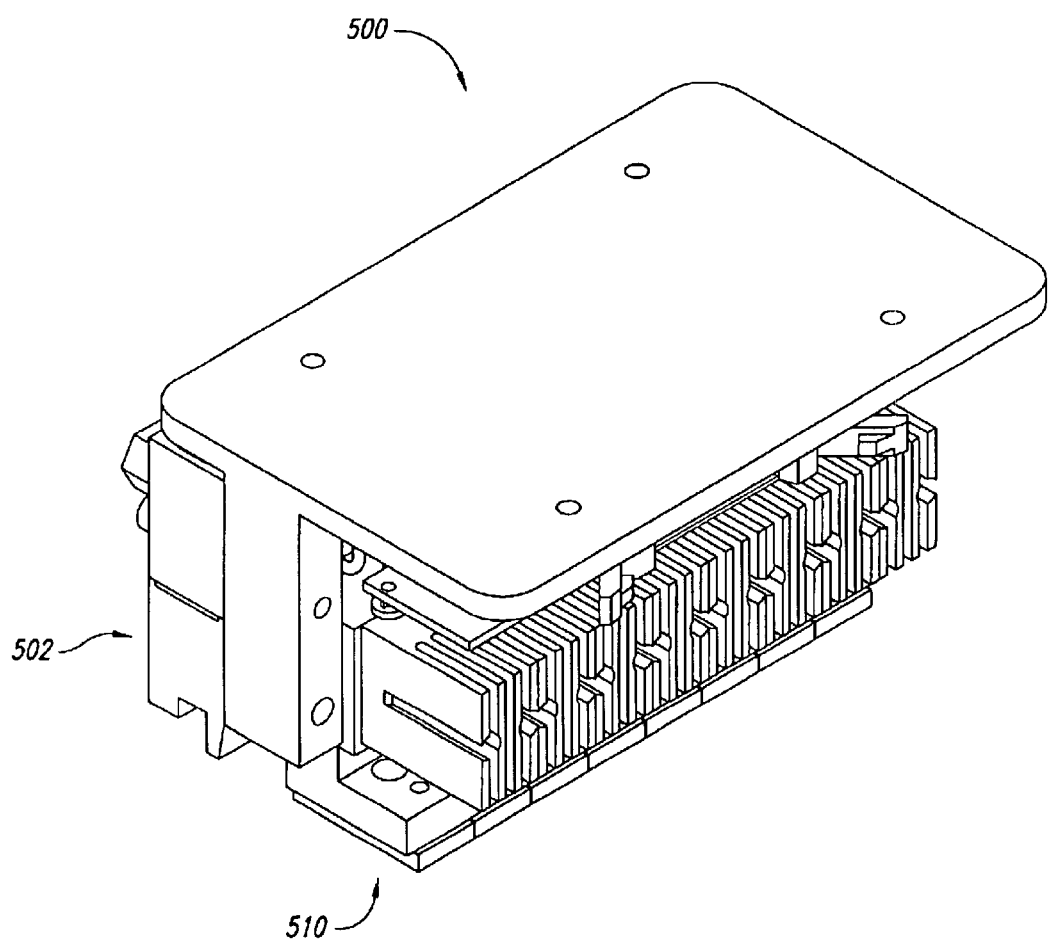
FIG. 24 is an isometric view of a printhead of the three-dimensional printing system of FIG. 1.

As best illustrated in FIG. 21, a first end 414 of the roller 402 is engaged with the corresponding endplate 412 to rotate freely with respect to the endplate. An opposing second end 416 of the roller 402 is configured to drive the roller's rotation. To that end, on the outside of the endplate 412 on the second end 416 of the roller 402, a pulley 418 is coupled between the neck 410 of the roller and a belt 420 that is controllable to rotate the roller. As best illustrated in FIG. 22, the belt 420 is engaged not only with the pulley 418, but also with a drive pulley 422 and a tensioning pulley 424. The drive pulley 422 is coupled to a drive motor 426, which is in turn coupled to a controller 428 to allow the operator to selectively control the direction and rate of rotation of the roller 402 with respect to the head assembly 404.

The tensioning pulley 424 is engaged with the endplate 412 at an elongated groove 430, and is adjustable along the length of the elongated groove to increase or decrease the tension in the belt 420, as generally understood in the relevant art.

Spaced apart from each other along the length of the head assembly 404 in the direction of the axis of rotation 406 are a pair of sliders 432, which are mounted to a faceplate 434 on the head assembly. As illustrated in FIG. 21, an extreme lower edge 436 of the slider 432 can align vertically with the bottom of the operating surface 408 of the roller 402, or with the top of perimeter wall 220, 321. The two sliders 432 may prevent powder from escaping to the lateral sides as the powder is moved from the first powder bed 202 to the second powder bed 302. The inventors appreciate that, depending on the particular system, the size, spacing and positioning of the sliders 432 could vary dramatically without deviating from the spirit of the invention. For example, the sliders 432 can be coupled to the head assembly 404 in a manner that allows the sliders to move up and down, and can be biased downward to maintain contact between the sliders and the siderails 250. Similarly, the pair of sliders 432 could be replaced by more or fewer sliders without deviating from the spirit of the invention.

Printhead Assembly

Figure 25:
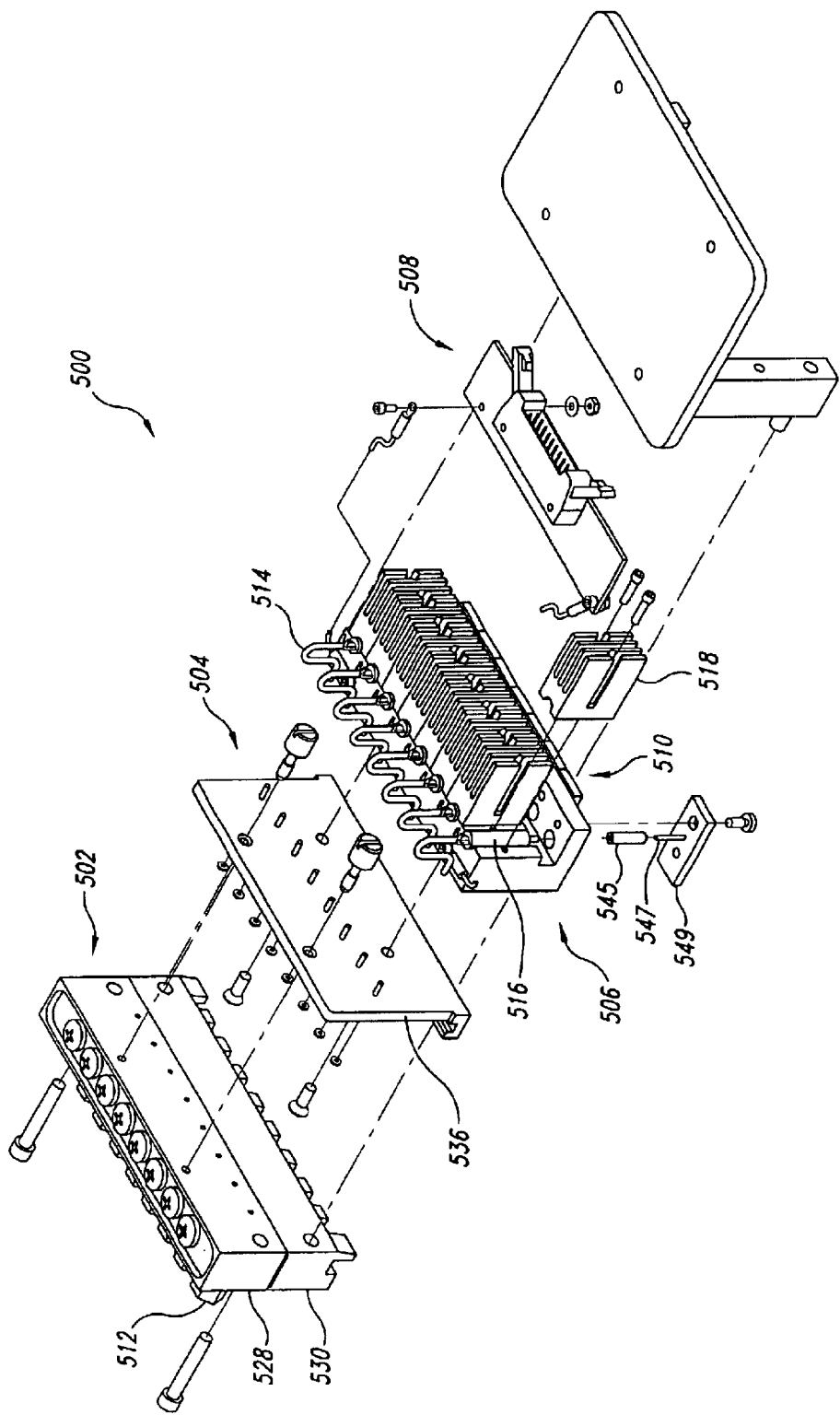
FIG. 25 is an exploded isometric view of the printhead of FIG. 24.
Figure 26:
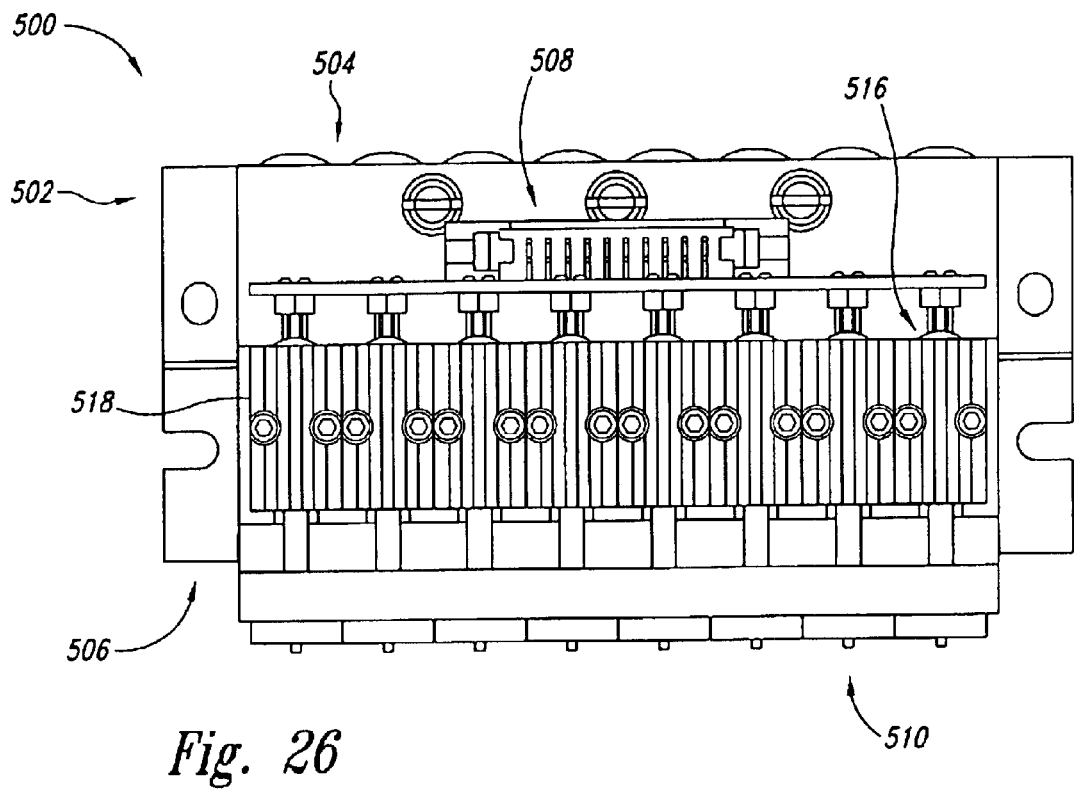
FIG. 26 is an elevation view of the printhead of FIG. 24.

FIGS. 24–27 illustrate a printhead assembly 500 according to this particular embodiment of the present invention. As best illustrated in FIG. 25, the printhead assembly 500 generally incorporates a supply assembly 502, a plate assembly 504, a support frame assembly 506, an electrical connector assembly 508, and an orifice plate assembly 510. The supply assembly 502 has a number of fittings 512 through which fluids, such as binder, are introduced into the printhead assembly 500. In the illustrated embodiment, the supply assembly 502 has eight fittings 512, although this number can be varied without deviating from the spirit of the invention. The inventors also appreciate that the printhead assembly 500 can incorporate manifolds in place of separate fluid flow channels, without deviating from the spirit of the invention.

In summary, as discussed in more detail below, the supply assembly 502 provides fluid to the adjacent plate assembly 504, which is abutted against the supply assembly during use. Opposite the supply assembly 502, the plate assembly 504 is connected by tubing 514 to a number of solenoid valves 516, which are housed in the support frame assembly 506. During operation, the solenoid valves 516 dispense the fluid through the orifice plate assembly 510, toward the top surface of the second powder bed 302. A number of fin members 518 are mechanically and thermally coupled to the solenoid valves 516 and may help control the temperature of the solenoid valves.

Figure 29:
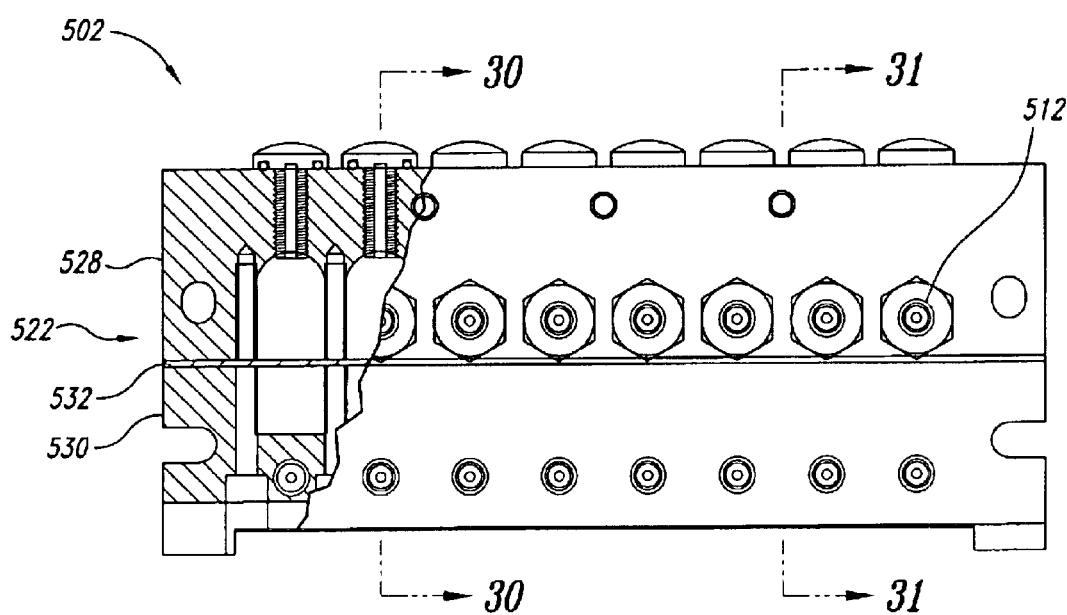
FIG. 29 is an elevation view of a supply assembly from the printhead of FIG. 24, shown in partial cross-section.
Figure 30:
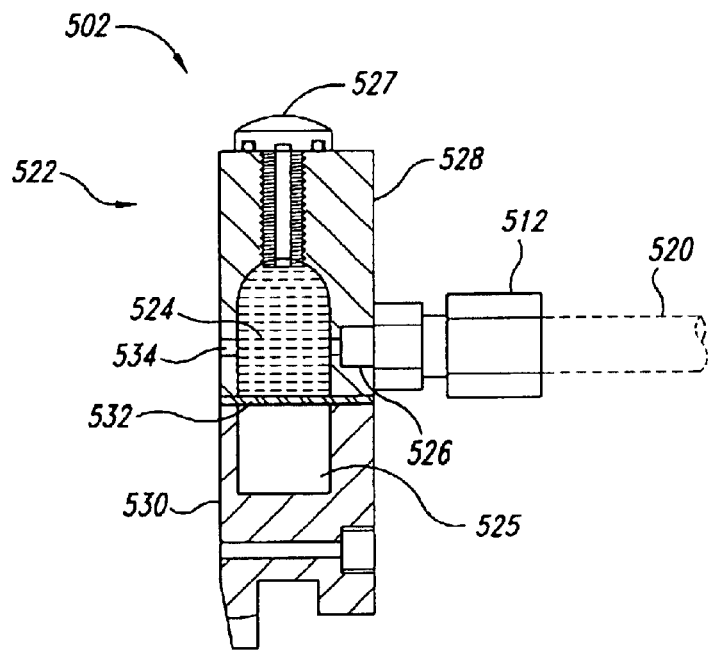
FIG. 30 is a cross-sectional view of the supply assembly of FIG. 29, viewed along Section 30—30.
Figure 31:
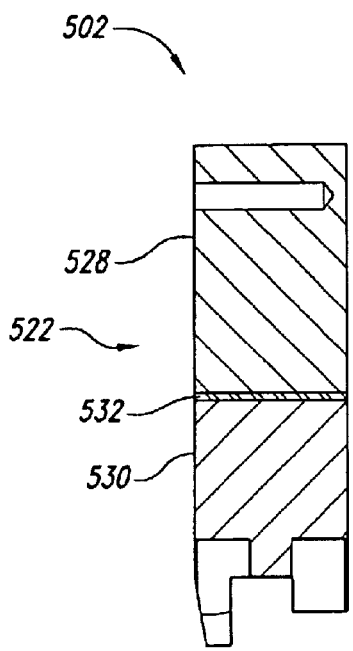
FIG. 31 is a cross-sectional view of the supply assembly of FIG. 29, viewed along Section 31—31.

FIGS. 29–31 further illustrate the supply assembly 502. The body 522 in the illustrated embodiment is made from two separate parts, an upper portion 528 and a lower portion 530. An upper chamber 524 is located within the upper portion 528 of the body 522, while a complementary lower chamber 525 is located in the lower portion 530 of the body. Upper chamber 524 can be vented, to release possible gas bubbles, by screw vent 527 which may have a hollow center or milled slot communicating with the outside when the screw vent is not tightened, and may have an O-ring to seal when the screw vent is tightened. As illustrated in FIG. 30, each of the fittings 512 is adapted to connect a supply hose 520 to the upper portion 528 of the body 522 of the supply assembly 502. Fitting 512 may incorporate an in-line filter. A port 526 allows fluid from each supply hose 520 to pass through the body 522 and into the respective upper chamber 524.

A gasket 532 is positioned between the upper and lower portions 528, 530 of the body 522, and prevents fluid from passing from the upper chamber 524 into the lower chamber 525. The lower chambers 525 in the illustrated embodiment can be filled with air or another compressible gas at or near atmospheric pressure. The gasket 532 is sufficiently resilient to deform into and out of the lower chambers 525 in response to pressure fluctuations in the fluid, which may stabilize system fluid pressure and reduce or eliminate the effects of water hammer.

An exit port 534 (FIG. 30) is positioned in the upper portion 528 of the body 522. In the illustrated embodiment, each upper chamber 524 has one entrance port 526 and one exit port 534, and the exit ports 534 are positioned opposite the respective entrance ports 526. One of ordinary skill in the art, after reviewing this disclosure, will appreciate that equivalent configurations exist for performing these functions, without deviating from the spirit of the invention.

Figure 28:
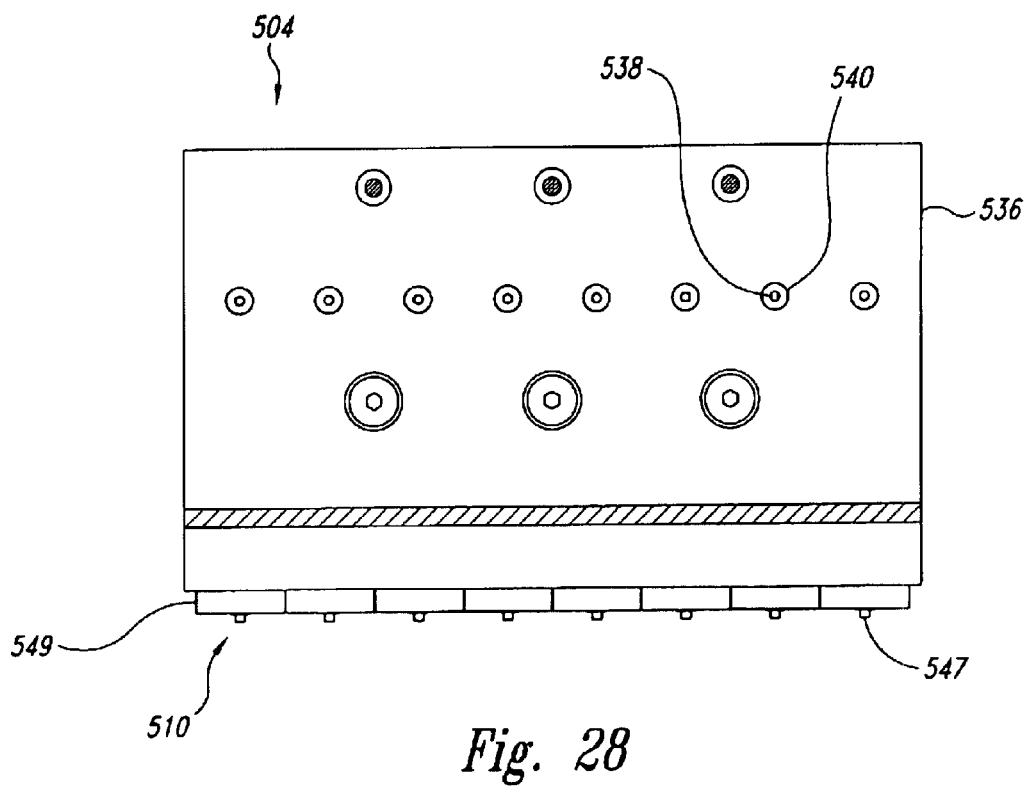
FIG. 28 is an elevation view of a portion of the printhead of FIG. 24, viewed along Section 28—28 of FIG. 27.

The plate assembly 504 is best illustrated in FIG. 28. The illustrated plate 536 is adapted with eight apertures 538, extending across the width of the. Each aperture 538 is positioned to align with the corresponding exit port 534 in the supply assembly 502 when the plate 536 is abutted against the supply assembly. As a result, the fluid exiting each upper chamber 524 in the supply assembly 502 passes through the plate 536 at a corresponding aperture 538. Each aperture 538 in the illustrated embodiment is surrounded by an O-ring 540 to prevent the fluid from escaping. The removable plate assembly allows quick changeout of microvalves for replacement or for cleaning them off-line. The inventors appreciate that the number and placement of the apertures can vary to accommodate different supply assemblies, without deviating from the spirit of the invention.

Figure 27:
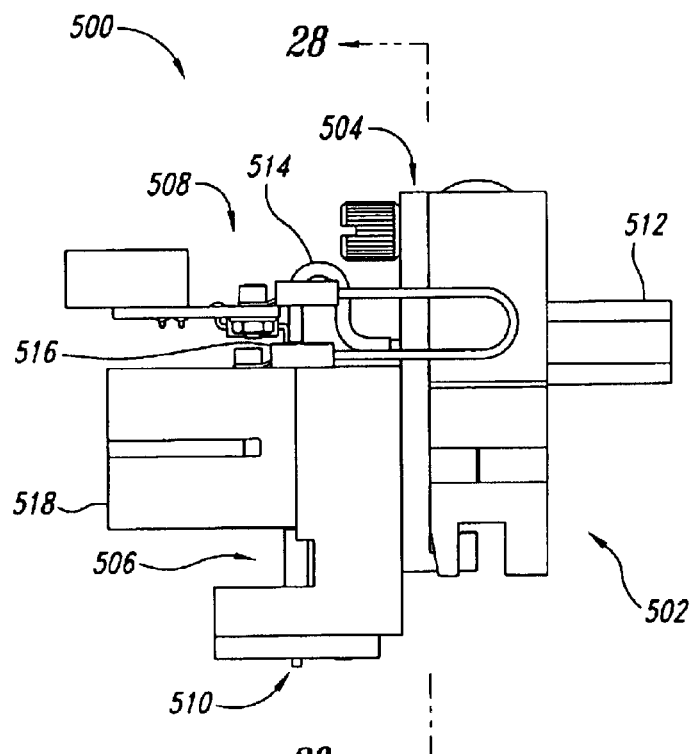
FIG. 27 is a right end view of the printhead of FIG. 24.

As illustrated in FIG. 27, a length of tubing 514 extends from each aperture 538 in the plate 536 to a corresponding solenoid valve 516. Each length of tubing 514 engages the plate 536 on the side opposite the supply assembly 502.

Figure 34:
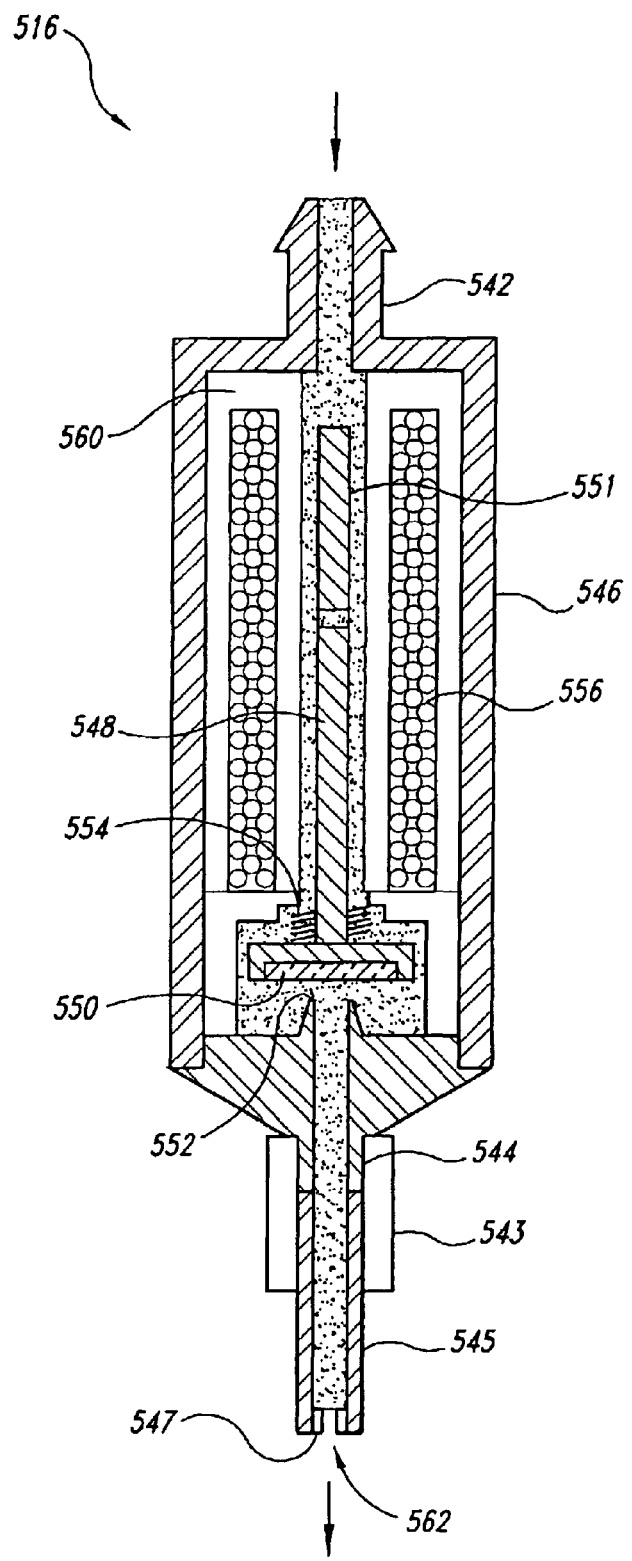
FIG. 34 is a cross-sectional elevation view of the valve of FIG. 32, viewed along Section 34—34 of FIG. 33.
Figure 38:
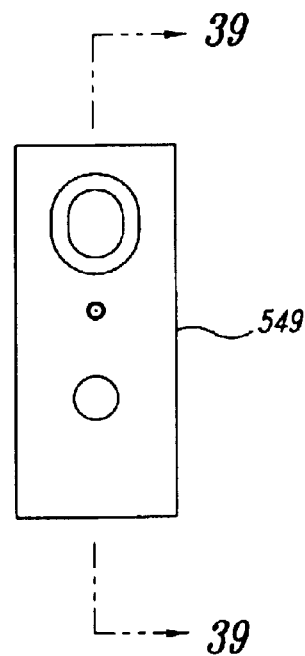
FIG. 38 is a plan view of an orifice plate and orifice tube from the printhead of FIG. 24, shown from below the printhead as oriented in FIG. 26.
Figures 39, 39A:
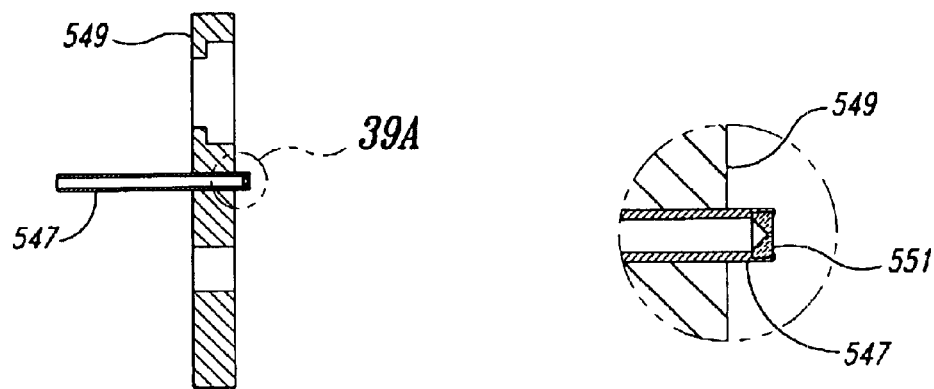
FIG. 39 is a cross-sectional view of the orifice plate and orifice tube of FIG. 38, viewed along Section 39—39.
FIG. 39A is an enlargement of a portion of FIG. 39.

FIGS. 32–34 illustrate a solenoid valve 516 according to this particular embodiment of the present invention. The illustrated solenoid valve 516 can be purchased from Lee Company of Westbrook, Connecticut. Each solenoid valve 516 has an inlet 542 and an outlet 544. The inlet 542 is connected by the tubing 514 to the plate 536 during operation, and receives fluid from the supply assembly 502. The outlet 544 dispenses precise amounts of fluid through the respective orifice tubes 545 and out of the corresponding orifice 547. Orifice tubes are connected to outlet 544 by a sleeve 543. A dedicated orifice plate 549 (FIG. 38 in the nozzle/orifice plate assembly 510 maintains each orifice tube 545 and orifice 547 in the desired alignment. Because each orifice tube 545 is retained in position by a dedicated orifice plate 549, each solenoid valve 516 can be replaced independently, which may reduce down time associated with replacing and aligning the orifice tubes 545. What is illustrated in FIG. 39 is an orifice tube, having essentially constant cross-section for most of its length and an orifice at the end. However, it would be equally possible to use a nozzle, which may be more tapered externally and perhaps internally as well. A nozzle could equally well be aligned by a similar nozzle/orifice plate. Either would be connected by a sleeve 543 to the valve outlet 544.

As best seen in FIG. 34, the illustrated valve body 546 houses a plunger 548 that moves axially with respect to the valve body 546 between a closed position in which a plunger face 550 contacts a valve seat 552, and an open position in which the plunger face is spaced apart from the valve seat to allow the fluid to pass through the outlet 544. A physical stop 551 can prevent the plunger 548 from moving beyond a desired distance in the open direction.

The plunger is biased by a spring 554 that urges the plunger face 550 into the closed position against the valve seat 552. In the illustrated embodiment, the plunger face 550 is made from a resilient, seal material such as EPDM (ethylene propylene diene) rubber or Viton or a like material to improve the seal when the solenoid valve 516 is in the closed position. One of ordinary skill in the art, having reviewed this disclosure, will appreciate that equivalent structures exist.

The illustrated solenoid valve 516 is opened and closed through electromagnetic actuation. A coil of electrically insulated wires 556 encircling the plunger 548 is alternatingly energized and grounded via a pair of terminals 558 (FIG. 32) to alternatingly open and close the solenoid valve 516, respectively. An inner wall (bobbin) 560 separates the coil of wires 556 from the fluid passing through the solenoid valve 516, and separates the coil of wires from the material of the valve body 546. The space between the coil of wires 556 and the valve body 546 may be filled with a thermally conductive epoxy (e.g. Omega-Bond OB-101, having a thermal conductivity of 1.038 W/m-K) to conduct heat dissipated at the coil of wires 556, through the valve body and to the fin member 518 or a similar heat sink.

Figure 37:
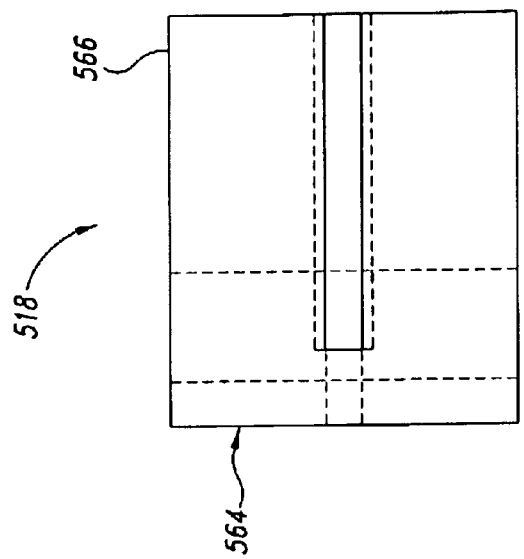
FIG. 37 is a side view of the fin member of FIG. 35.
Figure 36:
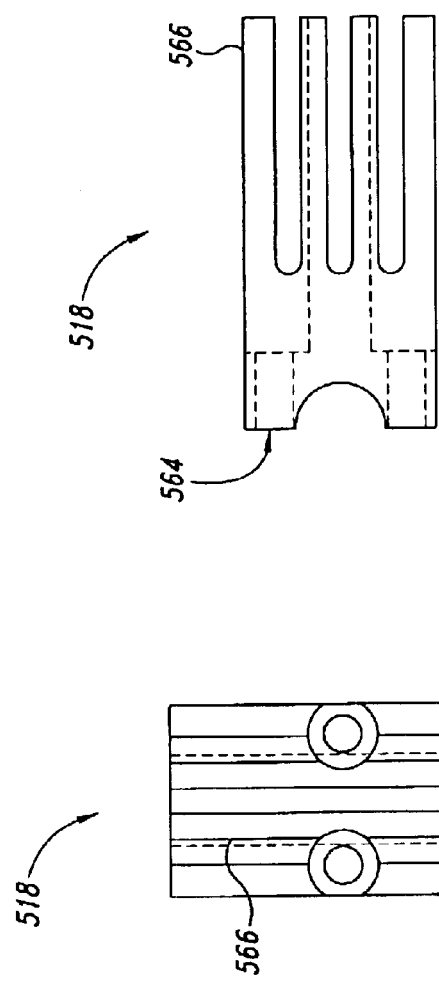
FIG. 36 is a plan view of the fin member of FIG. 35.
Figure 35:
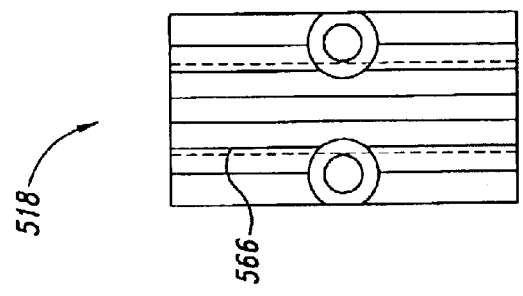
FIG. 35 is an elevation view of a fin member from the printhead of FIG. 24.

The valves 516 are mounted or attached to the body of the printhead by attachment members, which can also be fins for dissipation of heat. FIGS. 35–37 illustrate the fin member (heat sink) 518 according to this particular embodiment of the present invention. Each fin member 518 has a mounting surface 564 that can be shaped to conform to a portion of the solenoid valve 516. Opposite the contact surface 564, each fin member 518 has a number of individual fins 566 spaced apart laterally across the entire width of the contact surface 564. In the illustrated embodiment, each fin member 518 has four fins 566. The inventors appreciate that the number of fins, and the size and shape of each fin can vary without deviating from the spirit of the invention.

Each fin member 518 in the illustrated embodiment has a pair of opposing apertures extending therethrough for mounting the fin member against the support frame assembly 506. The fin member 518 is thus readily removable and replaceable with another fin member to provide varying thermal characteristics to the print head 500 based on the particular demands or desires of the operator. In addition, the fin members 518 can be individually removed and replaced, which may further facilitate the replacement of individual solenoid valves 516, which may expedite repair of the printhead assembly 500.

As indicated above, the individual solenoid valves 516 can be removed and replaced independently without affecting the other valves in the printhead assembly 500. The fin members 518 can be individually removed and attached to a new solenoid valve 516; the individual orifice plates 549 can be removed and replaced, and a calibration plate or other device can be used to align the sleeves 545 and nozzles 547 in the desired alignments.

The printhead assembly 500 as shown contains a chamber 525 for the suppression of pressure surges, for each valve 516 or supply hose 520. Alternatively, chambers could be combined. An individual chamber 525 may be dedicated to a particular fluid if more than one fluid is dispensed by different parts of the same printhead. Different valves within the printhead assembly 500 can similarly be dedicated to particular fluids if more than one fluid is dispensed by different parts of the printhead. In particular, microvalves are capable of dispensing suspensions, at least up to a modest solids content. This has been described in commonly assigned U.S. patent application Ser. No. 09/991,556 entitled "Printing or dispensing a suspension such as three-dimensional printing of dosage forms," which is hereby incorporated by reference in its entirety. Accordingly, microvalves can be used either for dispensing binder liquid, which contains suspended particles, or for depositing a layer of powder particles by slurry deposition. Accordingly, it is possible that a single printhead assembly 500 could contain both dispensers for depositing powder particles by slurry deposition and dispensers for dispensing binder liquid onto those powder particles. One modification of the valves which can be useful for use with suspensions is to provide a bypass or alternate exit path from the valve, as described in the referenced patent application. With suspensions, in order to prevent sedimentation, it is useful to keep the suspension in motion, even when there is no dispensing of suspension. Accordingly, a microvalve with the bypass feature provides an open flowpath up to very close to the valve seat, a flowpath that is always open and available for flow for the purpose of discouraging sedimentation. The bypass flowpath exits the side of the valve near the valve seat. The printhead may have a feature designed in to it to provide access for that bypass flowpath. Holes such as those shown in the lower portion of FIG. 30 can provide the access.

As alternative ways of dispensing suspension or slurry for deposition of layers, it would be possible to use other types of structures, such as pinch valves or peristaltic pumps. It would be possible for any such apparatus to turn on and off repeatedly such as turning off during the end region (turn-around region) of each raster pass of a raster motion for slurry deposition of powder layers. This might be useful in the case of depositing expensive powder materials such as hydroxyapatite. Turning off the flow of suspension or slurry could enable all the raster lines of slurry to be deposited in the same direction of motion as opposed to depositing them in both directions of raster motion. Such valving action, or even control of a stepper motor driving a peristaltic pump, could be coordinated with instructions driving other parts of the three dimensional printing machine. Apparatus for slurry deposition of powder is disclosed in commonly assigned U.S. patent application Ser. No. 10/122,129, which is hereby incorporated by reference in its entirety.

The printhead assembly 500 is moved to the desired position for printing, preferably by a computer-controlled motion control system. The computer-controlled motion control system controls the printhead driver 142 and the fast axis motor 144 to move the printhead assembly 500 into the proper position for dispensing fluid. The printhead driver 142 moves the second carriage 128—and with it the printhead assembly 500—back and forth along the slow axis. The fast axis motor 144 moves the printhead assembly 500 with respect to the second carriage 128 along the fast axis. In the illustrated embodiment, the printhead assembly 500 rides on an air bearing 150 (FIG. 5) along a lower cross-member of the second carriage 128. The inventors appreciate that movement of the printhead assembly 500 can be performed by a wide variety of equivalent structures and control systems without deviating from the spirit of the invention.

Precision Dispensing of Fluid

One particular application for three-dimensional printing is the fabrication of medical products, such as pharmaceuticals and bone substitutes. Unlike traditional three-dimensional printing, discussed in the Description of the Related Art, when dispensing Active Pharmaceutical Ingredients into a dosage form, it is important to provide a delivered drop volume that is accurately controlled, measurable and repeatable to a close tolerance. This precision ensures that the final product has the proper amount of Active Pharmaceutical Ingredient or other critical compound, within an acceptable tolerance.

For some medical purposes, it is necessary to dispense fluids with low viscosity and low surface tension (such as organic solvents) while maintaining extremely tight flowrate tolerances. Unfortunately, it has traditionally been difficult to maintain close flowrate tolerances for low surface tension/low viscosity fluids.

During operation of the present invention, the solenoid valve 516 can be opened and closed in response to a peak-and-hold drive signal. Instead of a pulse signal, which had been used in the past but which was incapable of dispensing precise and/or repeatable quantities of fluid, the inventors have discovered that a peak-and-hold drive signal allows the solenoid valve 516 to reliably and accurately dispense pharmaceutical agents and other fluids that require precise volume control.

The fluid pressure in the illustrated embodiment has been decreased as compared to the prior art, from approximately 11 psi to approximately 5 psi, which allows the solenoid valve 516 to be left open longer. Instead of a 200 microsecond pulse at 40 volts, for example, the current system allows the valve to be opened with a 250 microsecond peak signal at under 25 volts, followed by a 500 microsecond hold signal at under 5 volts. The inventors appreciate that these figures are merely examples, and that one of ordinary skill in the art, having reviewed this disclosure, will appreciate that there are many equivalent peak-and-hold signals that will serve the inventive purpose without deviating from the spirit of the present invention.

In addition, the inventors have discovered that, by using the peak-and-hold drive signal, the energy used to open and retain the solenoid valve 516 open is less than the energy previously required to open and shut the valve using the pulse signal. Using the above figures, the total wattage dissipated, at an actuation frequency of 800 Hz, decreased from approximately 2.5 W to approximately 1.1 W. Thus, the solenoid valve 516 of the present invention is less prone to overheating, and may thus require less effort, structure and controls to remain at the desired temperature range. By maintaining a consistent temperature, the solenoid valve 516 will also dispense fluid more consistently, as the viscosity of fluid is affected by the temperature of the fluid.

Still further, the inventors have developed a method of selecting solenoid valves 516 to maximize the precision of the dispensed drop volume. Each solenoid valve 516 is tested and matched with other valves sharing particular characteristics, prior to being installed into the three-dimensional printing machine 100. Even valves that have been identified by their supplier as being identical are tested and separated into different groups. It has been discovered that testing done by manufacturers of microvalves does not actually indicate that the valves in a common group have sufficiently similar flow characteristics, when compared on an exacting scale required by the present invention.

Before installing the solenoid valves 516 onto the printhead assembly 500 of the three-dimensional printing machine 100, each valve is first tested by measuring the flowrate of liquid through the valve as a function of pulse width (using the peak-and-hold waveform). The average drop mass is plotted against the pulse width for each valve. The flowrates are plotted for total pulse widths ranging from 500–800 microseconds. For the illustrated three-dimensional printing machine 100, this is the operable range for the solenoid valve 516. Within each pulse width, the "peak" portion of the waveform is approximately 500 microseconds, and the "hold" portion of the waveform ranges from approximately 0–300 microseconds.

Figure 40:
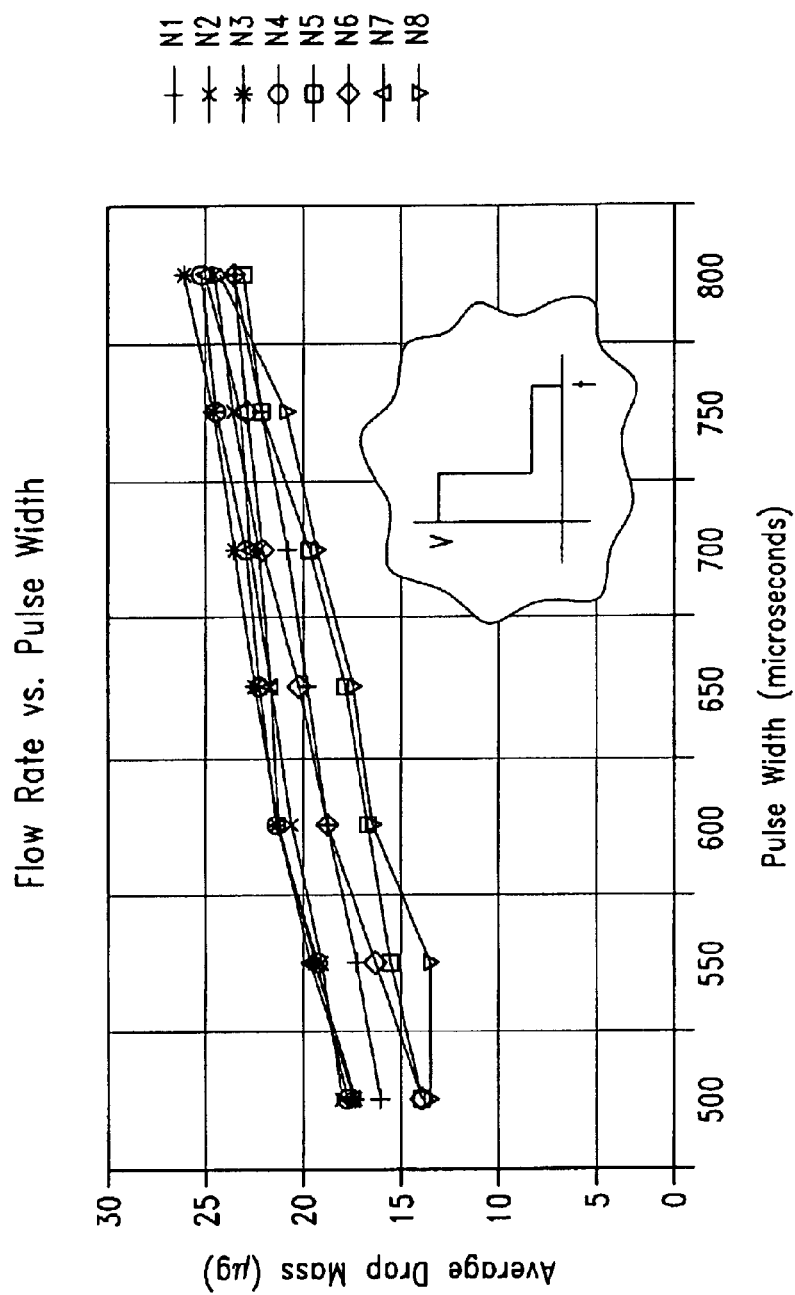
FIG. 40 is graph plotting the drop mass versus the pulse width of fluid dispensed from a printhead such as that illustrated in FIG. 24.

The solenoid valves 516 are separated into groups, every solenoid valve in a particular group being capable of dispensing fluid at the same flowrate as the other solenoid valves in the group, at some pulse width within the operational range of the valve. For example, if a first solenoid valve 516 has a flowrate of 20 units at 550 microseconds and a second valve has a flowrate of 20 units at 750 microseconds, the first and second valves would fall into the same group, because 550 microseconds and 750 microseconds are both within the operable range of the solenoid valve 516. FIG. 40 illustrates the calibration curves of eight valves which have been grouped because of the similarity of their individual calibration curves.

The solenoid valves 516 are then matched with their respective flow rate calibration curves, and valves from a common group are installed onto one of the printhead assemblies 500 for the three-dimensional printing machine 100. The actuating pulse wave for each solenoid valve 516 is independently controlled based on its respective calibration curve. As a result, each of the solenoid valves 516 in a particular printhead assembly 500 may be controlled to dispense volumes which are substantially identical to the volumes dispensed by the other valves in the printhead assembly, as every valve in a particular printhead assembly is taken from the same group and is independently calibrated and controlled. For example, if a printhead assembly 500 incorporated the two valves described in the hypothetical above and it was desired that each microvalve dispense 20 units of fluid volume per pulse, the first valve would be opened using a 550 microsecond pulse and the second valve would be opened using a 750 microsecond pulse. By so grouping, calibrating and controlling each of the solenoid valves 516 in the printhead assembly 500, the entire printhead assembly can be controlled to dispense identical volumes through every dispenser 547. This situation can allow the three-dimensional printing machine 100 to effectively manufacture pharmaceutical and medical devices requiring precise quantities of fluids. It has been found that if valves are matched as determined by data taken for one particular fluid that is Newtonian or substantially Newtonian, then they usually are matched for any other fluid which also is Newtonian or substantially Newtonian. The phrase substantially Newtonian is used because the range of fluids suitable for such a calibration and matching technique can include fluids which are slightly non-Newtonian, in either the shear-thinning or shear-thickening sense.

It has been found that on the scale of the graph in FIG. 40, valves can be considered well-matched with each other if they are separated by no more than about 5 to 7 micrograms/drop on the vertical axis. With a group of valves which are so matched, it is possible to draw a horizontal line through the individual characteristic curves of all valves in a set at a desired flow rate or drop size, and that line will intersect the characteristic curves of all of the valves within the usable and established range of pulse widths. It has been found that if valves are separated by approximately 10 micrograms/drop or more on the scale in FIG. 40, it is not possible to draw a horizontal line through all of the curves or obtain the same size of drop from each valve by pulsewidth adjustment.

Microvalves (or valves, used interchangeably) can be manufactured in a variety of sizes. Size need not refer to overall external dimensions of the valve body, but rather may be understood to refer more particularly to the dimension of certain internal features through which the liquid flows. As discussed above, the opening/closing action of a valve may be defined by the relative position of a plunger and a seat, with the seat being a surface against which the plunger contacts when it is desired for the valve to be closed.

One of the two contacting surfaces, such as the plunger surface, may be elastomeric material. When the valve is open, fluid flows through an annular region defined by the gap between the plunger 550 and the seat 552, and that point may be defined by a dimension which is the inside diameter of the seat 552. Downstream of the seat inside diameter may be an exit tube 544, which may be of circular cross-section having an inside diameter either the same as or different from the seat inside diameter. At the end of the exit tube may further be a nozzle having a minimum open cross-sectional diameter, which is the nozzle orifice diameter. The seat inside diameter may be used to describe a "size" of a valve, with further description being provided by the exit tube inside diameter.

Typically, if designs of valves are varied by varying the orifice/seat diameter, then other components or dimensions of the valve may also vary somewhat in conjunction with that variation of the seat inside diameter. For example, variations may be imposed on the inside diameter of the exit tube downstream of the orifice. Variations could also be imposed on the length of the stroke of the valve, although that has not been done here.

It has been found that certain sizes of valves and certain viscosity ranges of fluids go well together to provide fluid delivery which is consistent, in variables such as drop size and flowrate, over long periods of time. For example, it is believed that if a fluid has a relatively large viscosity, it is appropriate to provide relatively large seat inside diameter, exit tube inside diameter, and dimensions of similar internal passageways to allow appropriate amounts of flow to pass through it during the time interval that the valve is open. Similarly, it is believed that for relatively low viscosity fluids, it is appropriate to use smaller dimensions of the seat inside diameter and possibly related components, so that there is still a non-negligible amount of pressure drop at the seat of the valve. In the case of low viscosity fluids, it has been found that valves which are relatively large (in view of the viscosity) are susceptible to unexplained variations in delivered flowrate or drop size, over long periods of operation, while valves whose size is in better relation (i.e., smaller) in view of the fluid viscosity are much more consistent in these respects.

Three different sizes or dimension combinations of valves have been used in the present work, in conjunction with different ranges of fluid viscosity. In approximate terms, the valve size may be matched with the fluid viscosity according to the guidelines in the following table. In this table, seat inside diameter (or seat orifice diameter) refers to the diameter of the central opening of the valve seat 552. Exit tube inside diameter refers to the inside diameter of exit tube 544 in FIG. 34. In FIG. 34 these two diameters are shown as being identical, but in general they could differ from each other.

| Valve Designation | Seat inside Diameter | | Exit tube inside diameter | | Selected Viscosity Range |
| --- | --- | --- | --- | --- | --- |
| | inch | (micron) | inch | (micron) | (CentiPoise) |
| Small | 0.010 | (250) | 0.010 | (250) | 0.5 to 5 |
| Medium | 0.017 | (250) | 0.017 | (250) | 5 to 10 |
| Large | 0.017 | (425) | 0.050 | (1250) | 10 to 18 |

It is further believed that especially good flowrate repeatability is achieved by sizing the microvalve as a function of the liquid viscosity according to the above teachings, when this is also done together with the use of spike-and-hold actuation.

Interlayer Dryer Heater Assembly

Figure 41:
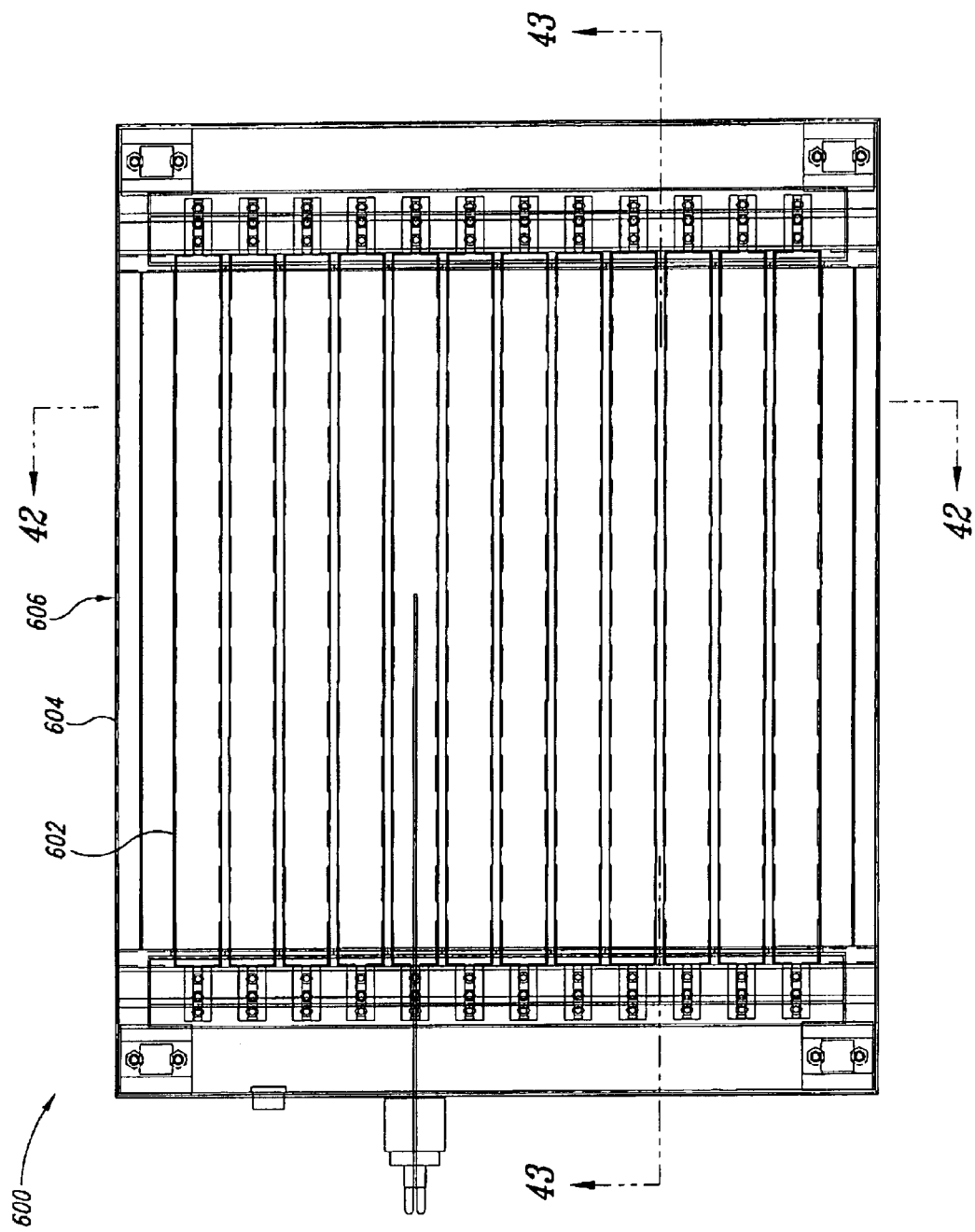
FIG. 41 is a plan view of a heater of the three-dimensional printing system of FIG. 1.

FIGS. 41–43 illustrate a particular interlayer dryer heater assembly 600 according to an embodiment of the present invention. In the figures, the housing panel in the foreground has been "removed" to show the elements inside the heater assembly 600. The illustrated interlayer dryer heater assembly 600 incorporates twelve heater elements 602 spaced apart from each other and held within a heater housing 604. The heater housing 604 is sufficiently long and wide to span across the entire length and width of the second powder bed 302. As discussed below, in this particular embodiment, the entire interlayer dryer heater assembly 600 may be positioned over the second powder bed 302 during operation to apply heat to a newly printed-upon layer of powder in the bed, and could be removed to allow other manufacturing steps to be performed. In other embodiments, the interlayer dryer heater assembly 600 can have different dimensions, and one of ordinary skill in the art will, after reviewing this disclosure, appreciate that there are many equivalent structures for the interlayer dryer heater assembly.

In the illustrated embodiment, the heater housing 604 is slightly longer than it is wide, and in the vertical dimension it is significantly shorter than it is long or wide. Essentially, the housing 604 is slightly longer than a heater element 602, slightly wider than twelve tubular heaters, and slightly taller than the diameter of a heater. The illustrated housing 604 is configured to allow cooling air to flow through the housing and around some or all of the heaters 602, maintaining the interlayer dryer heating assembly 600 at or below a desired temperature. Removing heat from the interlayer dryer heating assembly 600 and transporting it to a location outside the immediate vicinity of the three-dimensional printing machine 100 may facilitate the control of the temperature of the surrounding areas of the three-dimensional printing machine 100. If the three-dimensional printing machine 100 is encased in an enclosure system 700 (discussed below), actively removing heat from the interlayer dryer heater assembly 600 may be even more desirable. The inventors appreciate that, for different applications and/or for different heating elements, the size and shape of the housing 604 will likely change without deviating from the spirit of the invention.

The illustrated housing 604 is solid on all four edges 606 and on its top panel 608. The bottom 610, however, is either open or is covered with a transparent material, such as glass, to allow heat to radiate toward the powder in the second powder bed 302. Housing 604 may have one or more gas inlet connections and gas outlet connections to establish a flow of air or other gas for the purpose of removing heat other than by releasing it to the nearby surroundings. The flow of gas may be through the interior regions of housing 604 that are not occupied by heating elements 602, and/or it may be along the length of the annular region between glass tube 614 and outer tube 618 (FIG. 45), or it may be both. In order to further help prevent this heat from being released in the immediate surroundings, fluid conduits such as flexible hoses may carry this gas flow, in particular the exiting gas flow which has become heated, to a more distant place where it may be discharged.

Casters 612 are mounted about the perimeter of the housing 604 to allow the interlayer dryer heater assembly 600 to move into and out of position over the second powder bed 302. As best illustrated in FIG. 2, the heater assembly 600 rolls along the siderails 250. As discussed above, the siderails 250 are positioned on either side of the second powder bed 302 and the first powder bed 202 beyond gaps or channels 252 or 352. The interlayer dryer heater assembly 600 can thus move on the casters 612 in the direction of the slow axis along the three-dimensional printing machine 100, over the first powder bed 202, the second powder bed 302, or beyond the beds, where it is not positioned over either bed. The interlayer dryer heater assembly 600 can be moved into this third position, if desired, when the second powder bed 302 and/or the heater assembly 600 is cooling.

As also illustrated in FIG. 2, the interlayer dryer heater assembly 600 of this embodiment is connected to the roller assembly 400 such that motion of the roller assembly 400 also causes the same motion of the interlayer dryer heater assembly. The interlayer dryer heater assembly 600 thus moves with the roller assembly 400 and with the first carriage 126, and is driven by the roller driver 140. The inventors appreciate that the interlayer dryer heating assembly 600 could travel on a separate structure and could be propelled by a separate carriage or other form of motive means. One of ordinary skill in the art having reviewed this disclosure will recognize many equivalent structures and controls, such as suspending the interlayer drying heating assembly 600 from a carriage, none of which deviate from the spirit of the present invention. Types of heaters other than those described herein could similarly be used.

Figure 44:
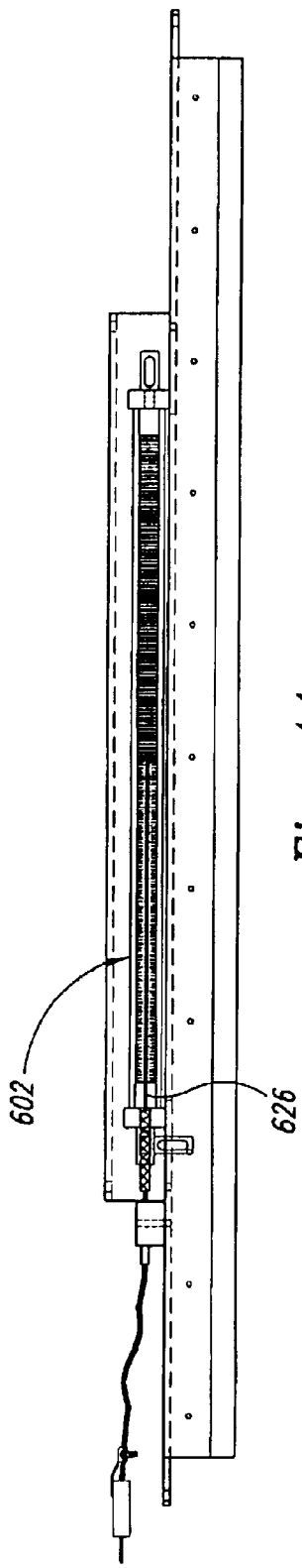
FIG. 44 is an elevation view of a heater tube from the heater of FIG. 41.
Figure 45:
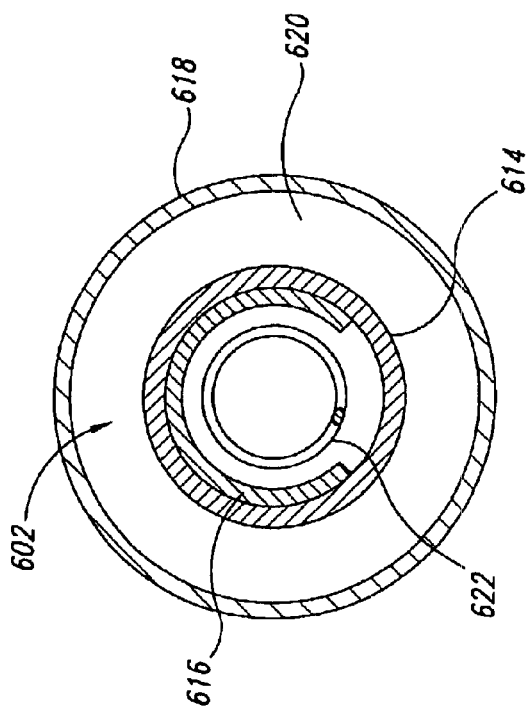
FIG. 45 is an axial cross-section of the heater tube of FIG. 44.

FIGS. 44 and 45 best illustrate a heater element 602 according to this particular embodiment of the present invention. The illustrated heater element 602 is tubular-shaped, and may be a "quartz" heater rod, which are commonly found in heating devices available to the general public. Quartz heater rods have a reasonably small thermal mass, so warmup and cooldown times are not excessive. These so-called "quartz" heaters are really a glass tube 614 with a coiled resistance wire 622 inside, such as those commercially available from Casso-Solar Corporation, Pomona, N.Y. A particularly useful variety is sold under the name Gold Unitube.

Radiation from the heater element 602 can be further directed toward the bed by a reflector 616 on the surfaces of the glass tube 614 oriented away from the beds during operation. To form the reflector 616, a portion of the surface of the glass tube 614 is coated with a material, e.g. gold, which reflects infrared radiation to direct the radiation in a specific direction, which in this case would be toward the beds. In FIG. 45, the thickness of the coating is greatly exaggerated for sake of illustration.

In the illustrated embodiment, the portion of the glass tube 614 coated by the reflector 616 has the same pattern along the entire length of the tube. For this particular application, a useful fraction of the circumference of the glass tube 614 to be coated with reflector 616 is at least half (to direct radiation downward) and preferably about three-quarters (270 degrees out of 360 degrees) so as to direct the radiation more primarily downward, meaning the radiation from an individual tube disperses over a range of only 90 degrees.

In the illustrated embodiment, the heater element 602 is encased in an outer tube 618, and air or other cooling gases may be directed through a channel 620 created between the glass tube 614 and the outer tube 618. Sensing the temperature inside the heater element 602, such as with a thermocouple 626 (FIG. 44), allows verification that a particular heater element 602 is on and can be used to control the electrical power delivered to the heater element to closely control the temperature of the heater element.

The illustrated heater elements 602 (of outside diameter 0.625 inch) can be available with a heat output of up to 80 Watts per inch of length of the tube, although for present purposes it is anticipated that it may be operated at around 31 Watts per inch of length of tube. The heater elements 602 may be spaced apart from each other at a center-to-center distance of about 1.25 inch, meaning that the average power density dissipated by the heater is about 25 Watts/inch$^2$. The distance between the second powder bed 302 and the nearest surface of heater element 602 may be 1.125 inch. The wavelength selected for operation of the heater element 602 is suitable (considered medium wavelength in heater terminology) for absorption by water, which is a common binder base fluid needing to be evaporated.

An infrared ("IR") temperature sensing device 624 is attached to the interlayer dryer heater assembly 600 and is oriented to determine the temperature at the surface of the second powder bed 302 during or following interlayer drying. The electromagnetic radiation reaching the IR temperature-sensing device 624 can be filtered to a desired wavelength to reduce or eliminate infrared noise from surrounding structures. The IR temperature-sensing device 624 can be configured to obtain, register and deliver temperature information to the system to control the power and duration of interlayer drying.

Enclosure

FIGS. 46–50 illustrate an enclosure system 700 according to one particular embodiment of the present invention. The illustrated enclosure system is generally conformed to the three-dimensional printing machine 100 described above and illustrated in the preceding figures. As viewed in FIG. 46, the left side of the enclosure system 700 corresponds to the side of the three-dimensional printing machine 100 where the roller assembly 400 resides when not in use. Likewise, the right side of the enclosure system 700 corresponds to the side where the printhead assembly 500 resides when not in use.

The enclosure system 700 generally incorporates an enclosure 702 and a ventilation system 720, which can be configured to filter and/or recirculate the air inside the enclosure. The enclosure 702 is configured not only to enclose the three-dimensional printing machine 100, but also to allow the operator to view the three-dimensional printing process and access the elements of the three-dimensional printing machine.

The enclosure 702 incorporates a number of vertical structural members 706 and horizontal structural members 708 linked together to create a pattern of large openings 710 spaced about the perimeter of the enclosure system 700. Each opening 710 is covered by a window 712 that allows an operator to see into the enclosure 702, but that can prevent the transfer of air or debris into the enclosure system 700, and can prevent the transfer of vapors or other chemicals out of the enclosure system.

The enclosure system 700 may be substantially airtight when closed. For example, seals may be provided around substantially the entire perimeters of windows 712 to minimize leakage of air therethrough due to any pressure difference that might exist. Seals may be made of a compliant material such as a polymeric material, which is compatible with organic solvent vapors if such vapors are present.

Figure 48:
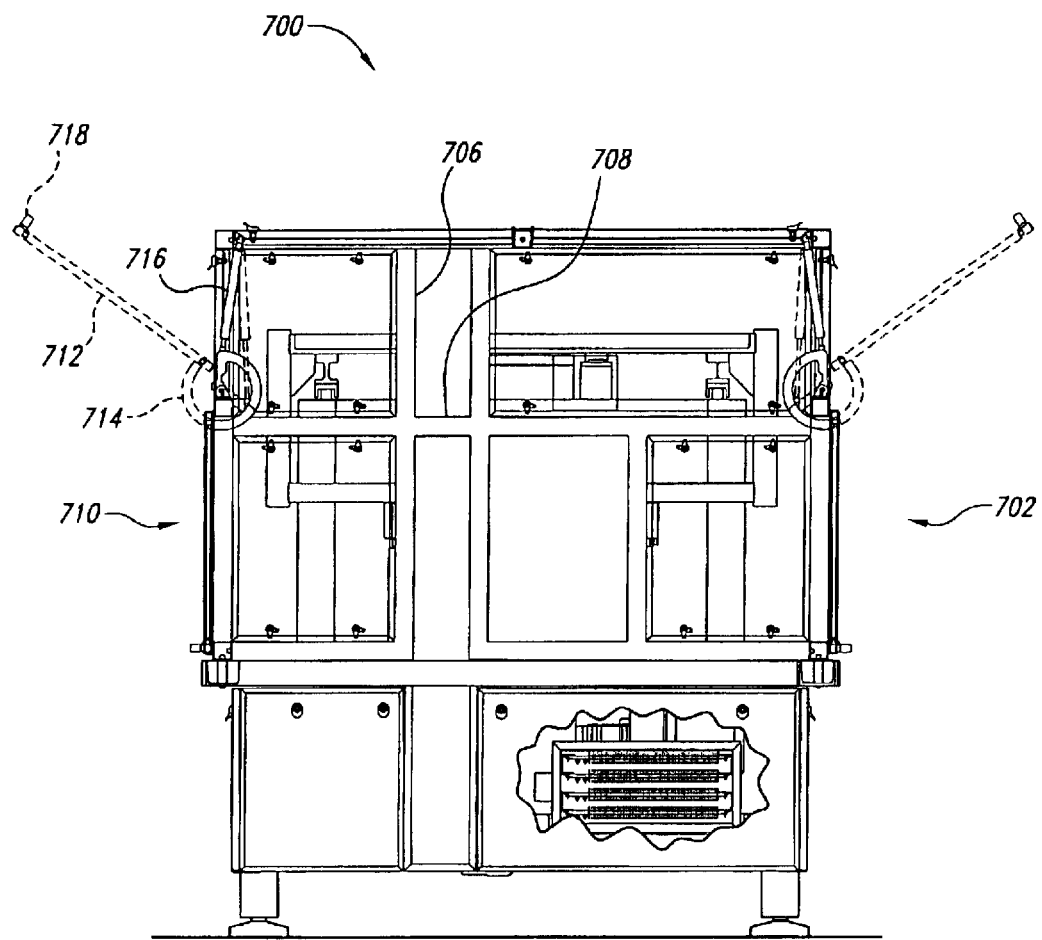
FIG. 48 is a right end view of the three-dimensional printing machine of FIG. 46, illustrating access doors in both the open and closed positions.

As best illustrated in FIG. 48, the lower window 712 on the front and rear of the enclosure 702 are configured to open and close to provide access to the three-dimensional printing machine 100. Accordingly, each of such windows 712 are attached to a hinge 714, which is pivotally coupled to one of the vertical or horizontal structural members 706, 708. A spring/dampener 716 is also linked to the hinge 714 and extends to a separate location on the enclosure 702. The spring/dampener 716 can be configured to pivot at both of its ends with respect to the enclosure 702 and the hinge 714, respectively.

The windows 712 are shown in FIG. 48 in solid lines in their closed orientations, and are shown in broken lines in their open orientations. As illustrated, when the window 712 is in the closed position, the hinge 714 rotates to compress the spring/dampener 716. When the window 712 is opened, the hinge 714 rotates with the window, and the piston 716 extends downward to follow the attachment point on the hinge. When the window 712 is fully opened, the piston 716 is fully extended, and exists being compressed to keep the window in the open orientation. The handle 718 on the side of the window 712 opposite the hinge 714 assists the operator in opening and closing the window. Windows that slide or execute other types of motion are also possible.

Figure 46:
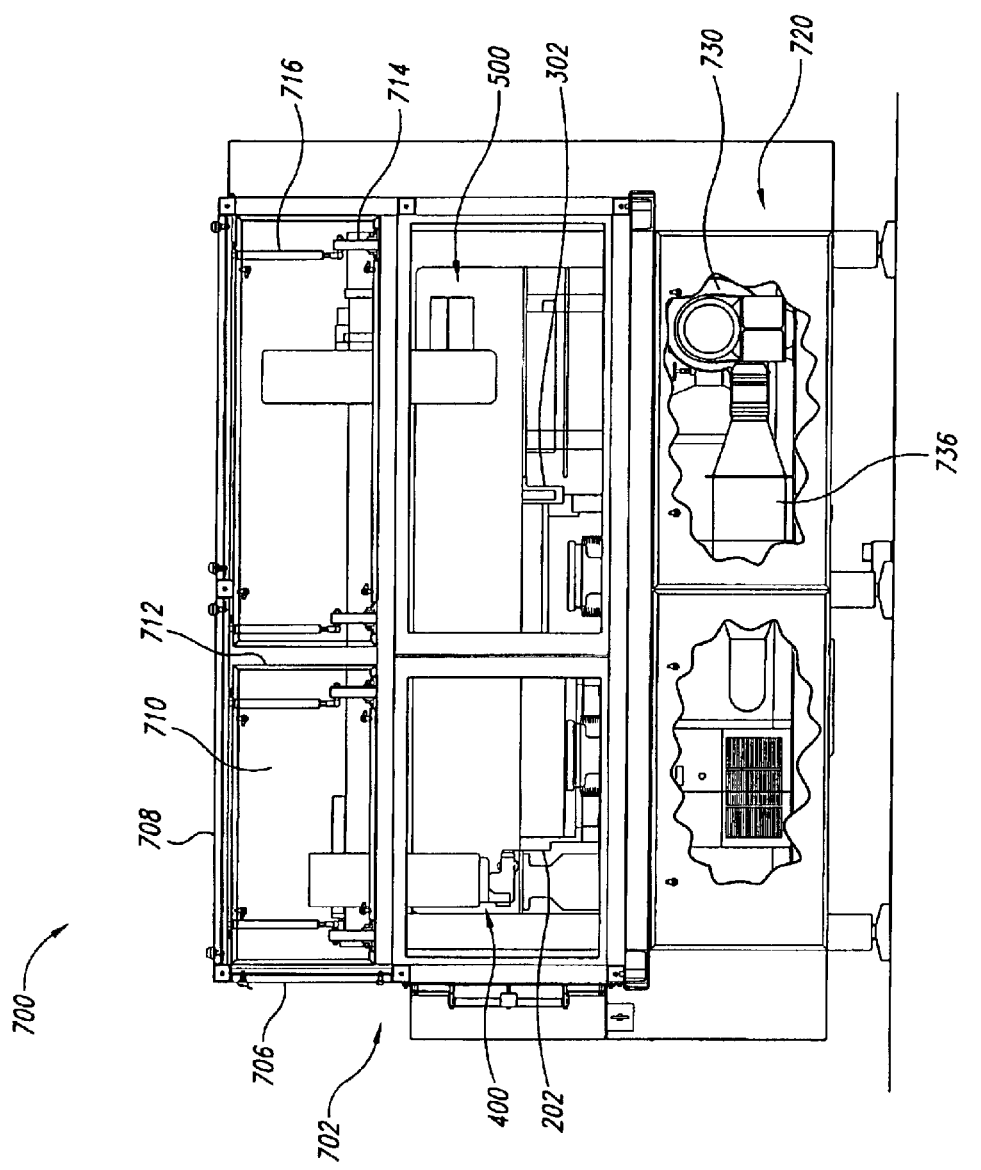
FIG. 46 is an elevation view of an enclosed three-dimensional printing machine according to another embodiment of the present invention.
Figure 47:
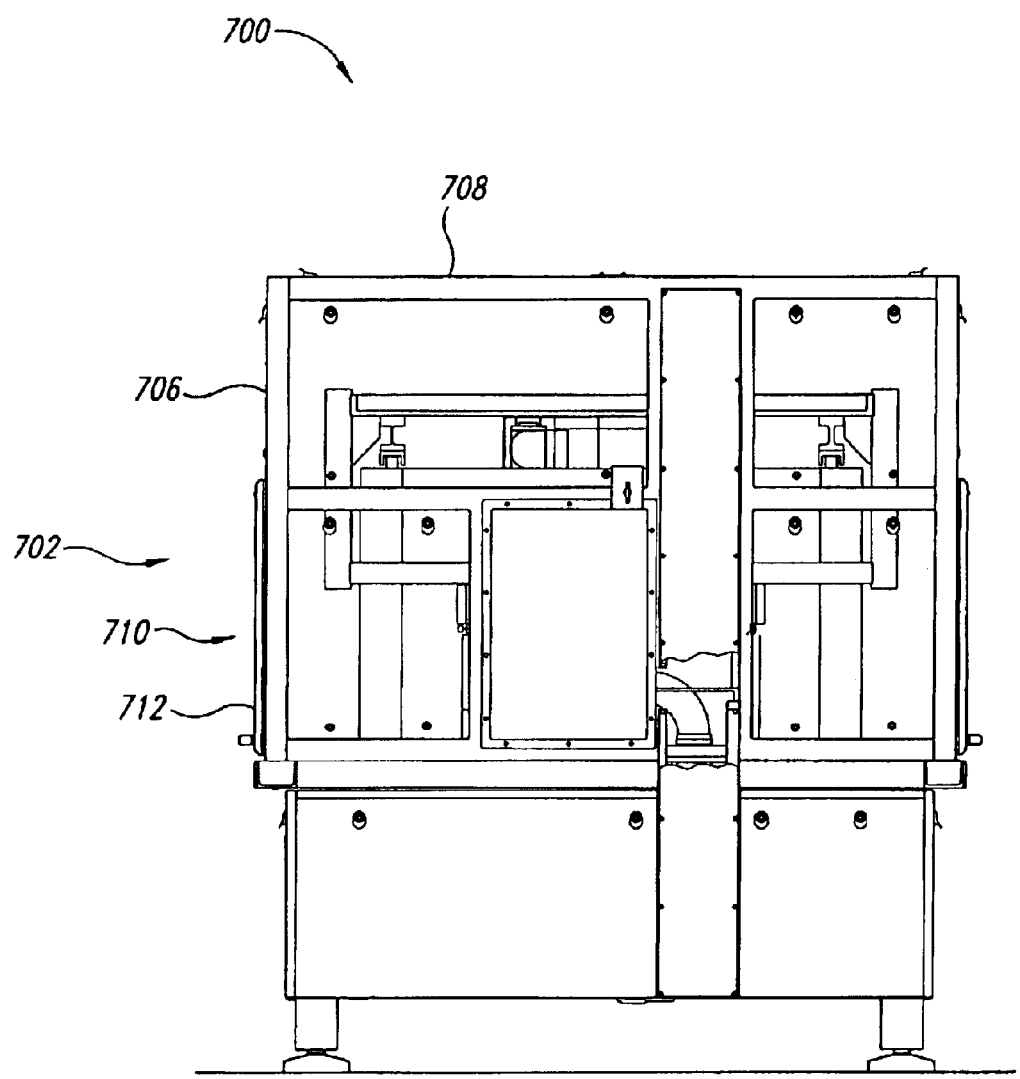
FIG. 47 is a left end view of the three-dimensional printing machine of FIG. 46.

As viewed in FIG. 46, the lower window on the left-hand side can be opened as described above to allow the operator to access or remove the first powder bed 202 or to insert a new feed bed, or to work on the roller assembly 400 or heater assembly (not shown). Likewise, the lower right-hand window 712 can be opened to access, remove or replace the second powder bed 302, or to work on the printhead assembly 500. The window sizes and shapes can be made appropriate for those purposes. The shape, configurations and structures of the windows 712 can vary dramatically without deviating from the spirit of the present invention.

There can be provided latches on the windows 712, or snaps, or similar positive features for maintaining the windows in a closed position. As will be described shortly, it may be desirable to operate the enclosure 702 at a pressure differential in either direction with respect to the outside atmosphere. In at least one direction of pressure differential, latches may be useful for keeping the windows 712 closed.

The enclosure 702 may contain window closure sensors, located on or near windows 712, which detect whether a window is in a defined position with respect to its adjacent frame thereby indicating closure of the window. Information from window closure sensors can be used to either enable or disable one or more functions of the machine depending on the position of the window 712 (open or closed). This can be accomplished by integrating signals from window closure sensors with functions of the machine, using either hardwired controls or software. It is possible to implement such controls or software so that closure of all windows 712 is necessary before the machine can begin operation. It is possible to implement such controls or software so that the opening of a window 712 during operation of the machine will immediately halt one or more functions of the machine. Alternatively, it is possible to implement such controls or software so that the opening of a window 712 during operation of the machine will initiate a shutdown sequence, which may shut down one or more functions of the machine by means of a programmed sequence of events.

Figure 49:
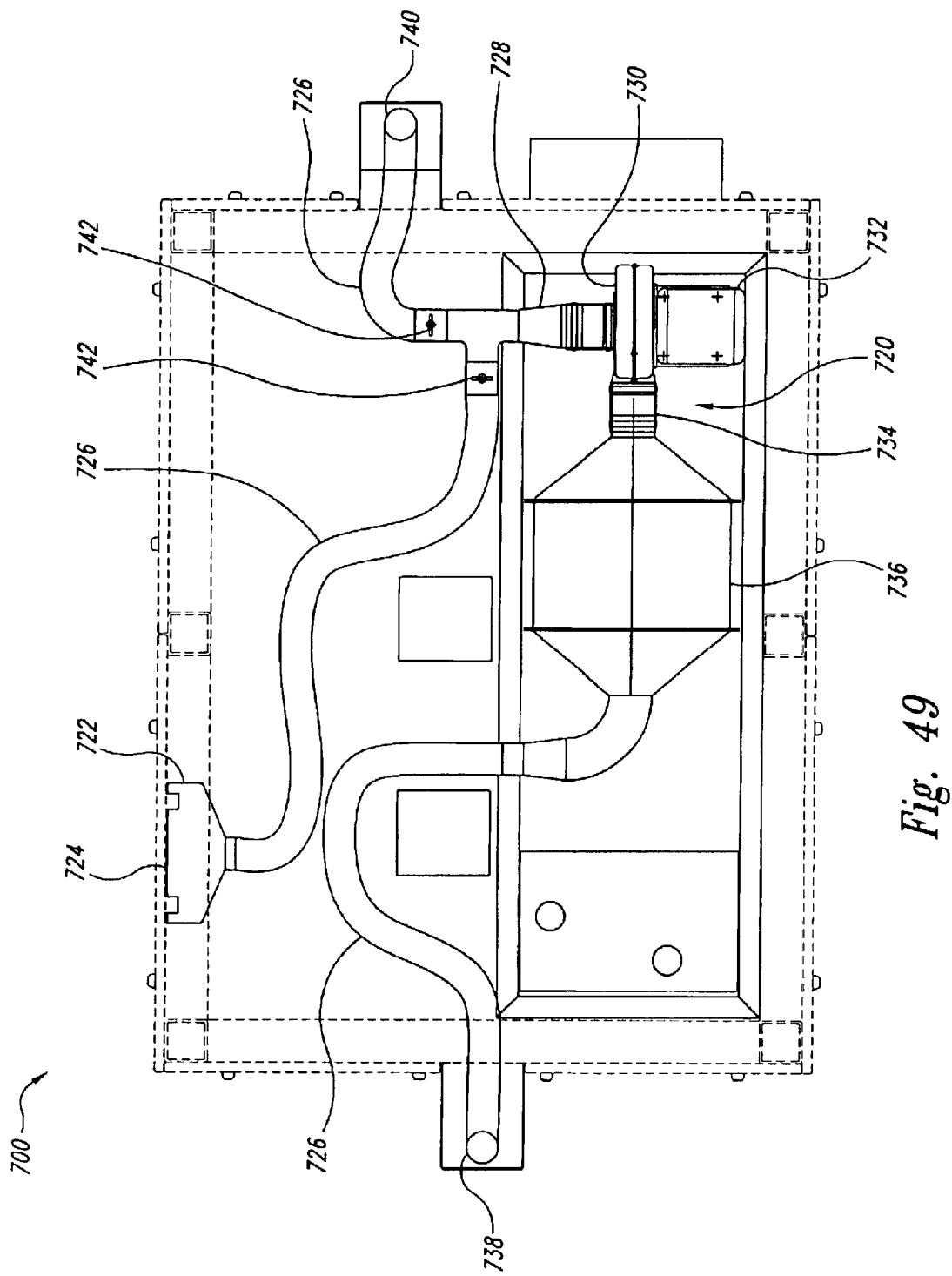
FIG. 49 is a top view of a lower portion of the three-dimensional printing machine of FIG. 46.

The enclosure 702 may include a ventilation system 720, which circulates and cleans the air within the enclosure system 700, and replaces the air with fresh air from outside the system. The ventilation system 720, for example as illustrated in FIG. 49, can incorporate one or more inlets 722 which allow external air to enter the ventilation system through a HEPA (High Efficiency Particulate Arresting) filter 724. The inlet 722 can be connected by a hose 726 to an intake manifold 728 that routes air from various inlets 722 to a blower 730. A blower motor 732 powers the blower 730, causing air from the intake manifold 728 to be forced through a heat exchanger or chiller 736. Clean air from the heat exchanger 736 can be routed by another hose 726 to an outlet 738 that routes clean air to the enclosure 702. Outlet 738 can include a distribution plenum which spreads the airflow somewhat uniformly over a substantial area, and a HEPA filter.

A recirculation port 740 may be used to draw air from the enclosure 702, through yet another hose 726 to the intake manifold 728. A pair of valves 742 can be manipulated to adjust the ratio of fresh air entering the ventilation system 720 from the external environment through the inlet 722, to recycled air entering the ventilation system from the enclosure 702 through the recirculation port 740.

In the described system, air flows in a generally horizontal direction from one end of the enclosure 702 to the other. The air flow comes into the enclosure 702 at the first powder bed 202 end of the three-dimensional printing machine 100, flows toward the second powder bed 302 end of the machine, then exits the enclosure.

Clean rooms in various manufacturing processes are described as Class 100,000 or Class 10,000 or other classifications based on a system, where the number indicates how many particles per volume of air are allowed. Class 100,000 is the crudest degree of cleanliness useful for medical purposes and is appropriate for manufacturing of medical products, which are topical in nature (i.e., for application to the outside the body). Class 100 cleanliness is typical for products that must be sterile. The degree of cleanliness that is achieved is determined in large part by the filter installed in the system, and also by parameters such as how clean the system was to begin with. In the present invention, the filters 724, and in outlet 738 discussed above may be selected so that the ventilation provides, in the interior of enclosure 702, an environment having a cleanliness of the appropriate level desired for manufacture of a particular product.

It is possible to use some extent of recirculation of the air that flows through the enclosure 702. Once-through air flow, i.e., no recirculation of air at all, may be undesirable in the sense that it involves filtering more air (with associated filtration costs) than would be necessary if some recirculation were used. However, complete recirculation of air may also be undesirable in the sense that it might allow buildup in the air of undesirable vapors or other substances, if for some reason the filters might not be effective in removing a particular substance. For this purpose some degree of replacement of airflow can help to remove and prevent buildup of any undesirable substances that may not be removed by the filter. A suitable degree of recirculation is to recirculate approximately 80% of the airflow during each passage of air through the system. This means that at the end of passage through the system, 20% of the airflow is diverted to exhaust and 80% of the airflow is passed into a return duct to go back into the system. This recirculated flow is supplemented by a new airflow equal in amount to the airflow that was extracted and sent to the exhaust. This can be accomplished by valves having appropriate cross-sectional area and other features.

The enclosure 702 around the three-dimensional printing machine 100 can serve to prevent accidental entry of foreign objects or operators' body parts into operating regions of the machine. In addition, the enclosure 702 and its ventilation system 720 can serve any one or more of the following functions: maintaining a level of cleanliness in the operating region of the machine; controlling the concentration of vapors of binder liquid such as organic solvents; removal of heat that may be dissipated by various components in the operating region, and associated control of the temperature of the operating region; and even isolating the working region from random air motions in the surrounding room. Furthermore, certain sensors that may be associated with the enclosure may be used to influence operation of the machine.

The enclosure 702 may be operated at a pressure that is different from the surrounding atmospheric pressure. The pressure inside the enclosure 702 may be a slight positive pressure, which is especially suited to preventing bacteria and other forms of contaminants from entering the enclosure and the enclosed workspace. Alternatively, the enclosure 702 may be operated at a slight negative pressure, which is especially suited to preventing vapors such as solvent vapors from escaping from the enclosure. In achieving either goal, good seal design is also useful. Achieving either a positive or a negative operating pressure inside the enclosure may be aided by a supplemental blower at either the exhaust or the fresh air intake or both or connected directly between the enclosure interior and the exterior. Alternatively, appropriate sizing of flow areas in various parts of the flow system may achieve the desired pressure situation without the use of components such as supplemental blowers. The enclosure 702 may be maintained at a desired sub-atmospheric or above-atmospheric pressure even at essentially no flowrate of air through it, or at any desired flowrate ranging from zero to full designed flowrate.

The illustrated enclosure 702 provides a number of advantages over systems of the prior art. For example, the enclosure 702 may not only provide clear visibility through the windows 712, but may also prevent debris or contaminants from entering into or escaping from the enclosure. The enclosure system 700 may also isolate the printing system from the surrounding environment, which not only keeps the three-dimensional printing machine 100 clean, but may also minimize or eliminate any random air movement within the enclosure system due to outside influences, which could adversely affect the control of powder and/or droplets during operation. Still further, the enclosure system 700 may help to maintain the proper internal temperature, which can be critical to fluid viscosity and other variables affecting performance of the system. Still further, the ventilation system 720 can be configured to create a slight positive pressure on the inside of the enclosure 702, which may prevent contaminants from entering the windows 712 or other openings, due to differential pressures.

Figure 50:
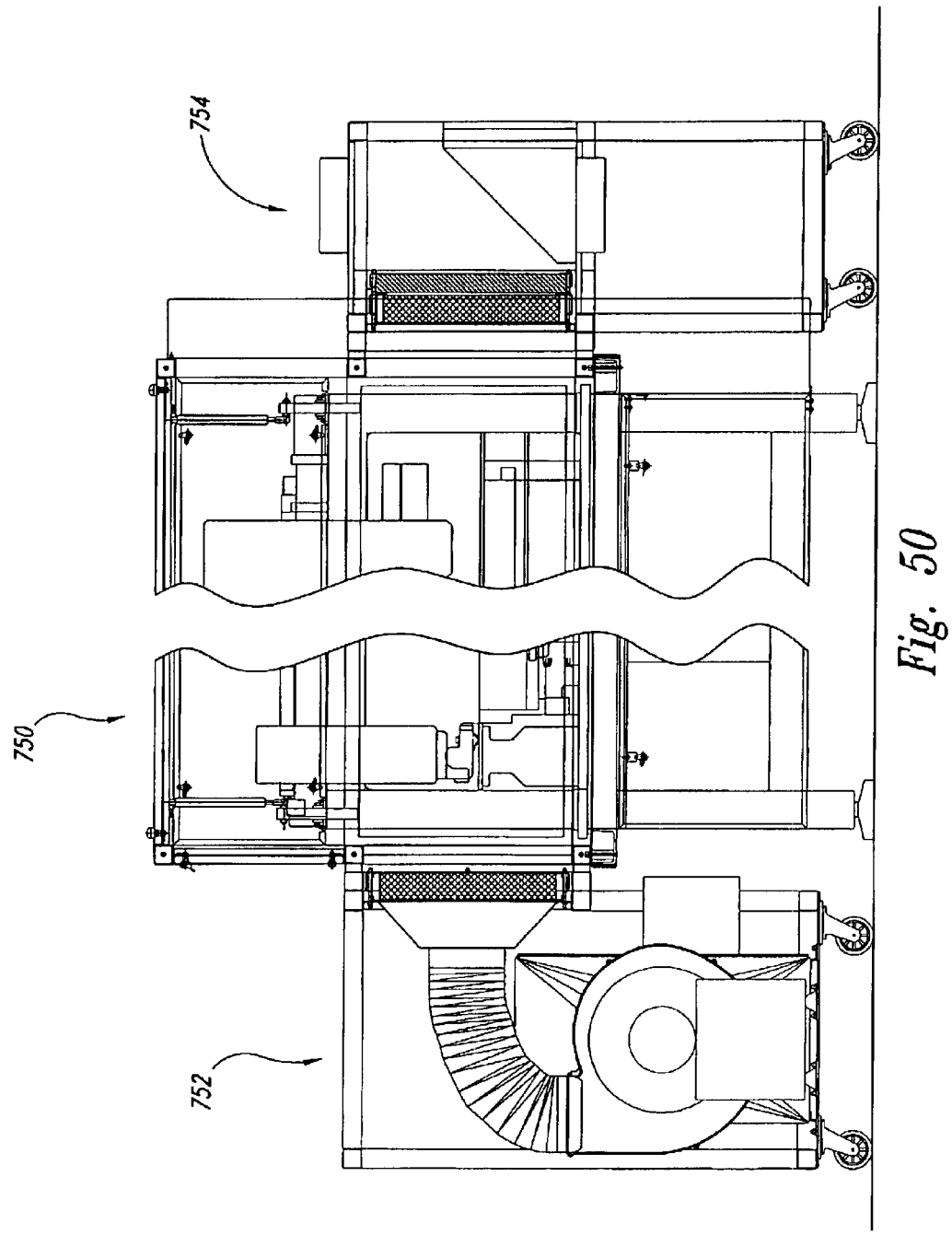
FIG. 50 is an elevation view of an enclosed three-dimensional printing machine with auxiliary equipment mounted on carts that are separate from the three-dimensional printing machine itself according to still another embodiment of the present invention.

FIG. 50 illustrates an alternate ventilation system, incorporating an auxiliary input cart 752 and an auxiliary output cart 754. The alternate ventilation system 750 is designed to provide the same benefits as the ventilation system 720 discussed above, but is modular in structure.

The auxiliary input cart 752 is configured with a blower for providing air into the enclosure 702, and can incorporate a heat exchanger or other elements for providing the enclosure with air at a desired temperature and/or moisture content.

The auxiliary output cart 754 is configured with filters and adsorbers for removing undesired substances from the air in the enclosure, and with ducting and valving to allow the operator to control the ratio of new air to recirculated air in the enclosure.

The airflow through the enclosure 702 can be used to remove heat and thereby better control the temperature of operating components inside the enclosure. For example, heat may be dissipated by the interlayer dryer apparatus 600 if that is part of the machine. In addition, heat can also be dissipated by a roller heater assembly 800 if that is used, and by other motors and electrical components, and by the blower itself. If no recirculation is used, or if the heat load is fairly small, it may be unnecessary to include an active chiller or heat exchanger component. However, in other cases it may be quite necessary to include active components for control of the temperature of the airflow. Heat can be removed by passing the airflow through a heat exchanger, which may be mounted in the fluid flowpath downstream of the blower but upstream of the filter, before the air enters the enclosure 702. Alternatively, the heat exchanger may be mounted in other places in the flowpath. The heat exchanger may be a liquid-to-air heat exchanger receiving chilled liquid from a chiller, which may be located remote from the other equipment.

It is possible that concentration of the vapor in the gas may be controlled simply by the recirculation fraction and release exhaust of the diverted air into the atmosphere. This may be acceptable for solvents which are relatively inexpensive and non-hazardous, such as ethanol. Alternatively, air that leaves the working region may be treated by adsorption filtration or other means to remove vapors of organic solvents and other possibly undesirable substances adsorption can bind the solvents in a solid form, and the adsorber can eventually be discarded. Alternatively, the vapors may be removed by a condensation operation, even possibly permitting the re-use of those substances. Either type of treatment offers the advantage of removing the vapors from the enclosure while at the same time preventing their release into the atmosphere.

The air or gas handling apparatus of the present invention can also include one or more sensors or devices for measuring the concentration of organic solvent vapors in the air being handled. The information obtained from such a sensor or device can be used to generate a warning or alarm, or can be used as feedback to adjust an operating parameter such as airflow, or can be used to cause a shutdown of at least some portion of the machine.

The present enclosure 702 also offers the possibility of operating the working region of a three-dimensional printing machine 100 in an oxygen-deficient or inert atmosphere, should this be desired such as for safety in dealing with combustible vapors. The ventilation 700 system would have to be capable of supplying appropriate gas composition.

The machine may also comprise facilities to supply a gaseous or vapor sterilant into the enclosure and to remove it. Such gases or vapors can include hydrogen peroxide vapor, ethylene oxide, and others as are known in the art. For sterilization or disinfection of the machine, the sterilant gas or vapor may be supplied to the inside of the enclosure for an appropriate period of time and then may be removed. Materials of construction of those parts of the machine that are to be exposed to sterilant may be chosen to be compatible with the sterilant.

Instead of the equipment configuration illustrated, in which the air handling equipment is cart-mounted separate from the main three-dimensional printing machine 100, it might be possible to mount some or all of that equipment underneath the three-dimensional printing machine 100, depending on space availability.

In order to enhance cleanability, the enclosure 702 may be designed so that its interior surface contains a substantial number of rounded internal corners, and so that the enclosure may be assembled using a relatively small number of joints.

Interlayer Drying

As a general review and summary, the three-dimensional printing machine 100 uses a first powder bed 202 that, for creation of a new powder layer, rises slightly to present powder for each new layer to the roller 402. The roller 402 then moves across the first powder bed 202 from left to right (in the orientation shown in FIG. 3) to spread new powder onto second powder bed 302. The sliders 432 on either side of the roller assembly 400 prevent the powder from escaping from the side of the first or second bed 202, 302 as it is being spread.

After the new layer of powder has been spread, the printhead assembly 500 moves in a predetermined pattern over the second powder bed 302 to dispense fluid in appropriate places to manufacture a layer of the desired product. Sequentially, the three-dimensional printing machine 100 will by this method fabricate an entire product from the bottom up.

The printhead assembly 500 can be of the type illustrated in FIGS. 24–39A and discussed above, or any of various dispenser or printhead varieties known in the art, including microvalve in either drop-on-demand or line-segment mode, piezoelectric drop-on-demand, thermal drop-on-demand, continuous jet with deflection, etc.

In the illustrated embodiment, heater assembly 600 can be moved into position above the second powder bed 302 and can direct heat output toward the second powder bed. As shown, heater assembly 600 is approximately the same size as the entire second powder bed 302, i.e., heater assembly 600 could move into position over the second bed, remain stationary, and radiate heat to the entire bed for an appropriate time duration. The heater assembly 600 can then turn off and leave the operating position to make room for further steps in the three-dimensional printing operation. In the illustrated embodiment, the printhead assembly 500 would have to move away from the second powder bed 302 to make room for the heater assembly 600 during the heating and drying operation.

A particularly advantageous method of providing heat externally is believed to be for heater assembly 600 to radiate heat, i.e., to deliver a significant portion of its heat as electromagnetic radiation in the infrared region of the electromagnetic spectrum. The heat can be directed at its target fairly precisely and it may be at an appropriate wavelength to be absorbed by a liquid. This electromagnetic radiation is directed at the second powder bed 302 upon which fluid has just been printed.

Alternatively, a plurality of lamps that emit in the infrared region could also be used. As yet another alternative, a convective heater assembly could provide heat by producing a gentle flow of warm gas such as warm air, or a combination of radiant and convective heating could be used.

It would be possible for the heater assembly 600 to operate for a predetermined period of time in the expectation that it would dry the printed region to the desired extent. However, it also would be possible and would probably be preferable to have the operation of the heater assembly 600 controlled by a control system, because of various advantages. For example, if one compares a layer containing a large amount of printed binder with a layer containing a small amount of printed binder, there may be a larger amount of heat required for the former than for the latter in order to reach the desired amount of residual binder for the start of the next pass of powder spreading or deposition. A programmed heating cycle of fixed duration and drying conditions could not distinguish between these two cases, but a control system could distinguish between them and respond appropriately to achieve, for example, a desired bed temperature or liquid content or similar condition for the start of the next layer powder spreading or powder deposition.

The control system could be responsive to a measured temperature, such as a measured temperature of the surface of the powder bed. Such a temperature measurement could be obtained by a non-contact temperature measurement technique such as an infrared thermometer (currently available from Raytek, Santa Cruz, Calif.), which aims at a predetermined location on the bed. The spot at which it aims could be a spot that is part of the printed article, or it could be a spot that is printed in a predetermined location simply for the purpose of having its temperature measured. In one particular embodiment, it has been determined that optically filtering the thermometer to preferentially pass a wavelength of approximately 7.9 microns may reduce the adverse affect of radiation emanating from surrounding structural members.

Alternatively, the control system could be responsive to a measured moisture content of a location in the bed. Moisture content can be measured by a near infrared moisture sensor (currently available from Unity Scientific of Beltsville, Md.). In one particular embodiment, immediately following printing, the moisture measured at a location that has been printed is approximately 11%. It has been determined that a moisture content of approximately 8% after drying and before the subsequent powder spreading and printing step may be desirable for good layer-to-layer binding. Moisture content may be considered to be the difference between the weight of a sample and the weight the sample would have if it were completely dry, normalized by the actual weight of the sample.

In the case of a non-contact temperature or moisture-measuring sensor such as an infrared detector for either temperature or moisture content, there are several possibilities for mounting it. One possibility is to mount an infrared sensor 624 (FIGS. 2 and 42) on the interlayer dryer heater assembly 600, which comes into position over the second powder bed 302 only during the heating step. The other possibility is to mount the sensor in a fixed position on the frame of the three-dimensional printing machine 100. In this case the detector always points at a specified place on the second powder bed 302, but it would have to be located somewhat further from the bed in order to allow the printhead assembly 500 and its motion control apparatus to pass under it during printing.

In either case, it would be desirable to define a viewing path for the infrared radiation that passes between heaters 602 or other elements of the heater assembly 600. The viewing path would preferably be enclosed or shielded by a structure such as a sleeve that prevents radiation directly from the heaters 602 from reaching the sensor, and allows the sensor to view only its intended target.

Alternatively, the viewing line of sight for infrared measurement of temperature could avoid the heater assembly 600 by aiming at a corner of the powder bed from angle so as not to intersect the heater assembly. In this case, where the sensor is closer to the second powder bed 302, cleaning apparatus could be provided to prevent the sensor from collecting powder. What is illustrated in FIG. 42 is a viewing path that aims at an angle so as not to intersect the heater assembly 600, with the sensor 624 traveling with the heater assembly 600.

As yet another alternative, it would be possible to use fiber optics capable of transmitting infrared radiation, which indicates the surface temperature of the second powder bed 302. At a powder surface temperature of perhaps 80° C., in the case of water-based binder liquids, it might be suitable to conclude heating and move on to the next manufacturing step of spreading the next layer of powder.

It would also be possible, of course, to use a thermocouple or similar device that contacts the second powder bed 302, but a noncontacting device has operational convenience and also enables a temperature reading to be taken which averages over a defined area. Alternatively, the heater assembly 600 could be controlled by a sensor responsive to the moisture content (content of binder liquid) in the bed.

Control decisions could be performed using a PID (proportional-integral-derivative) controller or algorithm as is known in the controls industry.

It is possible that after repeated printing and heating of layers, the second powder bed 302 will reach an asymptotic above-ambient temperature and remain warm even as the printing is occurring. This may have some beneficial effect as far as accelerating evaporation of the binder liquid, at least in the case of roller-spread dry layers. Of course, this effect would not so much occur in the case of slurry deposition of layers, because the liquid making up the slurry will probably substantially cool off any heat remaining from the inter-layer drying of previous layers.

In one variation, a small heater assembly (not shown) can be smaller than the length of the second powder bed 302, measured in the direction of travel. For example, the small heater assembly might consist of only a single quartz rod heater element 602. This means that the small heater assembly would have to travel across the second powder bed 302 as it is drying, i.e., the heater assembly would simultaneously move and emit heat/radiation. In contrast to the previous example, drying would not occur simultaneously all over the second powder bed 302. Rather, drying would occur in a band that advances across the second powder bed 302 as the small heater assembly advances.

One advantage of this latter variation would be the reduced space required for the heater assembly, such as when it is out of use. If a sufficient separation distance is provided between the printhead assembly 500 and the small heater assembly, it would even be possible for the small heater assembly to be heating a portion of the second powder bed 302 while the printhead assembly is printing on another portion of the build bed. This would reduce the total manufacturing time needed for all the steps associated with a layer. This would also provide that each portion of the second powder bed would have approximately the same time interval between printing and application of heat for drying, thereby reducing the possible bleeding in early-printed portions of a layer.

The following sequence illustrates one possible sequence of steps involved in using interlayer drying with printing on a layer of powder that has been roller-spread. In this case, the sequence of steps for two complete cycles of operation would be:

Deposit a layer of powder onto the second powder bed by roller-spreading;
Print binder onto powder layer;
Perform inter-layer drying with external heat;
Deposit another layer of powder onto the second powder bed by roller-spreading;
Print binder onto powder layer; and
Perform inter-layer drying with external heat.

It would also be possible to use interlayer drying on a layer of powder that has been slurry-deposited. In this case, the sequence of steps for two complete cycles of operation might be:

Deposit a layer of powder onto the second powder bed by rastering a jet of slurry;
Dry slurry layer, by external heat if desired;
Print binder;
Perform inter-layer drying with external heat;
Deposit another layer of powder onto the build bed by rastering a jet of slurry;
Dry slurry layer, by external heat if desired;
Print binder; and
Perform inter-layer drying with external heat.

The drying of the slurry carrier liquid could be performed by the same apparatus as used for interlayer drying, or it could be performed by other means.

The present invention can be used with any method of generation of external heat including radiation, convection and combinations thereof.

Optimum drying time and heating rate can be expected to depend on the individual binder and perhaps also on the powder characteristics. Thus, they must be determined experimentally on a case-by-case basis. Whatever they turn out to be, the use of an external heater as in the present invention provides a way of adjusting the evaporation rate to achieve desired drying rate and extent.

There are also applications in which three-dimensional printing is used to produce oral dosage forms containing active pharmaceutical ingredients, for which the active pharmaceutical ingredients are contained in the dispensed binder liquid. Frequently the solubility of these ingredients in binder liquids is limited, and the ability to deposit a desired dose into the selected pill size is an issue. The ability to deposit sufficient active pharmaceutical ingredient into the pill would be enhanced if multiple printing passes into the same powder layer could be made. In such a situation, especially when the outside of the pill is an impermeable surrounding enclosure, it may not be necessary for the interior powder to actually be bound together into a monolithic solid. Rather, the interior powder could remain as loose powder onto which is dispensed liquid that contains drug. In this case, by convention, the dispensed liquid might still be termed a binder-liquid even though binding action is not occurring. It is entirely possible that drug-containing liquid be dispensed onto the interior powder, the volatile liquid evaporates, more drug-containing liquid be dispensed onto the same powder, the volatile liquid again evaporates, and so on. In ordinary single-pass printing situations, the amount of drug that can be dispensed is limited by the solubility of the drug in the liquid and the amount of liquid that can be dispensed in one pass to achieve the desired saturation level in the local powder. However, the use of multiple passes provides the ability to arbitrarily increase the amount of drug deposited. An important part of this is that the powder dry sufficiently between passes so that more drug-containing liquid can be deposited. Interlayer drying can help achieve this. When sufficient drug has been deposited in a given powder layer, it may be desirable to actually bind the powder particles together. This would have to be done using a different liquid, which is actually a binder with respect to the powder particles.

For this operation, using for sake of example double-pass printing, the sequence of steps would be:

Deposit a layer of powder onto the second powder bed by roller-spreading;
Print binder onto powder layer;
Perform inter-layer drying with external heat;
Print binder onto powder layer;
Perform inter-layer drying with external heat;
Deposit another layer of powder onto the second powder bed by roller-spreading;
Print binder onto powder layer; and
Perform inter-layer drying with external heat.
Print binder onto powder layer;
Perform inter-layer drying with external heat Of course, more than two passes could similarly be performed.

The use of external heating to accelerate evaporation of the volatile liquid in the binder, presumably between multiple printing passes on the same layer, would make this a more attractive option. In fact, the active pharmaceutical ingredients may be contained in a dispensed liquid that is, strictly speaking, not even a binder with respect to the powder onto which it is dispensed. The dispensed liquid may be a solvent for the active pharmaceutical ingredients but might not be either a solvent for the powder or a carrier of an adhesive. Nevertheless, the dispensed liquid could serve the useful purpose of bringing dissolved active pharmaceutical ingredients into the powder and then evaporating, possibly with the aid of interlayer drying and possibly even multiple times for a single layer of powder. This gives the designer more options, for example allows use of a binder liquid which by itself is not sufficiently volatile to achieve a practically useful evaporation rate at room temperature. For example, bromoform is chemically similar to chloroform (a solvent which is useful for many purposes) and has the advantage of a noticeably higher surface tension making dispensing easier, but has a poor evaporation rate. Interlayer drying could help make the evaporation rate of a compound such as bromoform fast enough to be useful.

Heating the Roller

Figure 51:
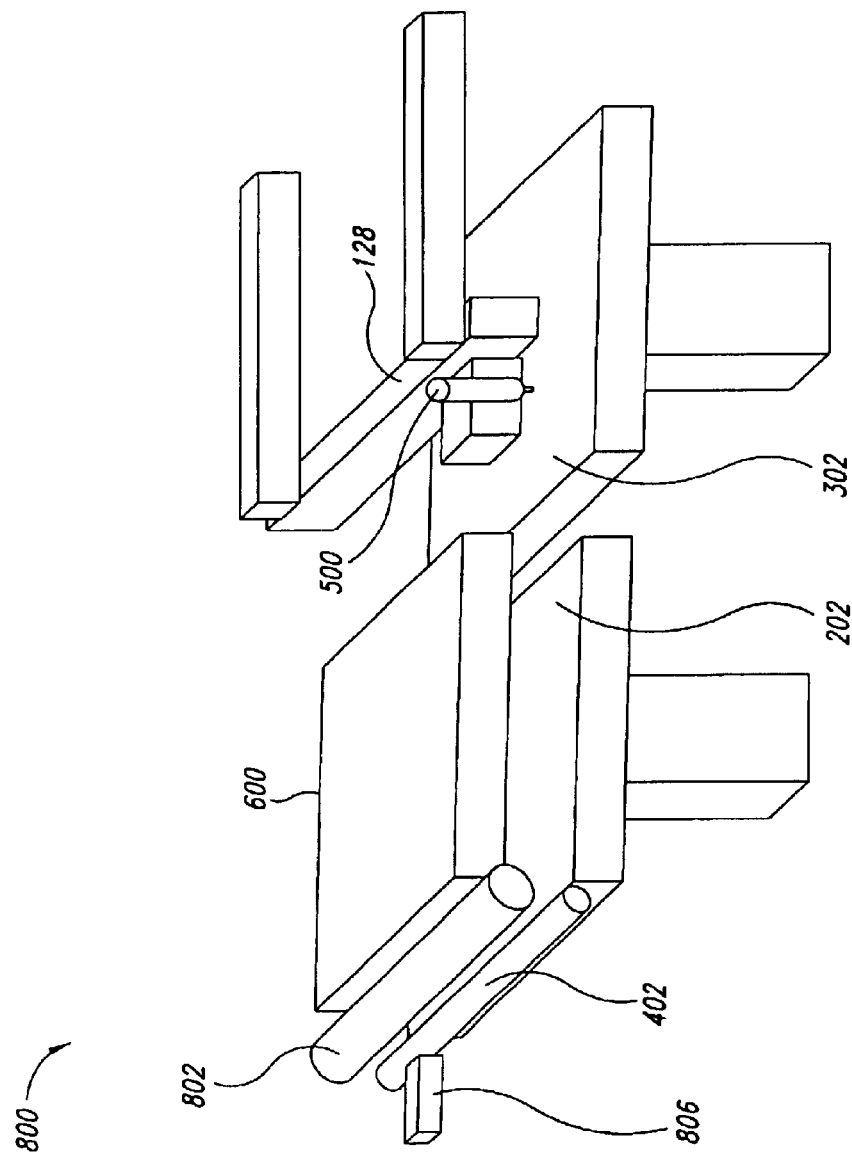
FIG. 51 is an isometric view schematically illustrating a three-dimensional printing machine incorporating a roller heater according to an embodiment of the present invention.
Figure 52:
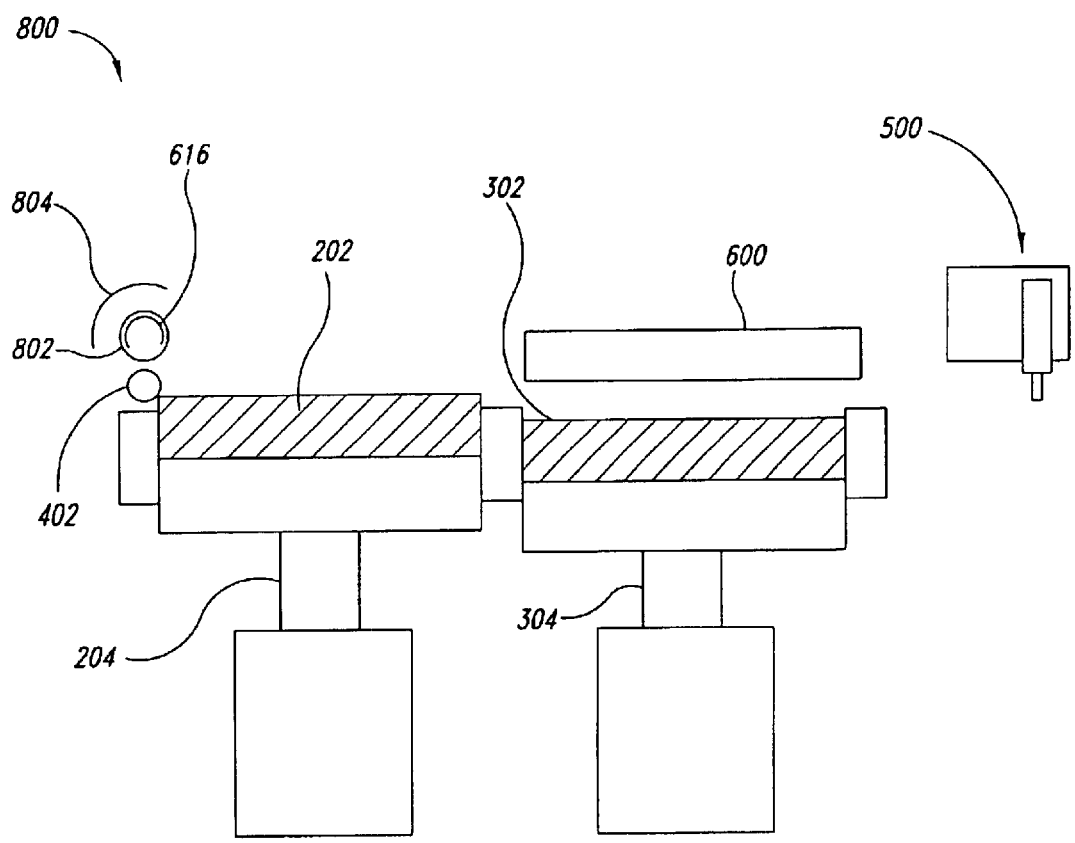
FIG. 52 is an elevation view of the three-dimensional printing machine of FIG. 51.

FIGS. 51 and 52 schematically illustrate a roller heater system 800 according to still another embodiment of the present invention. After a layer of powder has been spread onto the second powder bed 302, the layer of powder may be printed upon by the printhead assembly 500 dispensing one or more binder liquids, at least part of which is a solvent. The motion of printhead assembly 500 may be provided by a printhead motion control system, such as that described above, wherein a motion control system comprises the second carriage 128 that moves along the slow axis, and a the printhead assembly 500 that moves along the fast axis. The solvent in the dispensed binder liquid may be allowed to evaporate to a desired extent, including if necessary application of heat as interlayer drying. An interlayer drying apparatus, such as the heater assembly 600, may be positioned over the second powder bed 302 for an appropriate time and operated at an appropriate power level to cause the desired extent of evaporation of solvent. Then, the entire process may be repeated.

Motion of the various components (i.e., the printhead assembly 500, the heater assembly 600, the roller 402 and a roller heater 802) may be coordinated so that each is out of the way of the others at times when any particular component needs to be above either the first powder bed 202 or the second powder bed 302.

The roller 402 may be heated by the roller heater 802, which may be electrically operated. The roller heater 802 may be external to the roller 402, and one suitable mode of heat transfer is radiant heating, in which case roller heater 802 does not actually have to touch roller 402. One suitable geometry for the roller heater 802 is an elongated radiant heater. For example, quartz tube or other heaters may be made by enclosing an electrically resistive wire, possibly coiled, inside a tube such as a glass tube. As with the heaters 602 discussed above, some portions of the tube's surface may be left transparent to infrared radiation, while some other places may be coated with a reflective coating so as to direct infrared radiation in a desired direction. In FIG. 52, reflective coating 616 is shown as being located on portions of the surface of tubular roller heater 802 which are not facing the roller 402, so as to direct thermal radiation in the general direction of the roller 402. Such a heater has relatively small thermal mass and so is relatively quick to respond to changes in the power supplied to it.

For typical situations, a suitable heat output of the roller heater 802 is 50 Watts/inch of length of the tube. The length of the tube may be approximately equal to the length of the roller 402 or may be slightly shorter. With the use of the described tubular heaters 602, heat is transferred to the roller at least partly by radiation. However, it is also possible for at least some heat to be transferred to the roller 402 by convection. It is, for example, possible to supply heated gas to the vicinity of the roller 402. Typically, heat will also be lost from the roller 402, such as by conduction to the mounting of the roller and perhaps by other heat flow paths. It is possible to provide a shield 804 or partial enclosure around parts of the roller heater 802 and the roller 402 to partially contain either heated air or thermal radiation and thereby reduce heat loss. The roller heater 802, and for that matter the shield 804, could either move with the roller 402 when the roller 402 moves during powder spreading, or one or both could be stationary with respect to the machine chassis such that the roller 402 would only be in proximity to the roller heater 802 when the roller is in a rest position such that it is not involved in powder spreading.

It is possible that roller heater 802 could be powered during the entire three-dimensional printing process. Alternatively, it is possible that roller heater 802 may be powered only for a time period just prior to when the roller is scheduled to spread powder. Operation of roller heater 802 may simply involve supplying it with a predetermined constant power level. Alternatively, operation of roller heater 802 may be governed by a control system (not shown) which uses a temperature sensor 806 to measure the temperature of a place on roller 402 and which governs the power level of the roller heater 802 in response to that measured temperature. The temperature sensor 806 may be a non-contact temperature sensor such as an infrared sensor, or may be a contact temperature sensor, a thermocouple, a thermistor, a resistance temperature detector, etc., as is known in the art. Alternatively, operation of roller heater 802 may be governed by a control system (not shown) which uses a temperature sensor (not shown) to measure the temperature of roller heater 802 and which governs the power level of the roller heater 802 in response to that measured temperature. The control system may be of the proportional-integral-derivative (PID) variety or may use other control techniques as are known in the art. While roller 402 is being heated, roller 402 may be rotated, so as to distribute heat evenly over the surface of the roller, even if roller 402 is not actually performing rolling of powder at that time.

The roller 402 may be heated to a temperature sufficient to prevent condensation of the evaporating solvent onto the roller. Any condensable vapor carried in a noncondensable gas has a dew point or condensation temperature that is a function of the vapor's concentration. In the case of an aqueous binder liquid, the concentration of the vapor is the local humidity and the dew point is indicative of the local humidity. The roller 402 may be heated to a temperature above the dew point. In the case of an aqueous binder liquid, for typical operating conditions, a roller temperature of 35 C. is estimated to be appropriate. The roller 402 even may be heated to a temperature approximately equal to the temperature to which the surface of the second powder bed 302 is heated during interlayer drying, which might be a higher temperature than the dew point.

The roller 402 has so far been described as being heated by a heat source that is external to the roller, but it is also possible that a heat source could be placed inside the roller 402. For example, the roller 402 could be hollow and an electrical resistive heater could be located in the interior of the roller 402. Similarly, the temperature sensor 806 has been described as being external to roller 402, but it could instead be placed inside the roller.

The use of a heated roller has been described herein in connection with a three-dimensional printing machine 100 that uses interlayer drying by means of a heating assembly 600. Interlayer drying results in accelerated evaporation of the solvent contained in the binder liquid and means that in the absence of roller 402 heating, the roller may be one of the coolest components in the immediate vicinity of the second powder bed 302, which may facilitate condensation of solvent vapor onto the roller. Thus, the situation of interlayer drying may make a heated roller 402 especially useful. Nevertheless, a heated roller 402 may also be useful in other circumstances including ordinary three-dimensional printers without the use of interlayer drying. While electrical heat sources for heating the roller 402 have been described herein, other heat sources are also possible as are known in the art. Heating could also be accomplished by directing heated air or other gas at the roller 402 from a source of heated gas. It would also be possible to flow a heated liquid or gas through the roller 402 and thereby provide heat, or to flow a heated liquid or gas through a device near the roller, which provides heat to the roller. It would also be possible to pass an electric current through the roller 402 and generate heat by resistive dissipation. Radiant heaters may be enclosed in a glass or quartz tube as described here, but they do not need to be so enclosed and could instead be exposed. Another possible heat source is heat lamps, such as ordinary incandescent lamps or incandescent lamps that are adapted to provide a significant amount of infrared radiation. The roller 402 may have a temperature at the mid-point of its length that is different from the temperature near its ends. If this is undesirable, or for any other reason, it is possible to provide heat to the roller in amounts or fluxes which are different at different places along the length of the roller 402. For example, if the ends of the roller 402 are too cold, it is possible to provide extra heat near the ends of the roller. Heat supply which is nonuniform along the length of the roller 402 can be achieved by bunching together in closer proximity in desired places any of the heating sources described herein, which may include varying the spacing of resistive coils inside a quartz or glass tube if that is used. It is possible that the mountings or bearings of the roller 402 could be heated to minimize loss of heat from the roller to its ends or even to supply heat to the roller. The roller 402 may be longer than the build bed so that the temperature in the immediate vicinity of the roller ends does not directly affect the rolling itself.

Scrapers or brushes may be provided in contact with the roller at appropriate times and places to remove any powder which may stick to the roller despite these efforts or which may stick to the roller for any other reasons. It is possible that even in the absence of considerations about condensation of vapors on the roller 402, heating the roller may beneficially improve powder spreading by reducing the tendency of powder to stick to the roller due to reasons of electrostatic attraction or attractive Hamaker forces. It is possible to electrically ground the roller 402 or to maintain it at any desired electrical potential. For electrical grounding purposes or for heating by resistive dissipation, appropriate electrical contact with the roller 402 could be provided by slip rings, brushes or similar means.

Fluid Supply System

FIGS. 53 and 54 illustrate one particular fluid supply system 900 that can be used with the microvalves described earlier. FIG. 53 illustrates the fluid supply system receiving compressed gas, such as from a commercial or industrial compressed air source, at an inlet fitting 902 and routing it to a mist remover 904 and a filter 906. Alternatively, other sources of gas could be used. The mist remover 904 and the filter 906 are followed by a regulator 908, which may be a precision regulator such as is available from the Watts Regulator Company, North Andover, Mass. Air or other gas which has passed through regulator 908 proceeds through a filter 910(FIG. 54), optionally through a quick-disconnect fitting 912, and into a binder vessel 914. The binder vessel 914 (McMaster-Carr, Dayton, N.J.) may contain a top opening 916 for loading binder liquid into the vessel, cleaning, etc. The binder vessel 914 may further comprise a dip tube 918 which communicates with nearly the lowest point of the interior of binder vessel 914, and configured to withdraw liquid under the influence of elevated pressure in an air space 920 in the upper portion of the binder vessel 914. A fitting 922 at the liquid outflow connection the binder vessel 914 may also be a quick-disconnect fitting. From there the liquid exiting the binder vessel 914 proceeds through an in-line filter 924, and there to a tee 926, one branch of which is coupled to a pressure transducer 928 and the other branch of which goes to manifold 930 which divides the flow into the appropriate number (shown as 8) individual flowpaths going to individual dispensers. Manifold 930 also comprises a bubble release or bleed valve 932 to help in purging gas bubbles from the fluid system.

In-Line Flow Measurement by Differential Pressure and by Bubble Motion

It may be desirable to measure the flowrate of binder liquid as it is being dispensed through a particular dispenser as part of the three-dimensional printing process. Some manufacturing processes may have tight requirements for delivered flowrate or at least for verification of delivered flowrate. This is particularly true in the case of medical products, and particularly true if an active compound is dispensed contained in the binder liquid. Then, the accuracy of the content of the active compound is limited by the accuracy with which the flowrate of the binder liquid is known.

One way of measuring the flowrate of binder liquid as it is delivered is to install a flowmeter in the fluid delivery line upstream of the dispenser. In-line flowmetering at much larger scales of flowrates is quite common in industry. What is unusual about this application is that the flowrates to be measured can be as small as tens of microliters per minute. One way in which flowrates at industrial scales of flowrates have been measured is by a differential pressure or obstruction type flowmeter. In such a flowmeter, flow is forced to flow through an obstruction or flow resistance element, which may be an orifice, a nozzle, a channel or array of channels having parallel walls, or other geometry. The pressure difference across the obstruction is measured, such as by pressure transducers. The measured pressure difference indicates the flowrate, which is inferred through a calibration relation between flowrate and pressure drop. For use at very small flowrates, in order to obtain measurable pressure differences, the dimensions of such a device must be unusually small. For example, the dimensions of the channel or orifice or other form of flow obstruction might be such as to be manufactured by silicon micromachining. The pressure transducers used to measure the pressure difference can also be manufactured by silicon micromachining and microfabrication techniques, possibly in the same chip as the flow resistance element. Such flowmeters are commercially available from Seyonic S.A., Neuchatel, Switzerland. Information about flowrate can be recorded, for example for use in verification that the part was built as intended. It is also possible to integrate, as a function of time, the signal that represents dispensed flowrate, and thereby obtain a delivered quantity of fluid. Such a flowmeter has the advantage that it can be used on a truly continuous basis and is truly in-line, always measuring the flow that is delivered to the dispenser. Such a flowmeter can even measure reverse flow should that occur, in the sense that the direction of pressure difference between the two transducers would reverse.

This type of system is further illustrated in FIG. 55. Fluid from source 802 flows through passageway 852 to flowmeter assembly 868 and then on to dispenser 830. Within flowmeter assembly 868 is a flow resistance element 850. This is illustrated as being a plurality of parallel paths or surfaces whose individual cross-sectional dimension is smaller than the dimension of passageway 852. However, other geometries, including orifices, are also possible.

Transducer 862 could be a differential pressure transducer, with the pressure delivered to one side of its diaphragm being the pressure upstream of the flow resistance element 850 and the pressure delivered to the other side of its diaphragm being the pressure downstream of the flow resistance element 850. Output from transducer 862 can be delivered to a computer or other data acquisition system. Processing there can include linearization of the signal if the signal is nonlinearly related to flowrate. Alternatively, an individual pressure transducer could be used for each side of flow resistance element 850, with the outputs of both transducers being delivered to a computer or other data acquisition system. Both the flow resistance element 850 and the pressure transducer(s) 862 may be fabricated on a single chip of silicon 866. The cross-sectional dimensions of the individual passageways in the flow resistance element 850 may be chosen to give a differential pressure, which is measurable with sufficient accuracy at the flowrates being dispensed. For example, the cross-sectional dimensions of the individual passageways in the flow resistance element 850, or of the flow resistance element's orifice if the flow resistance element is an orifice, may be roughly comparable to the diameter of the orifice through which the liquid is dispensed at the dispenser 830.

Another method of making an in-line flowmeter, such as to measure the dispensing of binder liquid, is based on measuring the movement of a bubble in a transparent conduit. In general the liquid supply system may be designed and operated so as to be substantially free of bubbles, but bubbles may be introduced into the system specifically for the purpose of indicating or measuring flow. A bubble provides an interface which is readily identifiable and whose position may be measured. A bubble may be introduced into the system upstream of the actual dispenser, and then the motion of the bubble may be observed, and then the bubbles may later be removed from the system after they have been used for flow measurement, before they reach the actual dispenser. Bubble removal prior to the actual dispenser is to avoid possible adverse effects on the dispenser if bubbles reached the dispenser.

One particular bubble-based in-line flow measurement system for three-dimensional printing is illustrated in FIG. 56. As would be true with any in-line flowmeter, this type of measurement may be performed at a location which has substantially the same flowrate as occurs at the dispenser itself, i.e., in-line with the flow being measured and not subject to any removal or addition of flow between the measurement location and the dispenser, while measurement is being performed. The system may comprise a reservoir or pressurized source 802 of liquid that may be substantially bubble-free. From source 802 the liquid may continue on to a conduit 804 having a known cross-sectional area. Because the present application is concerned with measuring flowrates that are small, the conduit 804 may be of small cross-sectional dimension such as less than 1 mm diameter.

The conduit 804 may be at least partially transparent to permit visual or optical observation, and may be made of polymeric material that is compatible with the liquid being carried. Along conduit 804 may be a bubble introduction means 810 such as a hypodermic needle suitable to inject a suitable quantity of gas into the liquid. The quantity of gas may be chosen so that the bubble thus formed occupies the entire cross-section of the conduit 804 and has a length slightly longer than the conduit diameter, although these characteristics are not absolutely necessary. The bubble may be of air or could be of some other gas, such as helium, which is known to have relatively low solubility in liquids.

The bubble advances when the liquid surrounding the bubble advances, and, if the bubble occupies the full cross-section of conduit 804, there is essentially no passage of liquid from one side of the bubble to the other side. The edges of the bubble are readily observable through visual or optical means, and the position of a bubble edge as a function of time indicates the dispensing of liquid. Measurements may be done of either the leading edge or the trailing edge of the bubble 806. Suitable illumination 814 and a spatial reference scale 816 may be provided. Observing means 826 may include appropriate cameras, lenses, and image acquisition systems, which may include digital algorithms for detecting edges or contrast to indicate the edge of the bubble. Image acquisition systems may be able to determine the position of the bubble edge to a resolution governed by the pixel size on the image plane of the camera. As an example of the system according to the present invention, a flowrate of 8.64 microliters/minute (which may be obtained by jetting drops of ethanol at 2 kHz through a 60 micron orifice) corresponds, using a tubing having an inside diameter of 0.57 mm, to a bubble advance rate of 34 mm/minute. Increments of motion of 0.04 mm, corresponding to a dispensed volume of 0.01 microliter, are detectable.

As already discussed, in typical fluid dispensing systems, it would generally not be desirable for the bubble 806 to be allowed to travel all the way through the system to the dispenser 830, because many types of dispensers (e.g., microvalve dispensers, piezoelectric drop-on-demand dispensers) would be adversely affected by the presence of gas bubbles. Accordingly, it would be desirable to remove the bubble 806 after it has passed through the region used for tracking the position and rate of advance of the bubble. This can be done by withdrawing a portion of liquid containing the bubble 806, at a location downstream of the bubble-tracking region. As shown in FIG. 56, this can be performed by bubble removal means 820 which may resemble the bubble injection means 810, except configured to operate so as to withdraw a bubble and most likely some associated liquid. The bubble withdrawal means could instead be a valve. The inventors appreciate that other bubble withdrawal or separation means could also be used, particularly those known for use with intravenous delivery of liquids to patients. Alternatively, there could be provided a bubble collection region, which provides some space vertically above the liquid in conduit 804, suitable to collect some number of bubbles. However, for practical reasons it might not be desirable to collect too large a volume of bubbles, because such collected gas would be compressible and subject to volume change which might not be distinguishable from the exiting of flow through the dispenser. Thus, even a bubble collection region would have to be emptied occasionally. During those occasions when the bubble 806 and some surrounding liquid are withdrawn from the system, it would be difficult or impossible for this flow measurement system to determine the flowrate, if any, through the dispenser. Accordingly, withdrawal of a bubble may be performed in conjunction with expected interruptions in the manufacturing process, when dispensing of binder is not being performed. For example, bubble withdrawal may be performed during times when interlayer drying is performed, if that process step is in use, or during deposition of a new layer of powder, or at similar non-printing times.

Information from observing means 826 may be integrated with other software or hardware to yield an automatic calculation of the flowrate based on the position of the interface and the time. Either the bubble injection means 810 or the bubble withdrawal means 820 or both may be operated automatically such as with programmed motion under the command of a centralized computer 828. This computer or another computer may also calculate flowrates from time information and the position of the bubble. This information may be stored for record-keeping and verification purposes together with information about the portion of the print job associated with the flowrate information. In addition, the computer may use the acquired information about bubble position to determine when the bubble is near the end of the measurement region and needs to be withdrawn from the liquid system.

For any of these flowmeters, what the flowmeter measures is the passage of liquid through the flowmeter in an amount that is substantially equal to the amount which is being dispensed at the same time. This equivalence is of course aided by the fact that liquids are essentially incompressible in these circumstances. Also, it is helpful to minimize the amount of elasticity or compliance of the boundary of the fluid region between the flowmeter and the dispenser (with the possible exception of the case where a water hammer suppressor may be needed). This can be achieved by locating the flowmeter relatively close to the dispenser, such as on the printhead. However, other locations are also possible. With sufficient resolution of the flowmeter, and for suitably sized drops, at a sufficiently small dispense rate, the flowmeter may be able to measure the dispensing of an individual drop. For other circumstances, it may only be possible to measure the passage of some number of drops.

For any type of flowmeter, the flowrate information thus acquired may be stored in a computer or other memory for record-keeping and verification purposes. Flowrate information may be associated with information about the portion of the print job such a time and location etc. of the dispenser when the flowrate was measured. This may be done for multiple channels or dispensers. In addition, the flowrate information may be used in real time during the printing of a job. For example, the measured flowrate may be compared with a desired flowrate. If the flowrate is not what is desired, it may be possible to adjust command signals to the dispenser to make a correction. For example, microvalve dispensers vary the flowrate or drop size as a function of the waveform supplied to the microvalve. Piezoelectric dispensers also can vary the flowrate or drop size as a function of the waveform with which they are powered.

Similarly, it may be desirable to verify the delivery of a drop in particular locations where they were commanded. Detection of drop delivery may not be sufficient to provide a highly accurate flowrate, just an indication that a drop in an approximate size range was delivered. One technique for doing so has been described in copending and commonly assigned application U.S. Ser. No. 10/007,795, entitled "A method and apparatus for obtaining information about a dispensed fluid, such as using optical fiber to obtain diagnostic information about a fluid at a printhead during printing, which is hereby incorporated by reference in its entirety. This technique can be used as part of the machine of the present invention.

Another U.S. patent application incorporated by reference in its entirety is commonly assigned U.S. patent application Ser. No. 09/991,556 entitled "Printing or dispensing a suspension such as three-dimensional printing of dosage forms." Another U.S. patent application incorporated by reference in its entirety is Method and apparatus for engineered regenerative biostructures such as hydroxyapatite substrates for bone healing applications, U.S. Ser. No. 10/122,129.

Other U.S. patents incorporated by reference in their entirety are commonly assigned U.S. Pat. Nos. 5,934,343; 6,213,168; and 6,336,480. These describe apparatus and methods of presenting powder to a roller other than by a feed bed. It should be understood that in the present invention, in places where a feed bed is mentioned, other powder presentation apparatus such as described in these patents could also be used.

Releasable gripping of the carrier plate 222, 322 could be done electromagnetically if suitable materials were used. Although description has focused on raster printing, it would also be possible to print using vector printing or a combination of raster printing and vector printing.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The above description of various illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings provided herein of the invention can be applied to other purposes, other than the examples described above.

The various embodiments described above can be combined to provide further embodiments.

For example, when the interlayer dryer features are used, it may be helpful to also use the heated roller features, because condensation on an unheated roller might be higher. When the interlayer dryer features are used, it may be helpful to have the ventilation system such as is available with the enclosure. When the interlayer dryer features are used, it may be helpful to be able to rotate the roller during times when rolling is not being performed, and the elevation of the roller above the guiderails may be helpful. The use of organic solvents may make the enclosure and ventilation more necessary. In general, any feature can be combined with any other features in any combination.

Aspects of the invention can be modified, if necessary, to employ the process, apparatuses and concepts of the various patents, applications and publications described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all devices that operate under the claims to provide an improved three-dimensional printing apparatus and method. Accordingly, the invention is not limited by the disclosure, but instead the scope of the invention is to be determined entirely by the following claims.

What is claimed is:

1. A powder bed assembly for a three-dimensional printing machine, the three-dimensional printing machine having a guide, the powder bed assembly comprising:
    a perimeter wall engaged with the guide, the perimeter wall being movable with respect to the guide between an operable position in which the perimeter wall is oriented for use, and an inoperable position in which the perimeter wall is spaced apart from the operable position to facilitate loading powder into the perimeter wall or removing powder out of the perimeter wall;
    a carrier plate sized and shaped to closely conform to an interior of the perimeter wall, the carrier plate being slidably received within the perimeter wall to raise or lower a quantity of powder during operation of the three-dimensional printing machine; and
    siderails separated from the perimeter wall by gaps or channels, the gaps or channels being configured to allow powder to drop into them.

2. The powder bed assembly of claim 1, further comprising a gasket or seal located between the carrier plate and the perimeter wall.

3. The powder bed assembly of claim 1, further comprising suction means or an air knife or both, configured to create localized airflow into the gaps or channels so as to induce air which may carry airborne powder to flow into the gaps or channels, whereby the air which may carry airborne powder is discouraged from spreading to other regions of the machine.

4. The powder bed assembly of claim 1 wherein the siderails are configured for a component of the three-dimensional printing machine to roll on.

5. The powder bed assembly of claim 1 wherein a top surface of the perimeter wall and a top surface of the siderail are at the same elevation.

6. The powder bed assembly of claim 1 wherein a top surface of the perimeter wall and a top surface of the siderail are at different elevations.

7. The powder bed assembly of claim 1, further comprising a retaining member removably coupleable to the perimeter wall and the guide when the perimeter wall is in the operable position, such that the perimeter wall can be prevented from being inadvertently moved out of the operable position.

8. A powder bed assembly for a three-dimensional printing machine, the three-dimensional printing machine having a guide, the powder bed assembly comprising:
    a perimeter wall engageted with the guide, the perimeter wall being movable with respect to the guide between an operable position in which the perimeter wall is oriented for use, and an inoperable position in which the perimeter wall is spaced apart from the operable position to facilitate loading powder into the perimeter wall or removing powder out of the perimeter wall;
    a carrier plate sized and shaped to closely conform to an interior of the perimeter wall, the carrier plate being slidably received within the perimeter wall to raise or lower a quantity of powder during operation of the three-dimensional printing machine; and
    a sensor configured to register when the perimeter wall is in the operable position.

9. The powder bed assembly of claim 8, further comprising the alarm being configured to notify an operator when the perimeter wall is not in the operable position or to shut off or disable at least some portions of the three-dimensional printing machine or initiate a shutdown sequence when the perimeter wall is not in the operable position.

10. The powder bed assembly of claim 1, wherein the powder bed assembly is a feed bed assembly.

11. The powder bed assembly of claim 1, wherein the powder bed assembly is a build bed assembly.

12. A powder bed assembly and positioning system for a three-dimensional printing machine comprising:
    a powder bed assembly comprising a perimeter wall;
    at least one siderail separated from the perimeter wall by at least one of a gap and a channel;
    a carrier plate sized and shaped to closely conform to an interior of the perimeter wall, the carrier plate having a top surface configured to support a quantity of powder, the carrier plate being slidably received within the perimeter wall to raise or lower the quantity of powder during operation of the three-dimensional printing machine; and
    a vertical position controller releasably coupled to the carrier plate, the vertical position controller being operable to raise the carrier plate within the perimeter wall to present powder during operation, and being releasable from the carrier plate to allow the powder bed assembly to be removed from the three-dimensional printing machine.

13. The powder bed assembly and positioning system of claim 12 wherein the vertical position controller comprises a vacuum coupling releasably coupled to a bottom surface of the carrier plate.

14. A powder bed assembly and positioning system for a three-dimensional printing machine comprising:
    a powder bed assembly comprising a perimeter wall;
    a carrier plate sized and shaped to closely conform to an interior of the perimeter wall, the carrier plate having a top surface configured to support a quantity of powder, the carrier plate being slidably received within the perimeter wall to raise or lower the quantity of powder during operation of the three-dimensional printing machine; and
    a vertical position controller releasably coupled to the carrier plate, the vertical position controller being operable to raise the carrier plate within the perimeter wall to present powder during operation, and being releasable from the carrier plate to allow the powder bed assembly to be removed from the three-dimensional printing machine;
    wherein the vertical position controller further comprises a vacuum coupling releasably coupled to a bottom surface of the carrier plate, and a vacuum sensor to register a magnitude of the vacuum between the vacuum coupling and the bottom surface of the carrier plate.

15. The powder bed assembly and positioning system of claim 14 wherein the vertical position controller further comprises an O-ring to facilitate maintaining a vacuum between the vacuum coupling and the bottom surface of the carrier plate.

16. The powder bed assembly and positioning system of claim 14 wherein the vertical position controller further comprises an alarm configured to notify an operator when the magnitude of the vacuum is outside acceptable operating parameters.

17. A three-dimensional printing machine comprising:
a guide fixed with respect to the three-dimensional printing machine;
a powder bed assembly engaged with the guide, the powder bed assembly being movable with respect to the guide between an operable position in which the powder bed is oriented for use, and an inoperable position in which the powder bed is out of the operable position to facilitate loading powder into the powder bed or unloading powder from the bed;
a retaining member removably coupleable to the powder bed and the guide when the powder bed is in the operable position, such that the powder bed can be prevented from being inadvertently moved out of the operable position; and
at least one of a sensor and an alarm, wherein the at least one of a sensor and an alarm is responsive to the position of the retaining member.

18. A powder bed assembly for a three-dimensional printing machine, the three-dimensional printing machine having a global guide, the powder bed assembly comprising:
a receiving structure engaged with the global guide, the receiving structure being movable with respect to the global guide between an operable position in which the receiving structure is oriented for use, and an inoperable position in which the receiving structure is spaced apart from the operable position, the receiving structure comprising a local guide; and
a tray subassembly comprising:
a tray subassembly perimeter wall engaged with the local guide, the tray subassembly perimeter wall being movable with respect to the local guide between an operable position in which the tray subassembly is oriented for use, and an inoperable position in which the tray subassembly is spaced apart from the operable position to facilitate loading powder into the tray subassembly or removing powder from the tray subassembly; and
a carrier plate sized and shaped to closely conform to the tray subassembly perimeter wall, and configured to support a powder, the carrier plate being slidably received within the tray subassembly perimeter wall to raise and lower the powder during operation of the three-dimensional printing machine.

19. The powder bed assembly of claim 18, further comprising a gasket or seal located between the carrier plate and the tray subassembly perimeter wall.

20. The powder bed assembly of claim 18, further comprising a powder bed assembly perimeter wall having an internal configuration substantially identical to that of the tray subassembly perimeter wall, the tray subassembly perimeter wall and the powder bed assembly perimeter wall being in substantial alignment with each other when the tray subassembly is in the operable position, so that the carrier plate can pass from being slidably contained within the tray subassembly perimeter wall to being slidably contained within the powder bed assembly perimeter wall.

21. The powder bed assembly of claim 18 wherein the powder bed assembly is a feed bed assembly.

22. The powder bed assembly of claim 18 wherein the powder bed assembly is a build bed assembly.

23. The powder bed assembly of claim 18, further comprising a retaining member removably coupleable to the tray subassembly perimeter wall and the local guide when the tray subassembly perimeter wall is in the operable position, such that the tray subassembly perimeter wall can be prevented from being inadvertently moved out of the operable position.

24. The powder bed assembly of claim 18, further comprising a sensor configured to register when the powder bed assembly is in the operable position.

25. The tray subassembly of claim 18, further comprising a sensor configured to register when the tray subassembly is in the operable position.

26. The powder bed assembly of claim 18 wherein a tray subassembly retaining member is pivotably coupled to the local guide to rotate between a locked position in which a projection on the tray subassembly retaining member obstructs movement of the tray subassembly out of the operable position, and an unlocked position in which the projection on the tray subassembly retaining member does not obstruct movement of the tray subassembly out of the operable position.

27. A powder bed assembly and positioning system for a three-dimensional printing machine having a printhead configured to sequentially deposit fluid onto a plurality of layers of powder, the build bed comprising:
a tray subassembly perimeter wall or powder bed assembly perimeter wall having a top edge at least substantially coplanar with a working surface;
a carrier plate sized and shaped to closely conform to the tray subassembly perimeter wall, and configured to support the plurality of layers of powder, the carrier plate being slidably received within the tray subassembly perimeter wall to raise and lower the plurality of layers of powder during operation of the three-dimensional printing machine; and
a vertical position controller releasably coupled to the carrier plate, the vertical position controller being operable to sequentially lower the carrier plate within the tray subassembly perimeter wall to create room in which each layer of powder can be presented, and being releasable from the carrier plate to allow the tray subassembly perimeter wall and carrier plate to be removed from the powder bed assembly.

28. The powder bed assembly and positioning system of claim 27 wherein the vertical position controller comprises a vacuum coupling releasably coupled to a bottom surface of the carrier plate.

29. The powder bed assembly and positioning system of claim 27 wherein the vertical position controller further comprises a vacuum coupling releasably coupled to a bottom surface of the carrier plate, and an O-ring to facilitate maintaining a vacuum between the vacuum coupling and the bottom surface of the carrier plate.

30. The powder bed assembly and positioning system of claim 27 wherein the vertical position controller further comprises a vacuum coupling releasably coupled to a bottom surface of the carrier plate, and a vacuum sensor to register the magnitude of the vacuum between the vacuum coupling and the bottom surface of the carrier plate.

31. The powder bed assembly and positioning system of claim 27 wherein the vertical position controller further comprises a vacuum coupling releasably coupled to a bottom surface of the carrier plate, a vacuum sensor to register the magnitude of the vacuum between the vacuum coupling and the bottom surface of the carrier plate, and an alarm configured to notify the operator when the magnitude of the vacuum is outside acceptable operating parameters.

32. The powder bed assembly of claim 27 wherein the carrier plate comprises at least one depression configured to receive a liquid during operation of the three-dimensional printing machine.

33. The powder bed assembly of claim 27 wherein the carrier plate comprises holes or porosity configured to permit the passage therethrough of a liquid during operation of the three-dimensional printing machine.

34. The powder bed assembly of claim 1, further comprising a separator structure suitable to limit downward motion of the carrier plate.

35. The powder bed assembly of claim 8, further comprising a separator structure suitable to limit downward motion of the carrier plate.

* * * * *